June 9, 1953 R. A. ROWLEY ET AL 2,641,408
RECORD CONTROLLED CALCULATING MACHINE
Filed Oct. 26, 1951 32 Sheets-Sheet 1

Inventors
RUSSELL A. ROWLEY
DELMAR C. NEWCOMB
BY Geoffrey Knight
Attorney

June 9, 1953 R. A. ROWLEY ET AL 2,641,408
RECORD CONTROLLED CALCULATING MACHINE
Filed Oct. 26, 1951 32 Sheets-Sheet 3

Inventors
RUSSELL A. ROWLEY
DELMAR C. NEWCOMB
BY Geoffrey Knight
Attorney

June 9, 1953 R. A. ROWLEY ET AL 2,641,408
RECORD CONTROLLED CALCULATING MACHINE
Filed Oct. 26, 1951 32 Sheets-Sheet 4

Inventors
RUSSELL A. ROWLEY
DELMAR C. NEWCOMB
BY Geoffrey Knight
Attorney

June 9, 1953  R. A. ROWLEY ET AL  2,641,408
RECORD CONTROLLED CALCULATING MACHINE
Filed Oct. 26, 1951  32 Sheets-Sheet 5

Inventors
RUSSELL A. ROWLEY
DELMAR C. NEWCOMB
BY Geoffrey Knight
Attorney

June 9, 1953   R. A. ROWLEY ET AL   2,641,408
RECORD CONTROLLED CALCULATING MACHINE
Filed Oct. 26, 1951   32 Sheets-Sheet 6

Inventors
RUSSELL A. ROWLEY
DELMAR C. NEWCOMB
BY Geoffrey Knight
Attorney

June 9, 1953    R. A. ROWLEY ET AL    2,641,408
RECORD CONTROLLED CALCULATING MACHINE
Filed Oct. 26, 1951    32 Sheets-Sheet 8

Inventors
RUSSELL A. ROWLEY
DELMAR C. NEWCOMB
BY Geoffrey Knight
Attorney

June 9, 1953        R. A. ROWLEY ET AL        2,641,408

RECORD CONTROLLED CALCULATING MACHINE

Filed Oct. 26, 1951        32 Sheets-Sheet 9

FIG. 11.

| DATE | ITEM | CODE | UNIT COST | QUAN. | COST | HANDLING % | HANDLING CHARGE | TOTAL |
|---|---|---|---|---|---|---|---|---|
| 9 1 1 | M SOLDER. TERMINALS | 113 | 6 20 | 64 | 396 80 | | | |
| 17 1 1 | C SOCKETS | 115 | 7 75 | 50 | 387 50 | | | |
| | | | | | 784 30 | 15 | 117 67 | 906 |
| 10 1 1 | M FT VINYL WIRE | 210 | 3 15 | 50 | 157 50 | | | |

Inventors
RUSSELL A. ROWLEY
DELMAR C. NEWCOMB
BY Geoffrey Knight
Attorney

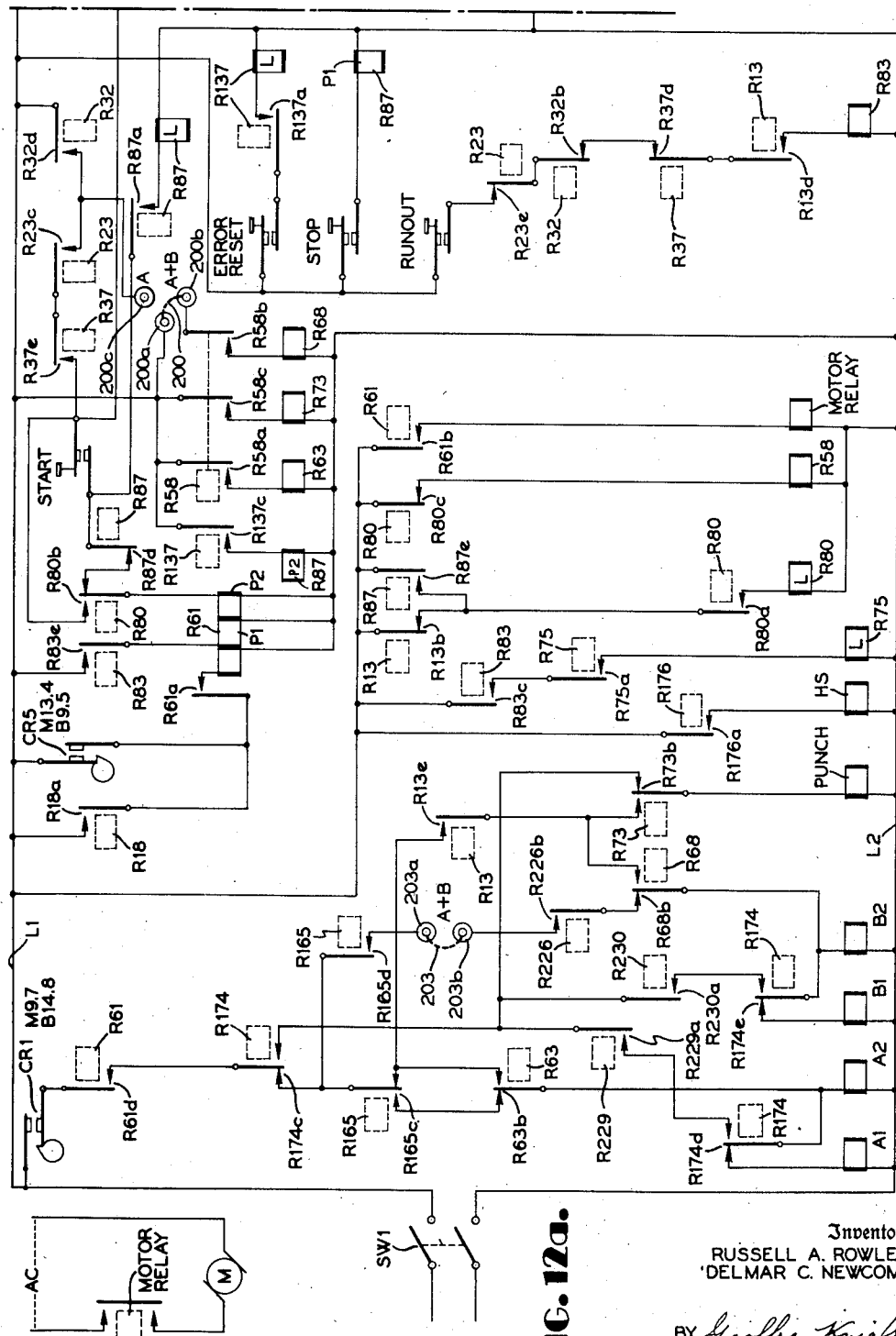

Inventors
RUSSELL A. ROWLEY
DELMAR C. NEWCOMB
BY Geoffrey Knight
Attorney

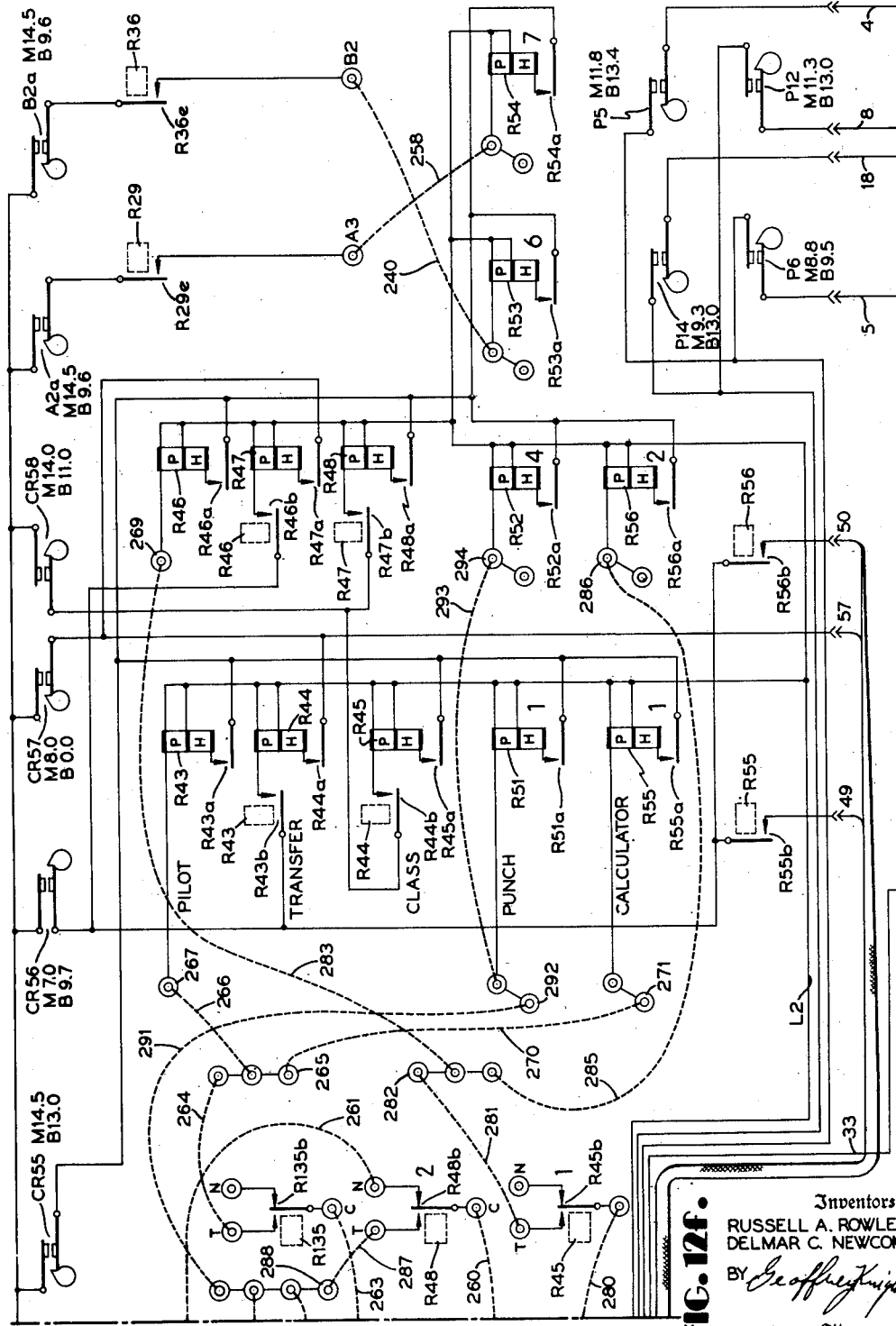

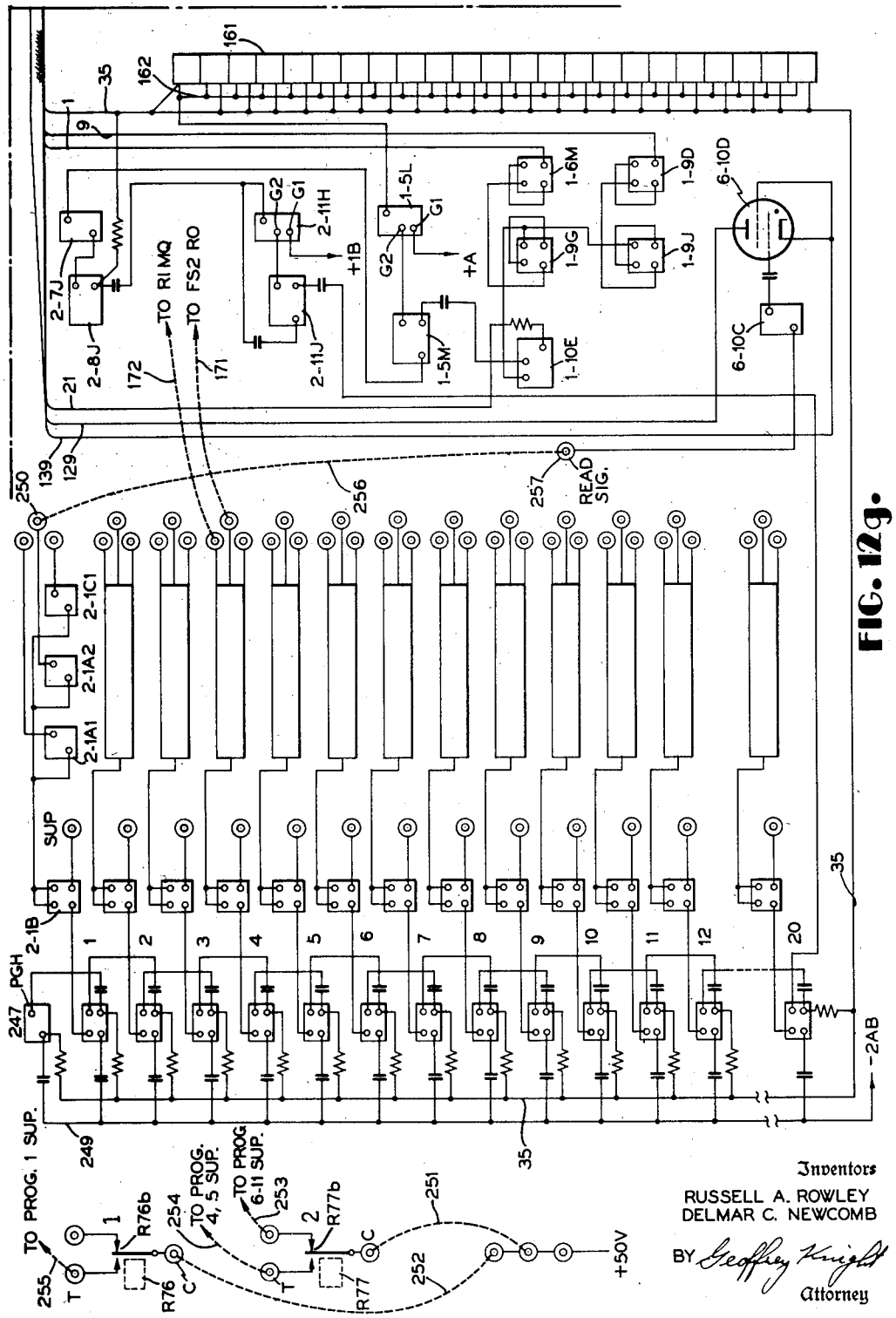

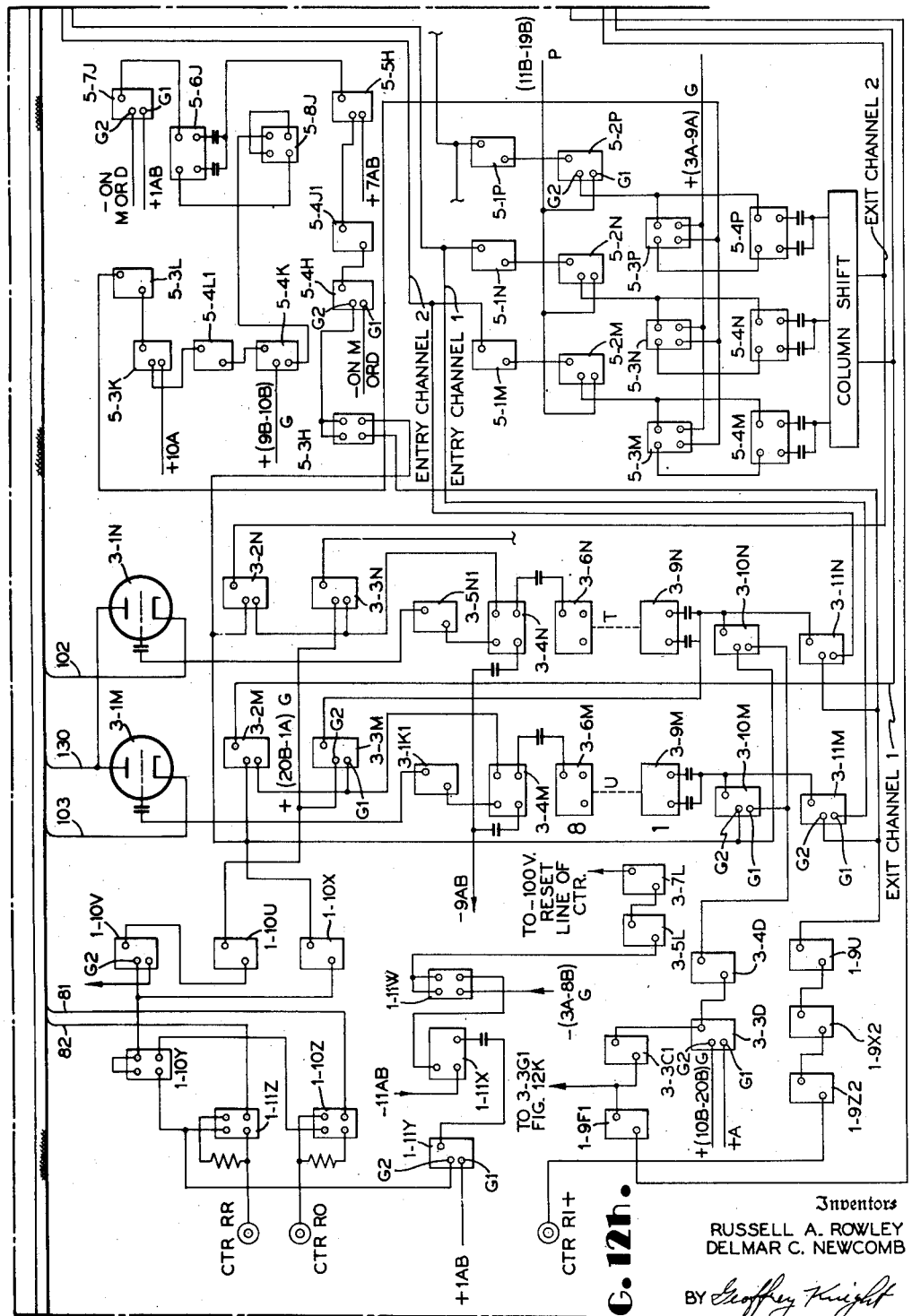

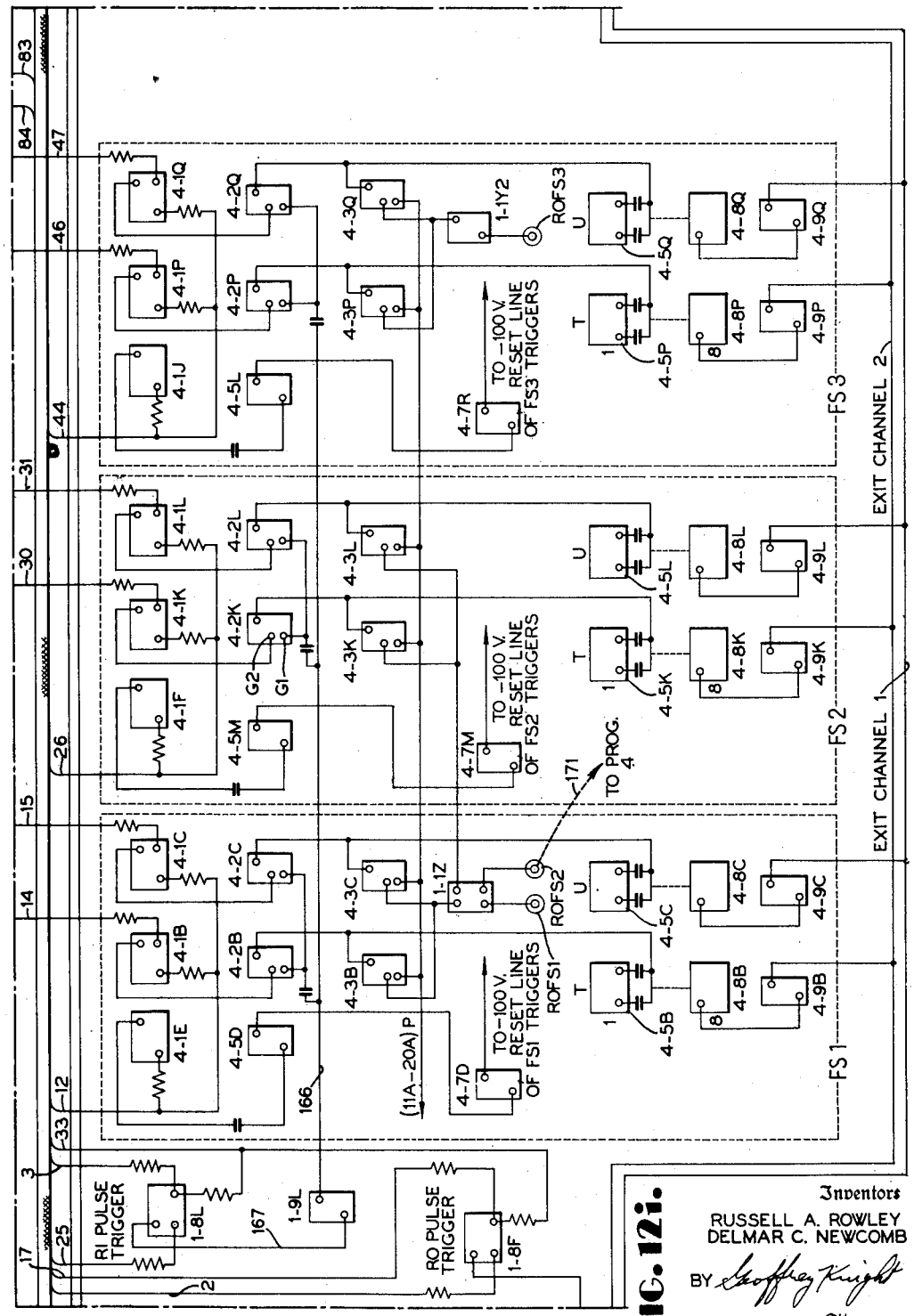

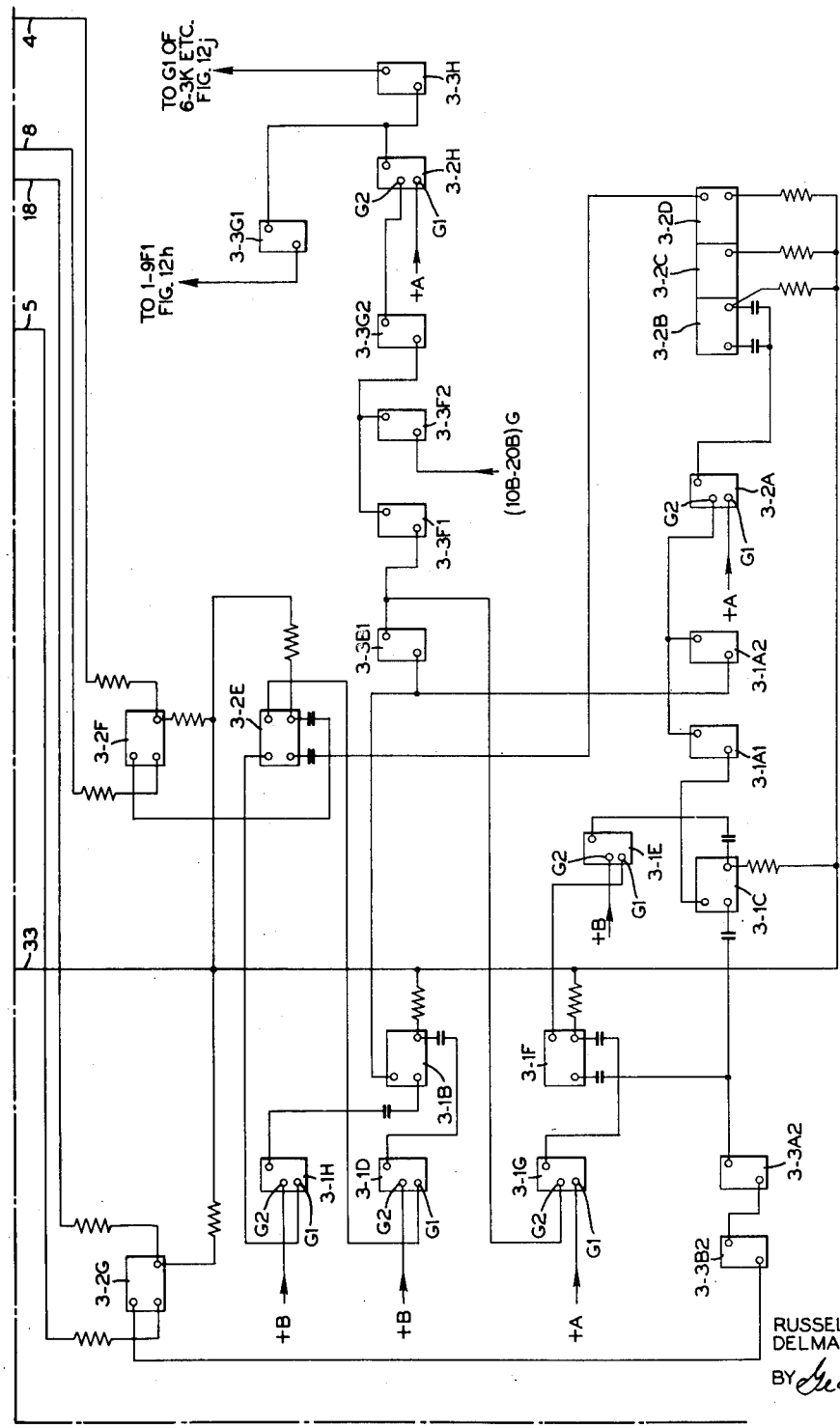

June 9, 1953   R. A. ROWLEY ET AL   2,641,408
RECORD CONTROLLED CALCULATING MACHINE
Filed Oct. 26, 1951   32 Sheets-Sheet 25

| 12a | 12b | 12c | 12d | 12e | 12f |
|-----|-----|-----|-----|-----|-----|
|     | 12g | 12h | 12i | 12j | 12k |

Inventors
RUSSELL A. ROWLEY
DELMAR C. NEWCOMB
BY Geoffrey Knight
Attorney

June 9, 1953     R. A. ROWLEY ET AL     2,641,408
RECORD CONTROLLED CALCULATING MACHINE
Filed Oct. 26, 1951     32 Sheets-Sheet 26

FIG. 16.

| SUPPRESS PROGRAM | CALC. SEL. | | OPERATION | PROG. NO. | FACTOR STORAGE | | | | MULT. QUOT. | COUNTER | GENERAL STORAGE | |
|---|---|---|---|---|---|---|---|---|---|---|---|---|
| | | | | | 1 U.C. | 2 QUANT. | 3 H.% | 4 | | | 2 HAN.CHG. | 4 TOT. COST |
| | | R | READ | R | 775 | 50 | 115 | | | | | 00000 |
| X | 1 | 1 | READ SIGNAL | 1 | | | | | | 39680 | | |
| | | 2 | ADD TOTAL COST TO ITEM COST | 2 | | | | | | RI+ 39680 | | RO 00000 |
| | 2 N | 3 | READ TOTAL COST INTO GS4 RESET CTR. | 3 | | | | | | RR 00000 | | 39680 |
| | | 4 | READ QUANTITY INTO MQ | 4 | | RO | | | RI 50 | | | |
| | | 5 | MULTIPLY UNIT COST BY QUANTITY | 5 | RO | | | | | 38750 | | |
| X | 2 T | 6 | READ HANDLING % INTO MQ | 6 | | | | | | | | |
| X | | 7 | MULTIPLY TOTAL COST BY HANDLING % | 7 | | | | | | | | |
| X | | 8 | ½ ADJUST, 3RD | 8 | | | | | | | | |
| X | | 9 | STORE HANDLING CHG. GS2, 4TH, RESET CTR. | 9 | | | | | | | | |
| X | | 10 | ADD HANDLING CHG. | 10 | | | | | | | | |
| X | | 11 | ADD TOTAL COST | 11 | | | | | | | | |
| | | | | 20 | | | | | | | | |

Inventors
RUSSELL A. ROWLEY
DELMAR C. NEWCOMB
BY Geoffrey Knight
Attorney

June 9, 1953

R. A. ROWLEY ET AL 2,641,408

RECORD CONTROLLED CALCULATING MACHINE

Filed Oct. 26, 1951

| PROGRAM SUPPRESS | OPERATION | PROG. NO. | FACTOR STORAGE | | | | MULT. QUOT. | COUNTER | GENERAL STORAGE | | |
|---|---|---|---|---|---|---|---|---|---|---|---|
| | | | 1 U.C. | 2 QUANT. | 3 H% | 4 | | | 2 HAN.CHG. | 4 TOT.COST | |
| | READ | R | 775 | 50 | 15 | | | 38750 | | 39680 | |
| | 1 READ SIGNAL | 1 | | | | | | R1+ | | RO | |
| | 2 ADD TOTAL COST (GS4) TO ITEM COST (CTR) | 2 | | | | | | 78430 | | | |
| | 3 STORE TOTAL COST IN GS4 RESET CTR. | 3 | | | | | | RR 00000 | | 78430 | |
| X | 4 TRANSFER QUANTITY (FS2) TO MQ | 4 | | | | | | | | | |
| X | 5 MULTIPLY UNIT COST (FS1) BY QUANTITY | 5 | | | | | R1 15 | | | | |
| | 6 TRANSFER HANDLING % (FS3) TO MQ | 6 | | | RO | | | | | RO | |
| | 7 MULTIPLY TOTAL COST GS4 BY HANDL'G % | 7 | | | | | | 117645 0 | | | |
| | 8 ½ ADJUST, 3RD | 8 | | | | | | 117695 0 | | | |
| | 9 STORE HANDL'G CHG IN GS2, 4TH, RESET CTR. | 9 | | | | | | 00000 00 | 11176 | | |
| | 10 TRANSFER HANDLING CHG. TO COUNTER | 10 | | | | | | R1+ 11176 | RO | RO | |
| | 11 ADD TOTAL COST | 11 | | | | | | R1+ 79606 | | | |
| | | 20 | | | | | | | | | |

FIG. 17.

Inventors
RUSSELL A. ROWLEY
DELMAR C. NEWCOMB

BY Geoffrey Knight
Attorney

June 9, 1953  R. A. ROWLEY ET AL  2,641,408
RECORD CONTROLLED CALCULATING MACHINE
Filed Oct. 26, 1951  32 Sheets-Sheet 28

INVENTORS
RUSSELL A. ROWLEY
DELMAR C. NEWCOMB
BY *Geoffrey Knight*
ATTORNEY

June 9, 1953  R. A. ROWLEY ET AL  2,641,408
RECORD CONTROLLED CALCULATING MACHINE
Filed Oct. 26, 1951  32 Sheets-Sheet 31

INVENTORS
RUSSELL A. ROWLEY
DELMAR C. NEWCOMB

BY Geoffrey Knight
ATTORNEY

June 9, 1953   R. A. ROWLEY ET AL   2,641,408
RECORD CONTROLLED CALCULATING MACHINE
Filed Oct. 26, 1951   32 Sheets-Sheet 32

FIG. 23.

| PROG. SUPP. | PROG. NO. | OPERATION | FACTOR STORAGE ||||  MULT. QUOT. | COUNTER | GENERAL STORAGE ||
|---|---|---|---|---|---|---|---|---|---|---|
| | | | 1 BON. R. | 2 HOURS | 3 PAY R. | 4 BASE PAY | | | 2 BASE TOT. | 4 BONUS TOT. |
| | R | READ | 28 | 53 | 178 | | | | 00000 | 00000 |
| | 1 | READ PAY RATE INTO MQ | | RO | RO | | R1 178 | | | |
| | 2 | MULTIPLY HOURS BY PAY RATE | | | | | | 9434 | | |
| | 3 | ½ ADJUST | | | | | | 9439 | | |
| | 4 | STORE BASE PAY ITEM FS4, 2ND | | | | R1 943 | | RR 0000 | | |
| | 5 | READ BASE PAY ITEM INTO COUNTER | | | | RO | | R1 943 | | |
| | 6 | READ BASE PAY TOTAL INTO COUNTER | | | | | | R1 943 | RO | |
| | 7 | STORE BASE PAY TOTAL GS2, RESET CTR. | | | | | | RR 000 | R1 943 | |
| | 8 | READ BONUS RATE INTO MQ | RO | | | | R1 28 | | | |
| | 9 | MULTIPLY BASE PAY ITEM BY BONUS RATE | | | | RO | | 26404 | | |
| | 10 | ½ ADJUST, 2ND | | | | | | 26454 | | |
| | 11 | STORE BONUS ITEM FS4, 3RD, RESET CTR. | | | | 264 | | RR 00000 | | |
| | 12 | READ BONUS ITEM INTO COUNTER | | | | | | R1 264 | | |
| | 13 | ADD BONUS TOTAL | | | | | | R1 264 | | RO |
| | 14 | STORE BONUS TOTAL GS4, RESET COUNTER | | | | | | RR 000 | | R1 264 |
| | 15 | STORE BONUS TOTAL GS4 | | | | | | RO 435 | | R1 435 |
| | 16 | ADD BASE TOTAL | | | | | | R1 7377 | RO 6942 | |
| | 20 | | | | | | | | | |

CALC. SEL. 1

INVENTORS
RUSSELL A. ROWLEY
DELMAR C. NEWCOMB
BY Jeoffrey Knight
ATTORNEY

Patented June 9, 1953

2,641,408

UNITED STATES PATENT OFFICE 2,641,408

RECORD CONTROLLED CALCULATING MACHINE

Russell A. Rowley, Binghamton, and Delmar C. Newcomb, Endicott, N. Y., assignors to International Business Machines Corporation, New York, N. Y., a corporation of New York Application October 26, 1951, Serial No. 253,332

14 Claims. (Cl. 235—61.7)

This invention relates to record controlled computing machines.

In the commercial computing machine known as the IBM type 604 electronic calculator, record cards are fed through a reading station in one cycle and through a punch station in the next cycle, factors to be used in calculation being read into the electronic calculator at the reading station and results being punched into the same record card as it passes through the punch station. If it is desired to make a summary record, which will contain the sum of the results of a plurality of calculations, for example, it is necessary to perform a collating operation with the deck of record cards, in order to intersperse summary cards at the proper places in the deck to receive the summary recording. This is evidently so, because the cards pass in a continuous sequence through the punching station and the summary card must be at the punching station on the particular cycle when a summary recording is to be made.

In the application of Byron Phelps, Serial No. 618,881, filed September 27, 1945, there is shown a machine in which the so-called problem cards from which factors are read are fed through a read unit and blank cards are fed through a punch unit operating concurrently with the read unit. In this case the results are punched on blank cards, but this machine has no flexibility of control and can do no other operation than to continue to read factors from successive cards in the read feed and punch products in cards in the punch feed, on a card-for-card basis.

In another commercial machine, known as the IBM card programmed calculator, factors are read into an electronic calculator from cards in the card feed of an electric accounting machine and computed results can be punched in a third machine, known as a summary punch. This is a very flexible machine group and can be used for such operations as summarizing extensions of factors from a plurality of cards and punching indicative information in the same summary card.

However, it requires storage means to receive the indicative information from the cards, from which it can be read out to the summary punch. Also, it has only one card feed and if the source information is in separate card files it is necessary to collate the cards into a single deck, and perhaps to sort them into the separate decks again when the computing run is over.

It is an object of the present invention to provide a record controlled calculating machine which can reproduce coded information directly from source records concurrently with the recording of results of computations with factors derived from the source records.

Another object is to provide a machine as described in the foregoing paragraph, whereby the produced record may contain a summary of intermediate results computed from factors derived from a plurality of source records read in successive cycles, or a result computed from factors read in a single cycle.

Another object is to provide a record controlled calculating machine which can take factors for computation from a plurality of sets of source records, the sets of source records being kept separate throughout the operation.

A particular object is to provide a machine as described in the foregoing paragraph which can take factors from a plurality of source records of a first set for computation with a factor taken from a single source record of a second set.

Still another object, related to the one described in the next paragraph above is to enable the substitution of a new factor from another record of the second set to be controlled by comparison of control codes on successively read records of the first set.

Another object is to provide a record controlled calculating machine including means for reading factors from two sets of records, the reading means being individually controlled so that one can be operated to supply a succession of factors from successive records of one set, while the second reading means remains idle.

Another object is to provide a machine of the kind described in the foregoing paragraph, wherein the active condition of the second reading means is controlled by records read in the first reading means.

Another object is to provide a record controlled calculating machine including a record reading unit having a factor read-in station and a reproducing reading station, and including, also, a recording unit and a single driving means, for both units, the two reading stations and the recording unit being individually clutchable to the driving means.

Another object is to provide a machine as described in the foregoing paragraph including means to drive the recording unit and the reproducing reading station together at one speed, with or without the read-in station; or to drive the reading unit without the recording unit, at a higher speed.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1a and 1b together constitute a side elevation of the punch unit and two reading units.

Figs. 2a and 2b together constitute a longitudinal section through the punch and two reading units.

Fig. 11 is a pictorial view of a group of cards which might be punched by the machine and a bill printed from these cards.

Figs. 12a to 12k together constitute a wiring diagram of the entire machine.

Figure 13:
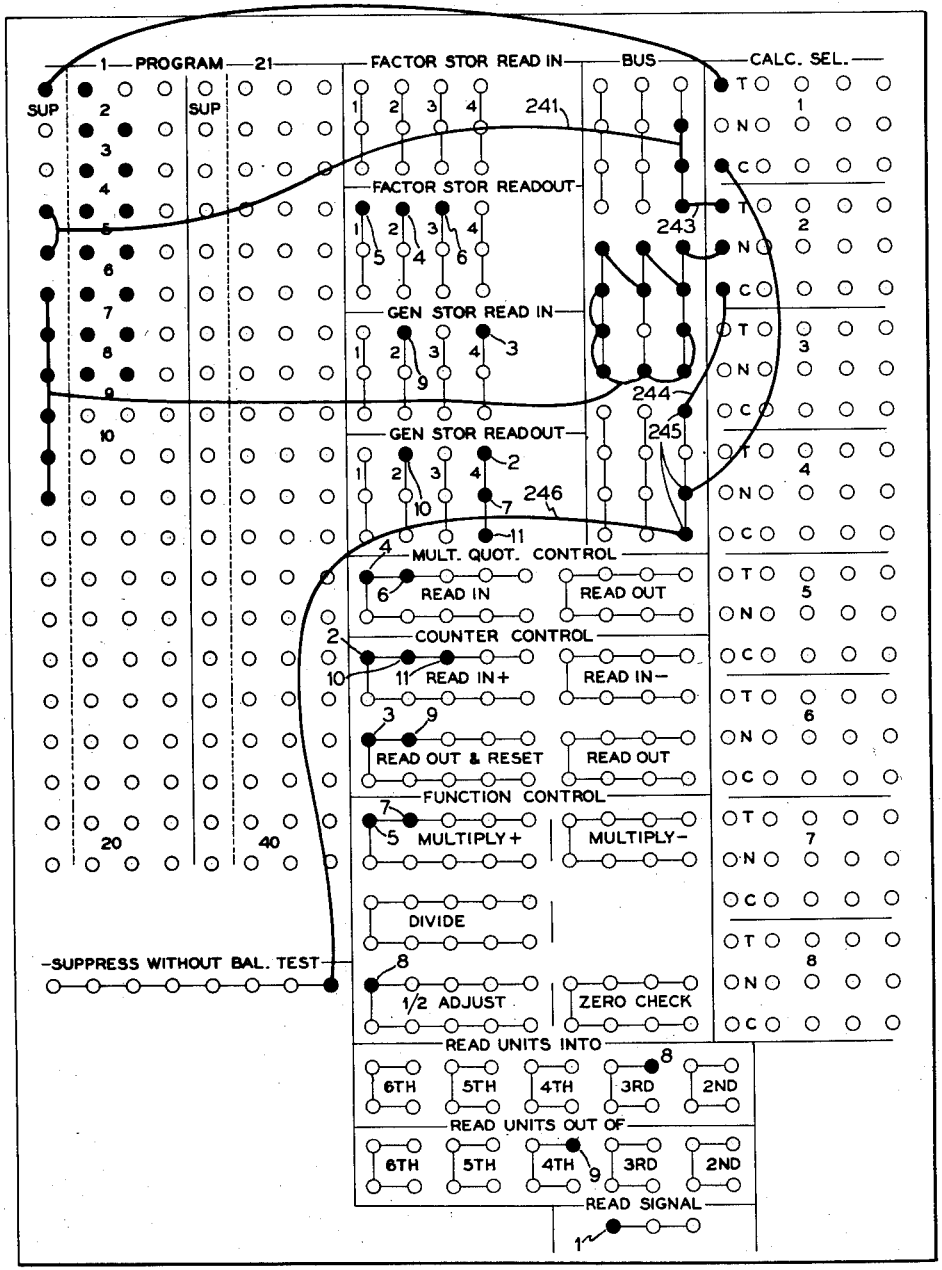

Fig. 13 is a view of the control panel of the calculating machine, with illustrative wiring.

Figure 14A:
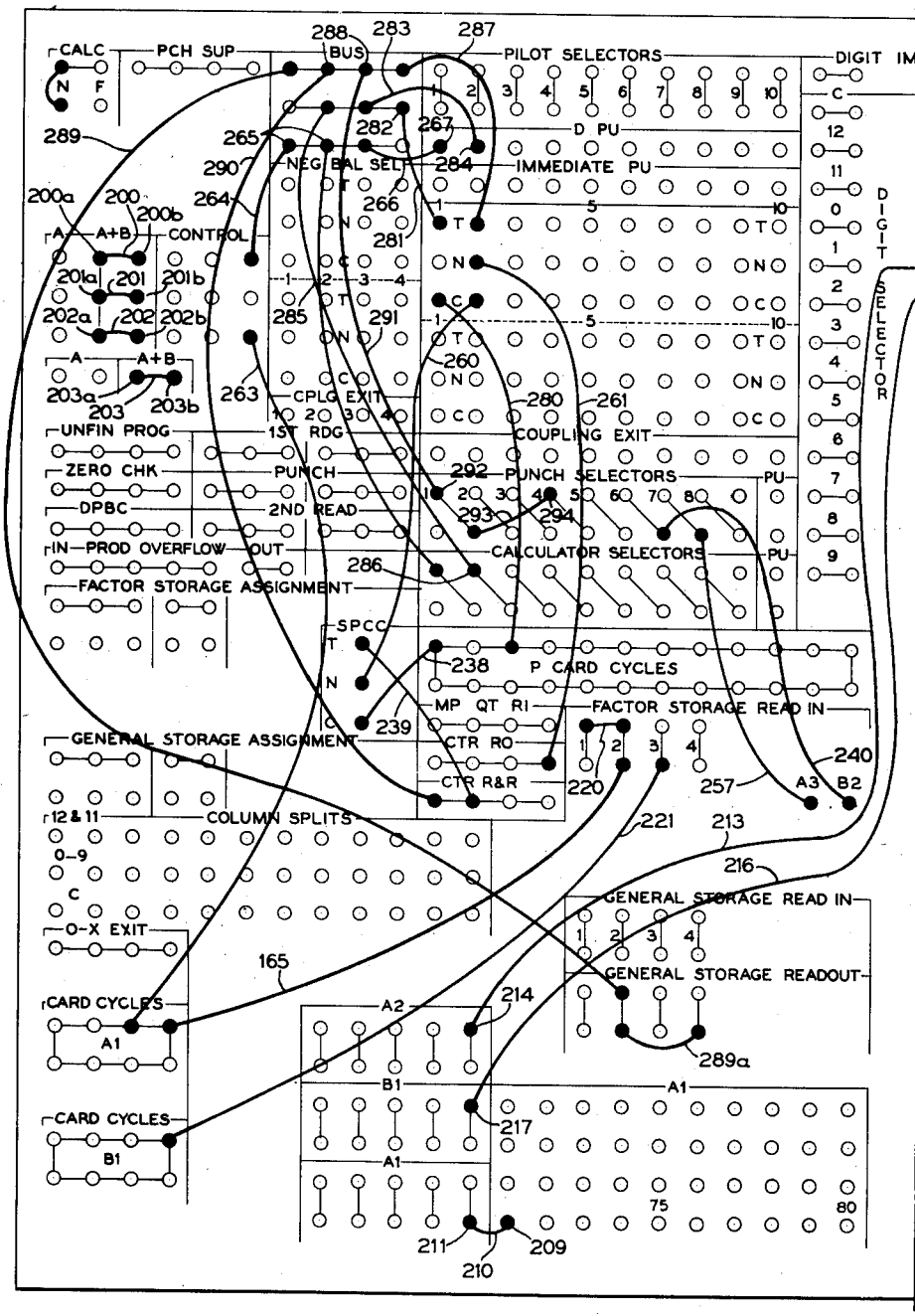
Figure 14B:
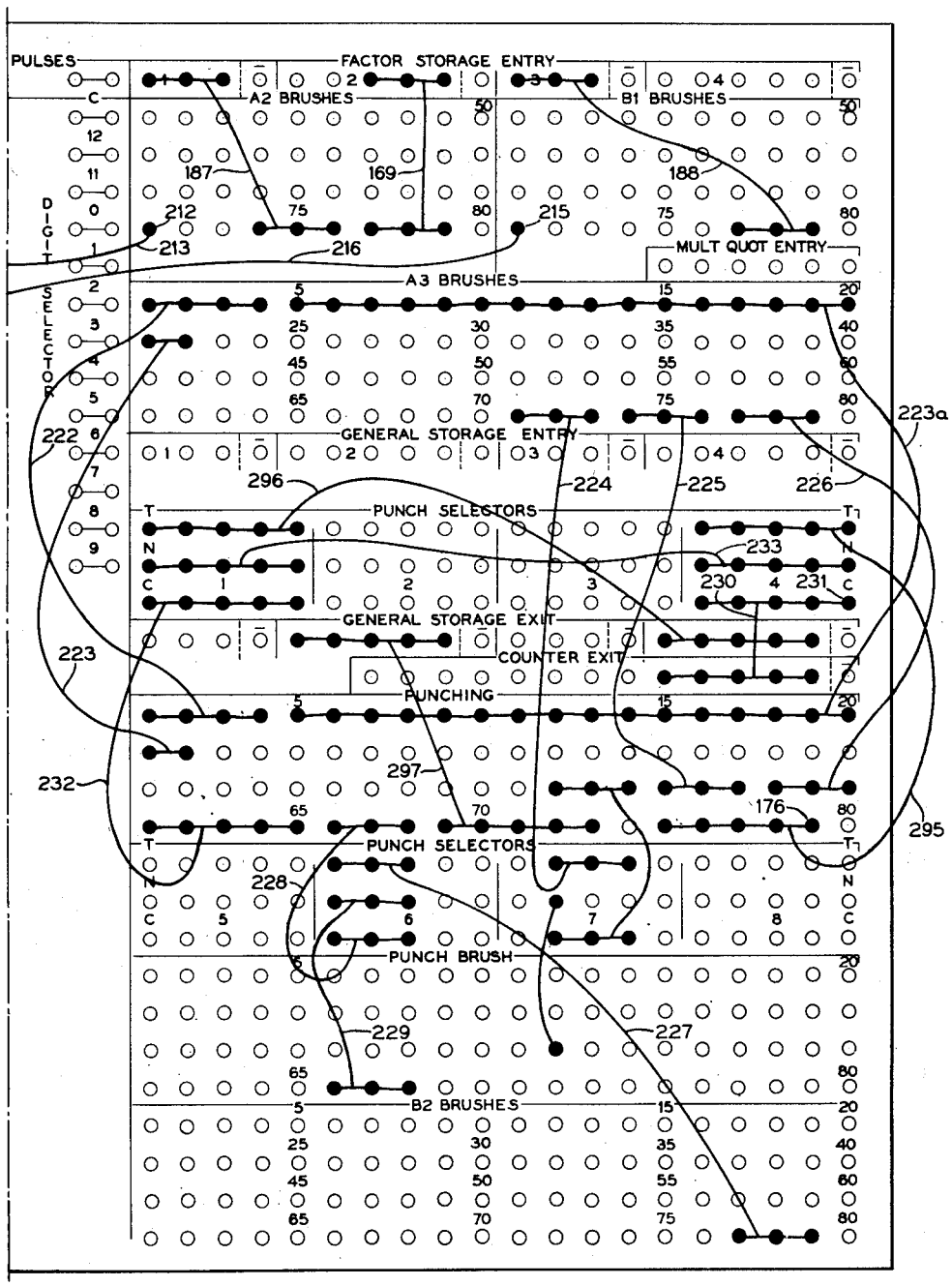

Figs. 14a and 14b show the control panel of the combinational reader and punch, with illustrative wiring.

Figure 15A:
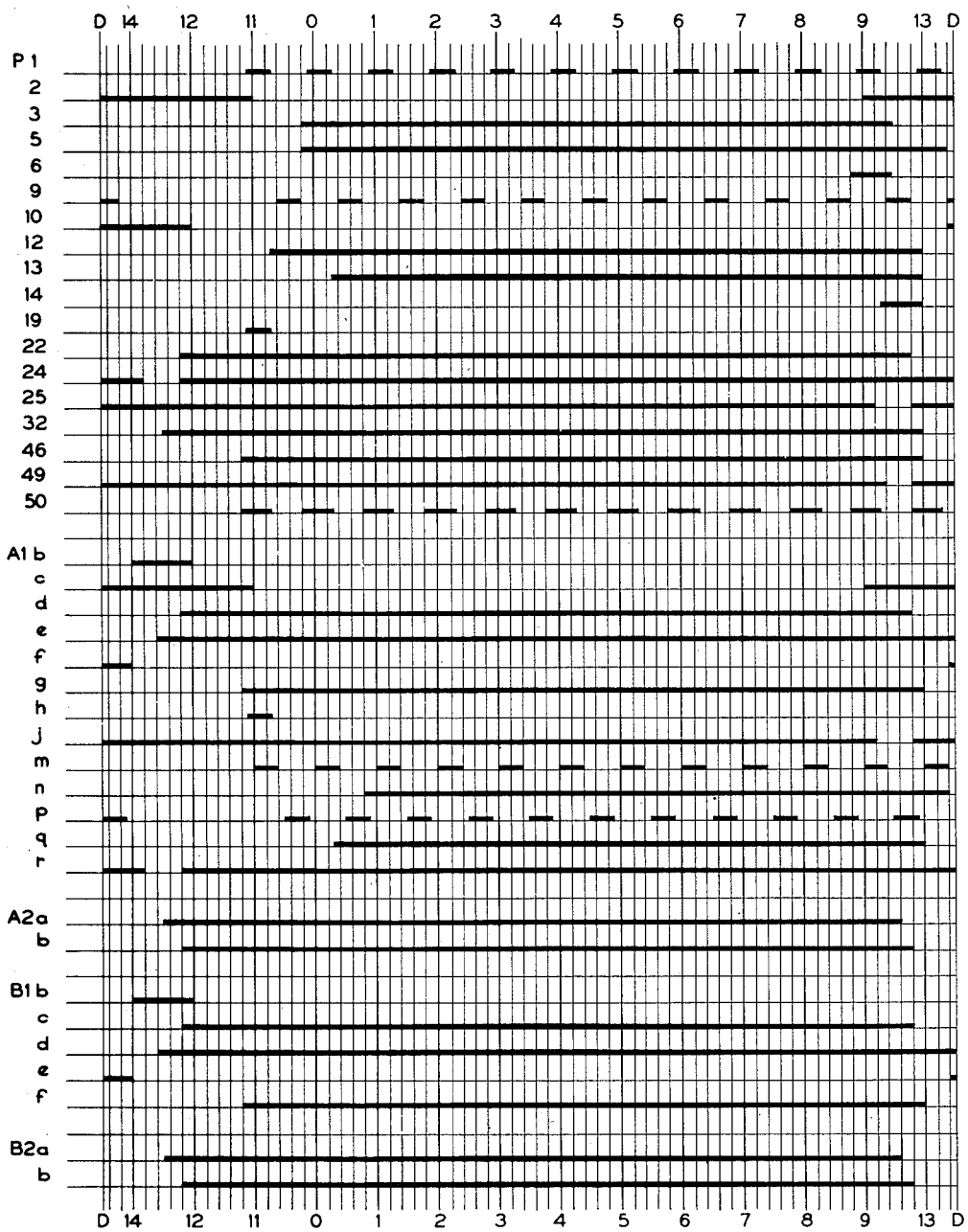
Figures 15B, 18:
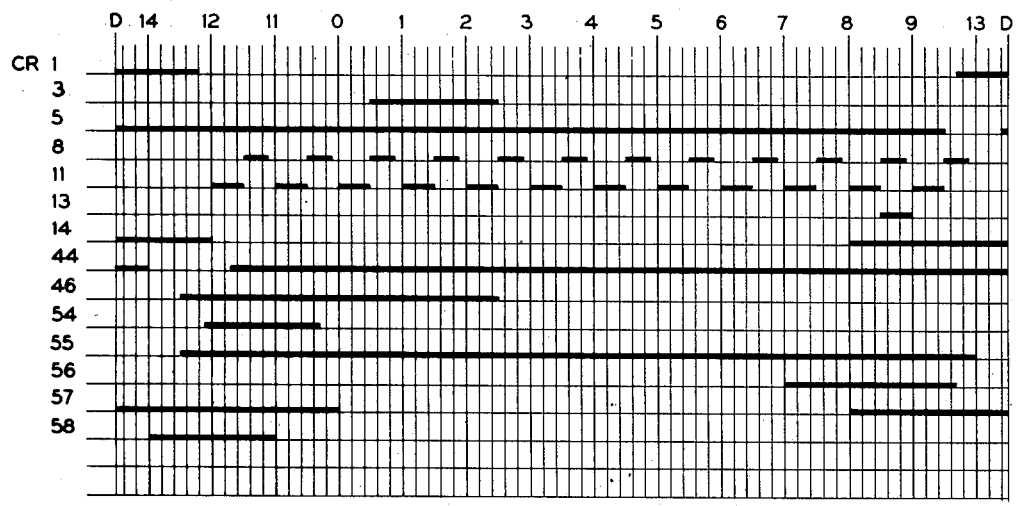

Figs. 15a and 15b together constitute a timing diagram of the machine.

Figs. 16 and 17 are planning charts showing how a problem is carried out by the calculating machine.

Fig. 18 is a diagram of the way in which Figs. 12a to 12j are assembled to make the complete wiring diagram.

Figure 19:
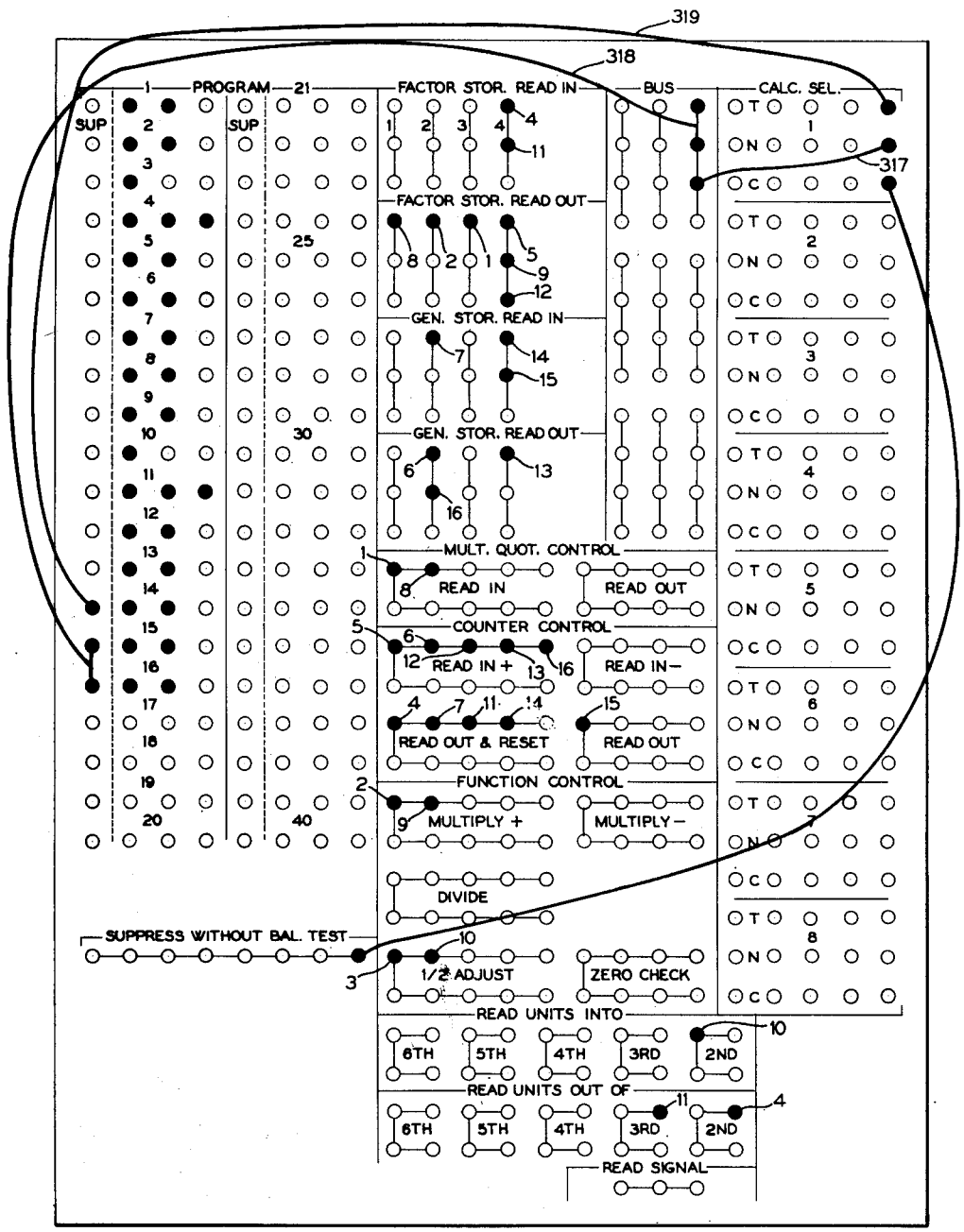

Fig. 19 is a view of the control panel of the calculator, wired for a second problem.

Figure 20A:
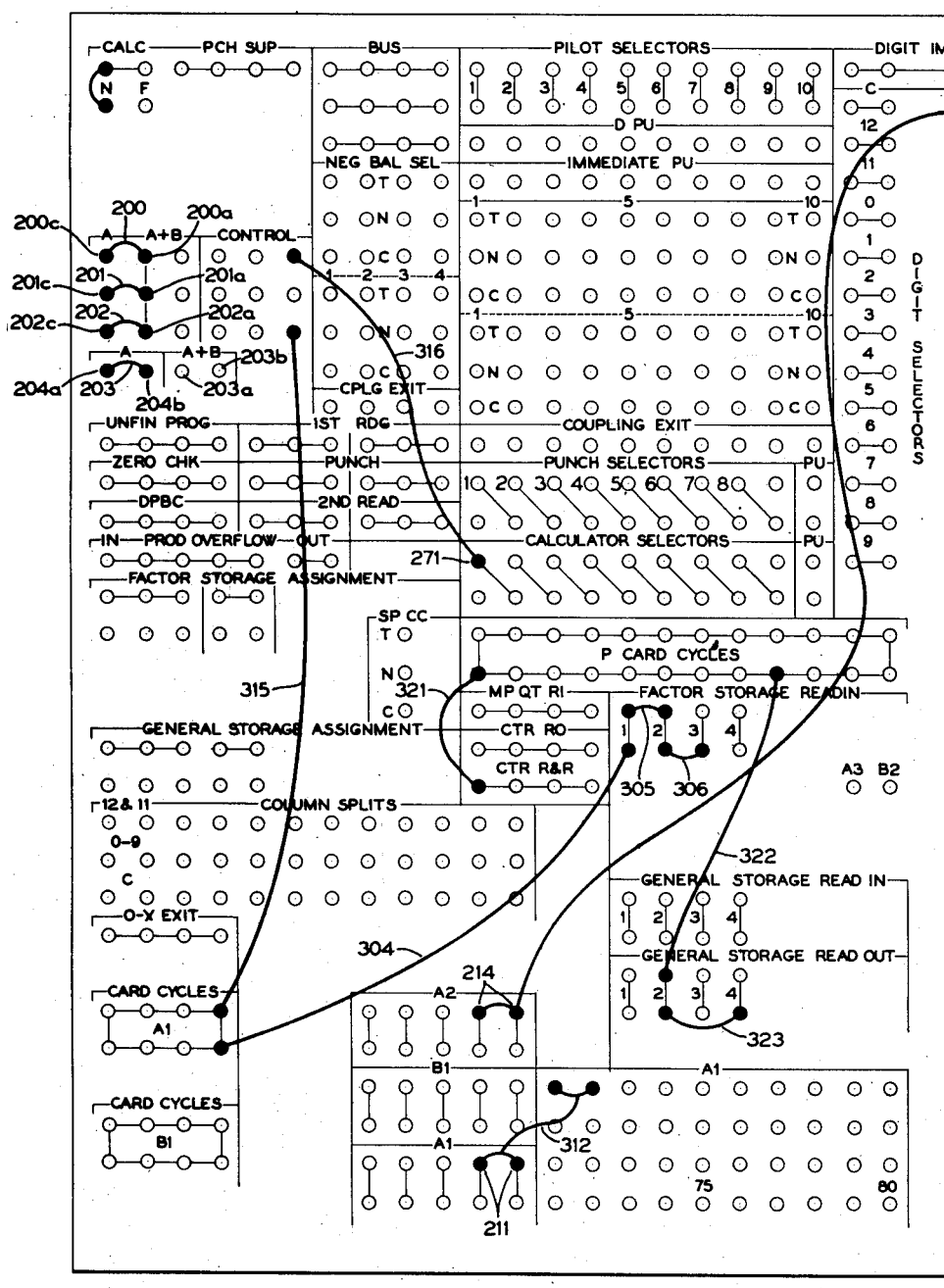
Figure 20B:
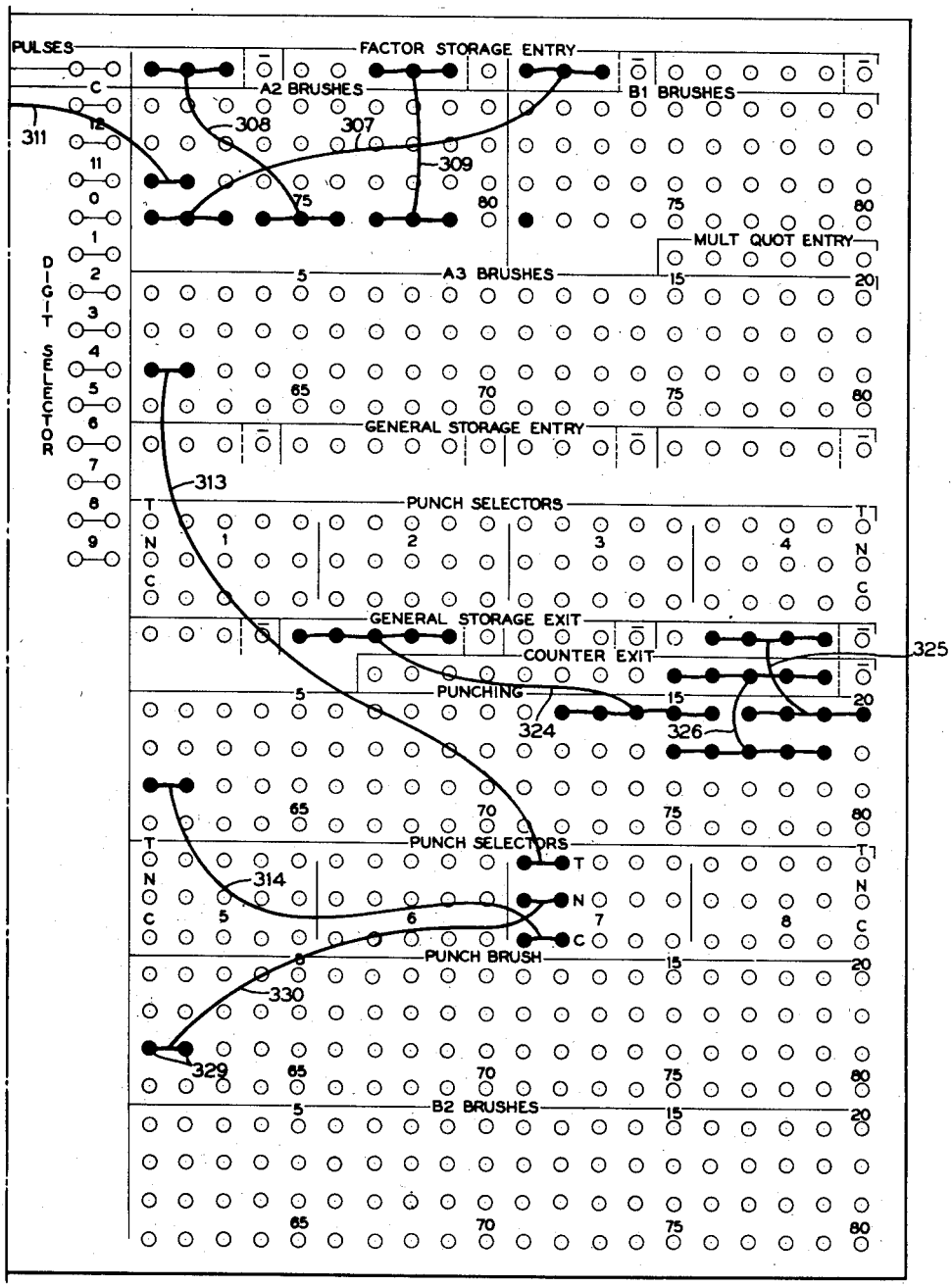

Figs. 20a and 20b, together, show the control panel of the reader and punch wired for the second problem.

Figures 21, 22:
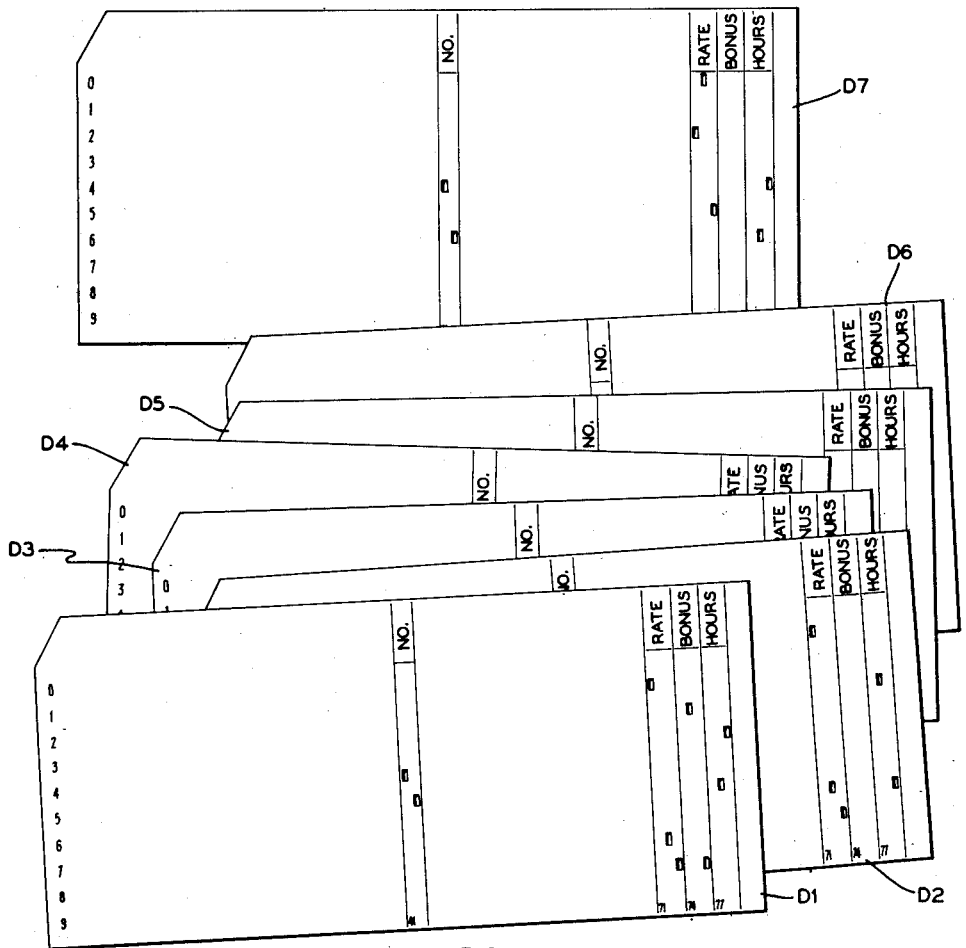

Fig. 21 is a set of detail cards for the second problem.

Fig. 22 is a summary card punched in accordance with the second problem.

Fig. 23 is a chart of the calculator program for the second problem.

Figure 9:
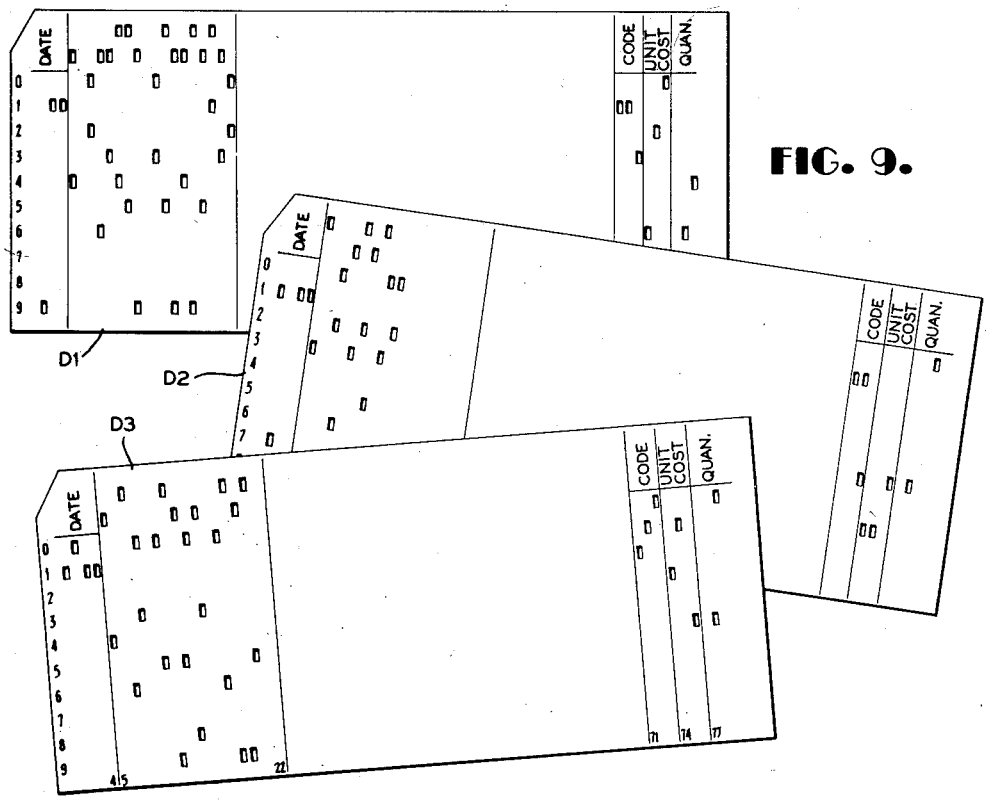
Figs. 9 and 10 are views showing groups of detail cards and master cards respectively.

An illustrative embodiment of the invention shown in the drawing is designed for control by IBM punched cards of the 80 column type. The surface of this card, as indicated in Fig. 9, for example, is subdivided into 80 vertical columns and 12 horizontal index rows. The upper two index rows are called the 12 and 11 rows, respectively, and the next 10 rows are 0, 1, 2, . . . 9. A single perforation in any one of the rows 0–9 represents a corresponding digit. Alphabetic characters are represented by combinations of one digit perforation with a perforation in one of the upper three rows, in accordance with the code shown in Fig. 2 of Doty Patent 2,343,405, for example.

Figure 2A:
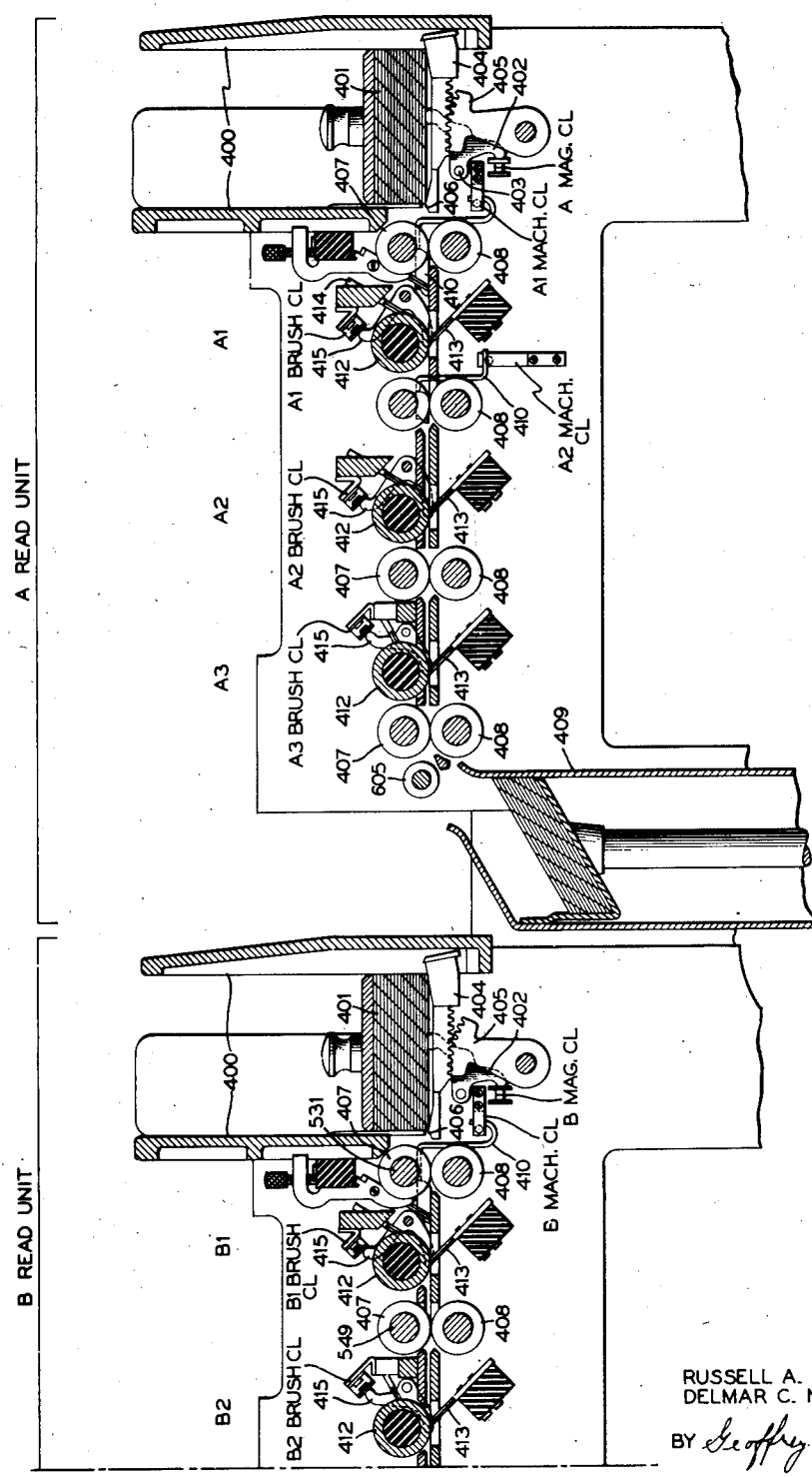
Figure 2B:
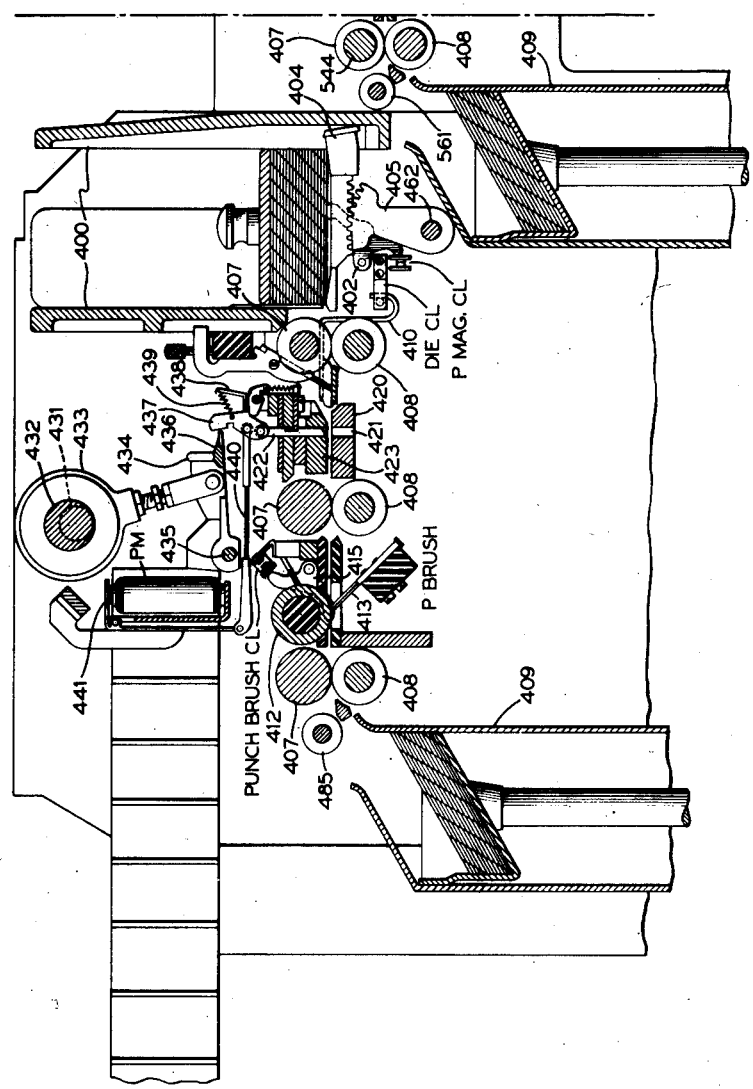
Figure 8:
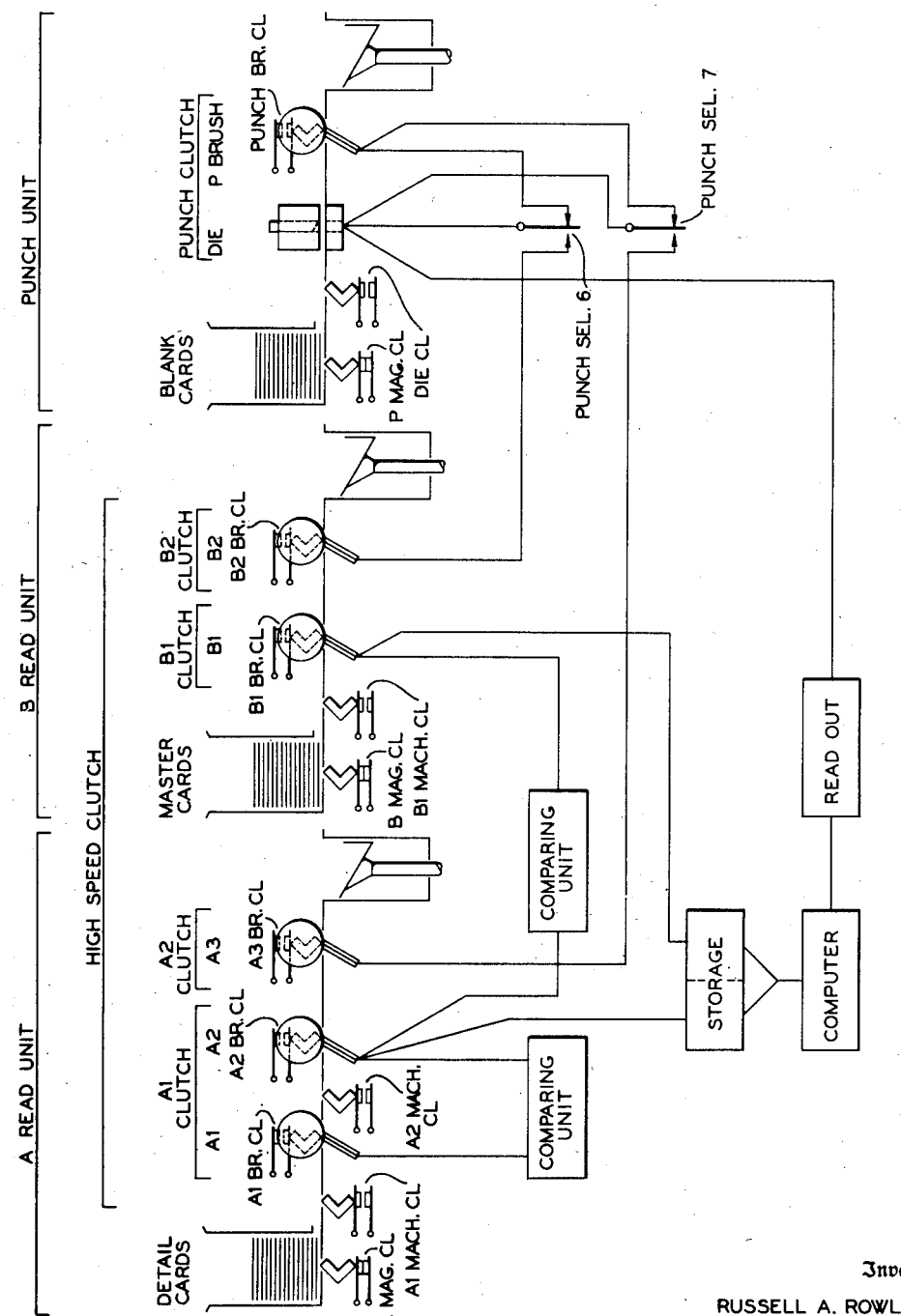
Fig. 8 is a block diagram of the whole machine.

The card handling equipment, as shown in Figs. 2a, 2b, and 8, consist of an A Read Unit, a B Read Unit, and a Punch Unit, sometimes more generally referred to herein as a recording unit, since other types of recording means can be used. Each unit has a magazine, such as 400 of the A read unit, to receive a deck of cards 401. The presence of cards in the magazine is detected by closure of a magazine card lever contact, such as a contact A Mag. CL. This is closed by a magazine card lever 402 pivoted at 403 and normally held up by the spring of the contact against which its lower arm bears, so that its upper arm is in position to be depressed by the bottom card of the deck of cards in the magazine.

When the unit is in operation a picker knife 404 is reciprocated by a pair of crank sectors, one of which is shown at 405, and pushes the bottom card through a throat 406. The card is engaged by a succession of pairs of upper and lower feed rolls 407 and 408 and eventually deposited in a stacker 409.

As a card in the A read unit passes the first pair of feed rolls 407, 408 it operates a card lever 410, which is pivoted, by means not shown, to swing on a horizontal axis so that its lower end closes a pair of contacts A1 Mach. CL. A detail view of this card lever mechanism is shown in Fig. 20 of Daly Patent 2,531,873. On its way to the second pair of feed rolls 407, 408 the card passes between a contact roll 412 and a row of brushes 413 normally bearing on the contact roll. The row of brushes has one brush for each column of the card. This contact roll and row of brushes is identified as the A1 reading station. Current is supplied to the contact roll through a common brush 414. As it passes between the contact roll and row of brushes the card lifts a card lever 415, causing it to close a pair of contacts A1 Brush CL. In passing the second pair of feed rolls 407, 408 the card rocks another card lever 410 to close a pair of contacts A2 Mach. CL.

Between the second and third pairs of feed rolls 407, 408 is the A2 card reading station comprising a contact roll 412 and brush row 413. A card lever 415 at this reading station closes a pair of contacts A2 Brush CL.

Between the third and fourth pairs of feed rolls 407, 408 is a reading station A3 comprising another contact roll 412, row of brushes 413, and card lever 415 operating a pair of contacts A3 Brush CL.

In one machine cycle a card is fed the distance between two adjacent reading stations. When the 12 index row of one card is passing the brushes of the A2 station, the 12 index row of the following card is passing the brushes of the A1 station.

The B read unit resembles the A read unit, except that there are only two reading stations, B1 and B2, a single machine card lever contact, B Mach. CL, and two brush card lever contacts B1 Brush CL and B2 Brush CL.

The punch unit, shown in Fig. 2b, resembles the reading units, in respect to the card feeding means, but in place of the first reading station is a die station. At this station there is a die 420 with 80 holes 421 aligned with 80 corresponding punches 422 guided in a stripper plate 423. The means for operating the punches will be described presently.

Associated with the magazine 400 of the punch unit is a card lever 402 operating a pair of contacts P Mag. CL. Adjacent the first pair of feed rolls 407, 408 is a card lever 410 operating a pair of contacts Die CL.

Between the second and third pairs of feed rolls 407, 408 is a reading station identified as P Brush and comprising the contact roll 412 and row of brushes 413. Associated with this station is a card lever 415 operating a pair of contacts Punch Brush CL.

Drive mechanism

The punch unit is substantially the same as the punch unit of a standard IBM type 513 reproducing punch and is very similar to the punch unit of the perforating machine shown in Lake Reissue Patent 21,133. The difference in the punch unit of the present application will be pointed out in the description proceeds.

Figure 1A:
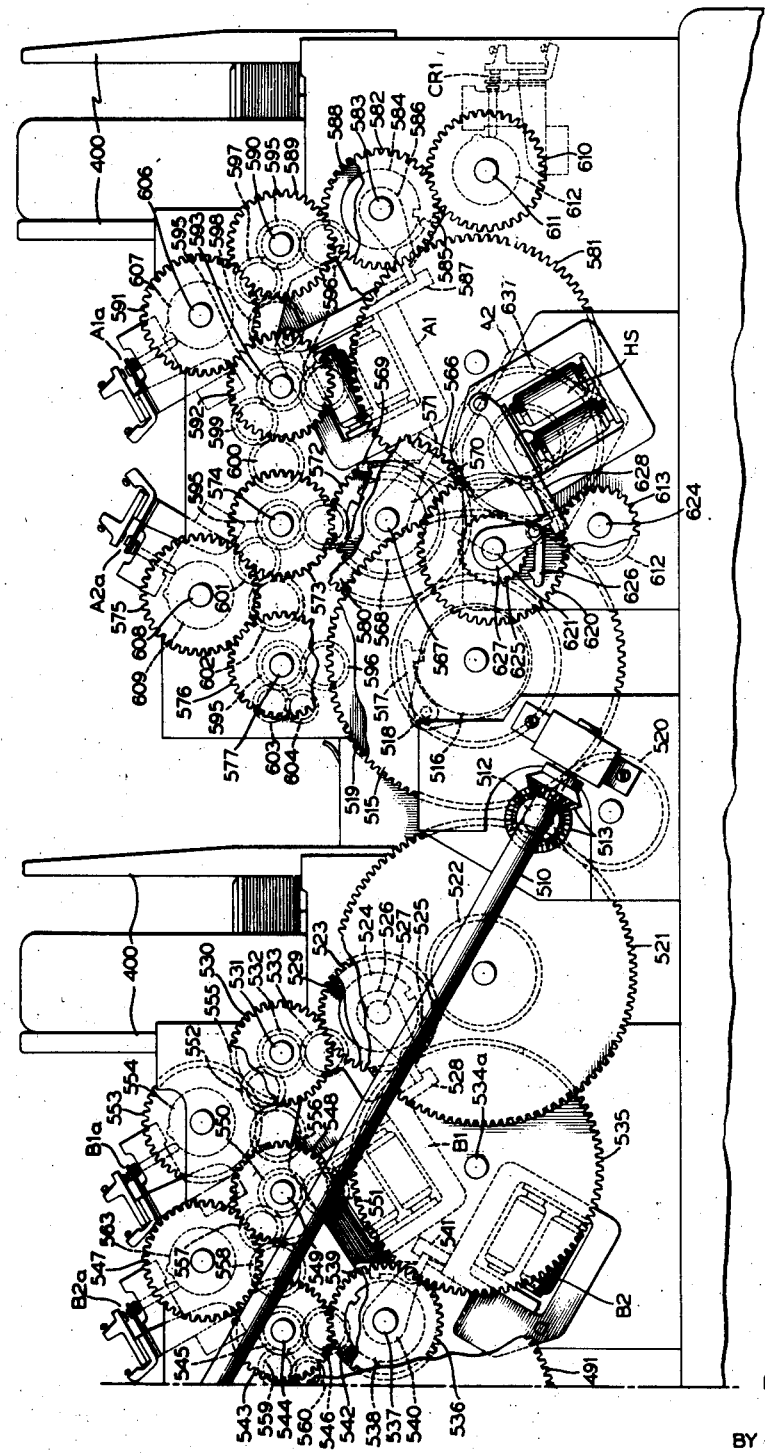
Figure 1B:
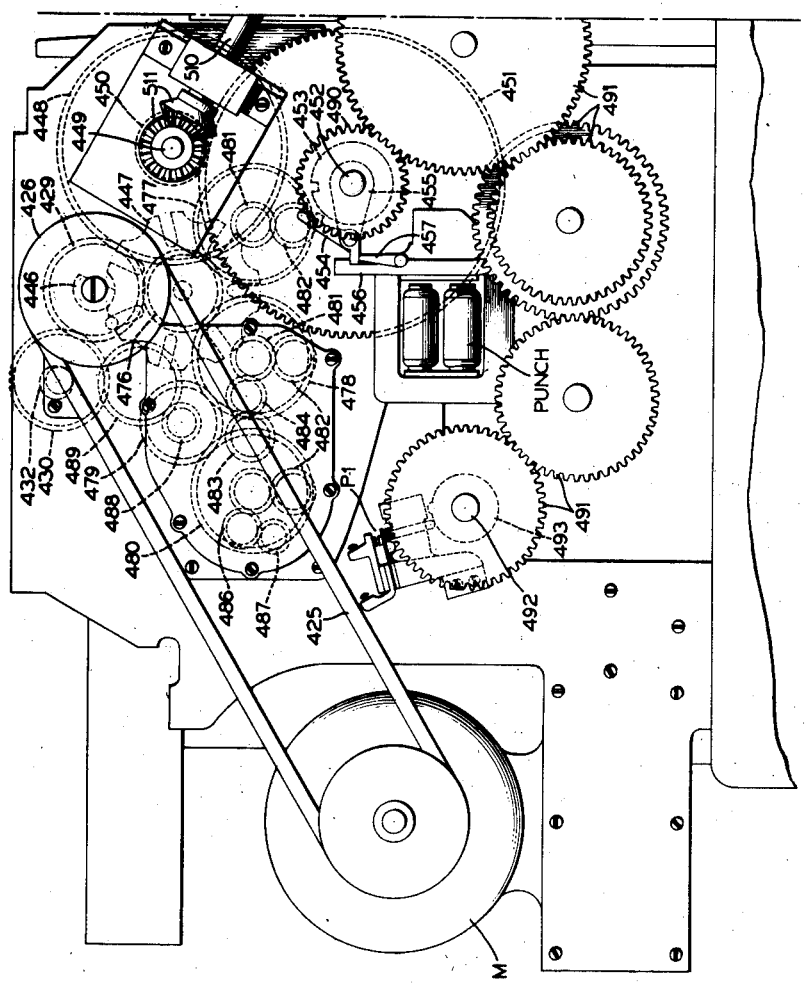
Figure 3:
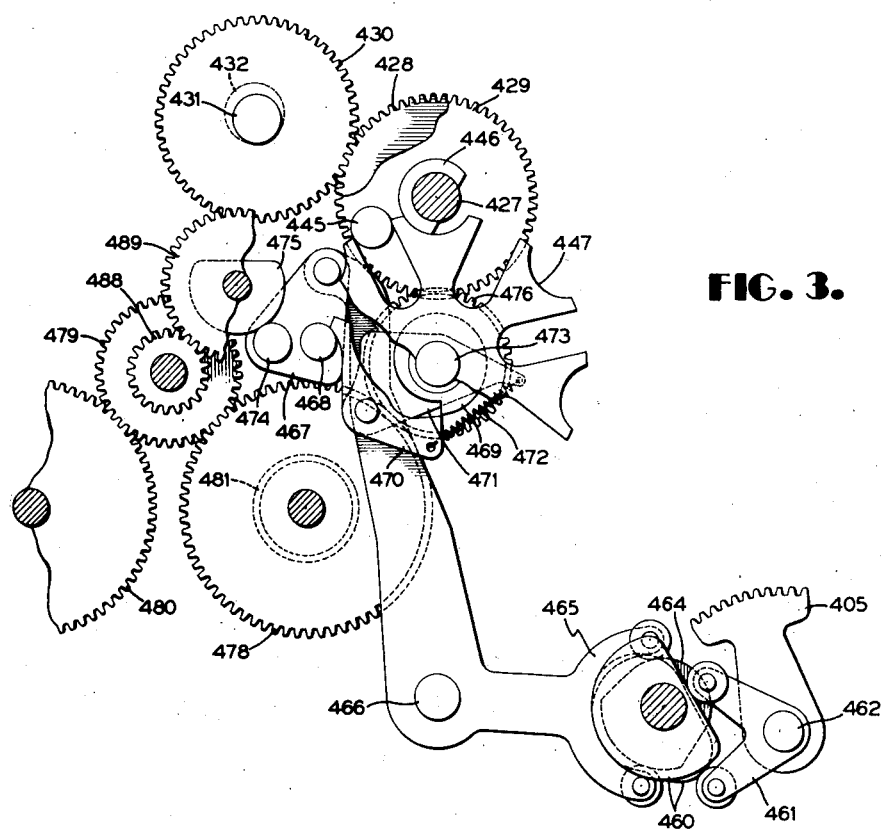
Fig. 3 is a detail view of a part of the punch drive mechanism.

The driving power for the punch unit and the A and B read units is derived from a motor M (Fig. 1b) and is transmitted through a belt 425 to a pulley 426 fixed to a shaft 427 (Fig. 3). Also fixed to this shaft are two gears 428 and 429. The gear 428 meshes with a gear 430 secured to a shaft 431 which carries two eccentrics, such as 432. The straps 433 (Fig. 2b) if these eccentrics are connected to a punch bail 434 pivoted at 435. The tongue 436 of this bail stands in front of a row of 80 links 437 articulated to the upper ends of respective punches 422. The links are held back against a rest 438 by springs 439 so as to be normally out of the path of the bail tongue 436. The links 437 can be rocked into position to be engaged by the bail, as it descends, by respective call rods 440 operated by related magnet armatures such as 441. The armatures are actuated by corresponding punch magnets such as PM, only one of which is fully shown in Fig. 2b, some of the others being diagrammatically represented.

The timing of the punch action will be stated more fully when the operation of the feed rolls has been explained.

The gear 429 has mounted on it a Geneva roller 445 and a Geneva driving gear hub 446. These coact in the well-known manner with a Geneva disc 447, to cause an intermittent motion of the disc with harmonic acceleration and deceleration, the disc being stationary during about two-thirds of the cycle of the gear 429. The Geneva disc has a continuously intermittent motion, as described, and this motion is used to impart an intermittent drive to the feed rolls 407, 408 of the punch unit, but only when called for by the punch clutch, in a manner to be described.

The gear 429 meshes with a large gear 448 (Fig. 1b) fixed to a shaft 449, to which is also pinned a small gear 450. The small gear meshes with a large index gear 451 freely mounted on a shaft 452.

The hub of the index gear has fixed to it a single notch clutch disc 453 which, when the clutch is disengaged, rotates past a clutch dog 454. The clutch dog is mounted on an arm 455 fixed to the shaft 452 and is urged by a spring, not shown, toward the clutch disc 453. When the clutch is disengaged the dog is held away from the disc 453 by its tail, which is caught by a latch 456. The end of the arm 455 is also held by this latch and retained by a keeper 457. The latch 456 can be operated by a magnet, Punch, to release the clutch dog and arm and allow the clutch to engage.

When the clutch is engaged the shaft 452 rotates in clockwise direction. This shaft has mounted on it a pair of complementary cams 460 (Fig. 3), which operate a cam follower assembly 461 secured to the shaft 462 of the punch magazine picker knife crank sectors 405. Accordingly, each time the punch clutch is engaged a card will be fed out of the punch magazine by the picker knife 404.

The shaft 452 also has mounted on it a cam 464 coacting with a follower 465 in the form of a bell crank lever pivoted at 466. The upper end of the lever 465 has pivotally depending from it a triangular plate 467 with a roller 468 which controls the engagement of a Geneva clutch mechanism. Freely mounted on a shaft 473 to which the Geneva disc is fixed is a single toothed ratchet 469. Aligned with this ratchet is a pawl 470 pivoted to an arm 471 fixed to the shaft 473. The pawl 470 is pulled by a spring 472 toward engagement with the single toothed ratchet 469 and rides upon the pheriphery thereof through most of its revolution.

Figure 4:
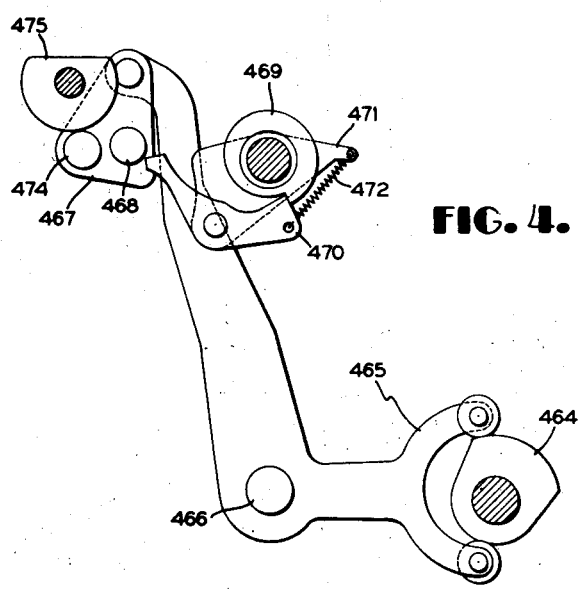
Fig. 4 is a positional view of a part of the mechanism shown in Fig. 3.

When the follower 465 is held stationary, due to the punch clutch being disengaged, the triangular plate 467 is held up in the position shown in Fig. 3. In this position the roller 468 is in the path of the tail of the pawl 470, which tries to deflect the roller, but a roller 474 on the plate 467 is held by the full periphery of a single revolution timing cam 475 (the driving means for which will be described presently), so that the triangular plate 467 cannot swing out of the way when the tail of the pawl 470 strikes the roller 468. When the punch clutch is engaged and the cam 464 turns, the upper arm of lever 465 rocks down to the left, to the position shown in Fig. 4, and the roller 474 moves clear of the cam 475, allowing the roller 468 to be deflected by the tail of the pawl 470. The pawl engages the tooth of the single toothed ratchet 469.

The motion imparted to a card by the feed rolls is a succession of quick movements for the distance from one index row of the card to the next, interspersed with longer dwell times. It is during the dwell times that the punch bail 434 descends and drives any punches engaged with it through the card. Thus the card can be punched in any index position of any column by energizing the punch magnet PM pertaining to that column at the time when the proper index position of the card is at the die.

The shaft 452, which rotates when the punch clutch is engaged, has fixed to it a gear 490. From this gear, through a train of gears 491, a shaft 492 is driven. This shaft has on it cams 493 operating the P cam contacts, one of which P1, is shown. These cam contacts are operated whenever the punch clutch is engaged.

A gear 476 fixed to the ratchet 469 is in mesh with a gear 477 (Fig. 1b) on the shaft of the first feed roll 407 and a gear 478 on the shaft of the second feed roll 407. The gear 478 has a driving connection, through an idler 479, with a gear 480 on the shaft of the third feed roll 407. The feed rolls 407 drive their respective counter feed rolls 408 through gears 481 and 482. The punch brush contact roll 412 is driven by a gear 483 fixed to its shaft, which is driven by an idler 484 in mesh with the gear 481 on the shaft of the second feed roll 407. A punch stacker roll 485 is driven from the gear 481 on the shaft of the third feed roll 407, through an idler 486 and a gear 487 fixed to the shaft of the stacker roll.

It was explained above that the Geneva disc is not clutched to the single toothed ratchet 479 until the punch clutch is engaged. The Geneva disc has 7 slots, while the machine cycle is divided into 14 cycle points, each cycle point corresponding to the motion of the Geneva disc from one slot to the next. Consequently, the Geneva disc makes two revolutions for each machine cycle and the pawl 470, once engaged by the operation of the punch clutch, must remain engaged for two revolutions of the Geneva disc. This is normally taken care of by the fact that the arm 476 normally remains down until the latter part of the second revolution of the Geneva disc and is still down when the tail of the pawl 470 strikes the roller 468 at mid-cycle.

The single revolution timing cam 475 is provided as a precautionary measure to make sure that the feed rolls remain in step with the picker knife, even though the pawl 470 might have been forced out of engagement with the single tooth ratchet because of a jam. The single revolution timing cam is driven by a small gear 488 secured to the gear 479. The gear 488 meshes with a gear 489 having twice as many teeth, the latter gear being fixed to the shaft of the cam 475. At mid-cycle time the flat part of the cam 475 will be down and if left in this position because the pawl 470 was forced out by a jam, while the punch clutch continued to latching position and the arm 465 returned to its upper position, the roller 474 will still be free to move into the flat part of cam 475 and allow the pawl 470 to engage the single tooth ratchet 469 and restore the timing relation of the feed rolls to the picker knife.

Figure 5:
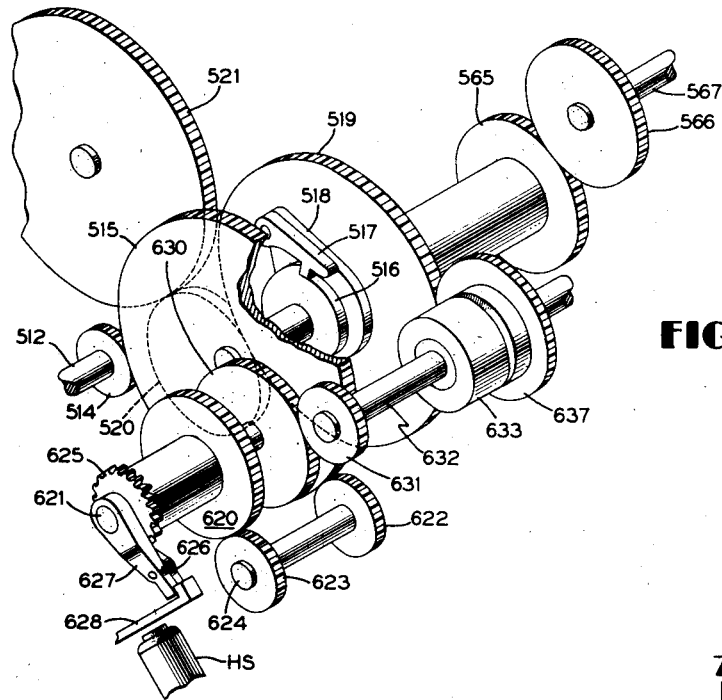
Fig. 5 is a diagrammatic perspective view of a portion of the drive mechanism including the high speed gearing.

The drive to the two reading units is different from the drive to the single reading unit of earlier reproducing types of punches. The shaft 449 is geared to a shaft 510 by bevel gears 511 and shaft 510 drives a shaft 512 through bevel gears 513 at its lower end. A small gear 514 (Fig. 5) on shaft 512 meshes with an index gear 515. The latter gear has pinned to it a single tooth ratchet 516 adapted to drive a dog 517 pivoted to an arm 518, which is pinned to an index gear 519. The latter gear is connected by an idler 520 with a gear 521 having a small gear 522 fixed to it. This gear meshes with a gear 523 to which is secured a single tooth clutch disc 524.

Coacting with clutch disc 524 is a dog 525 pivoted to an arm 526 fixed on shaft 527. The dog and arm are normally latched by an armature 528 of the clutch magnet B1. When this magnet is energized the clutch is engaged and a gear 529 on shaft 527 drives a gear 530 on the shaft 531 of the first feed roll 407 (Fig. 2a) of the B read unit. The lower feed roll 408 of this pair is driven through gears 532, 533.

The gear 523 also meshes with an idler 535 which is in mesh with a gear 536 free on a shaft 537. The gear 536 has pinned to it a single notch clutch disc 538 with which coacts a dog 539 pivoted to an arm 540, which is fixed to shaft 537. The dog and arm are normally restrained by an armature 541 controlled by the magnet B2. When the magnet B2 is energized the clutch engages and a gear 542 fixed to shaft 537 drives a gear 543 secured to the shaft 544 of the third feed roll 407 (Fig. 2b) of the B read unit. The counter feed roll 408 is driven through gears 545, 546.

An idler 547 connects gear 543 with a gear 548 on the shaft 549 of the second feed roll 407 of the B read unit. The related feed roll 408 is driven by gears 550, 551.

Thus, when the B1 clutch magnet is energized the first pair of feed rolls 407, 408 of the B read unit move a card through the B1 read station, while energization of the magnet B2 operates the second and third feed rolls and causes cards to be fed through the B2 read station and into the hopper of the B read unit. The second and third feed rolls always operate when the first feed rolls operate, but the first feed rolls may remain idle when the second and third feed rolls operate, as will be seen later in the course of the description of the wiring diagram.

A gear 552 fixed on the shaft 531 of the first feed roll 407 of the B read unit meshes with a gear 553 on the shaft of a set of contact operating cams 554. These cams operate respective contacts associated with the B1 clutch, such as B1a.

An idler 555 connects the gear 532 of the first pair of feed rolls with a gear 556 on the shaft of the contact roll 412 of the B1 read station. Also, an idler 557 connects the gear 550 with a gear 558 on the shaft of the contact roll 412 at the B2 read station. An idler 559 connects the gear 545 with a gear 560 on the shaft of a stacker deflecting roll 561 (Fig. 2b) of the B2 read unit.

The previously mentioned gear 547 is mounted on the shaft of a set of contact operating cams 563, which operate a set of cams associated with the B2 clutch, such as B2a.

The gear 519 (Figs. 1a and 5) has secured to it a gear 565, which meshes with a gear 566 freely rotating on a shaft 567. Secured to the gear 566 is a single notch clutch disc 568, with which coacts a dog 569. This dog is pivoted to an arm 570 fixed to the shaft 567. The dog and the arm are normally latched by an armature 571 controlled by a magnet A2, only the yoke of which is visible in Fig. 1a. When the magnet is energized the clutch is engaged and a gear 572 fixed on shaft 567 drives a gear 573 secured to the shaft 574 of the third feed roll 407 of the A read unit. The gear 573 is connected by an idler 575 with a gear 576 fixed to the shaft 577 of the fourth feed roll 407 (Fig. 2a) of the A read unit.

The gear 566 has pinned to it a gear 580 identical to the gear 572, which is connected by an idler 581 to a gear 582 freely mounted on a shaft 583. A single notch clutch disc 584 fixed to the gear 582 has coacting with it a clutch dog 585 pivoted to a clutch arm 586, which is fixed to the shaft 583. The dog and clutch arm are normally restrained by an armature 587 of a magnet A1. When the magnet is energized the clutch is engaged, and a gear 588 fixed to the shaft 583 drives a gear 589 on the shaft 590 of the first feed roll 407 of the A read unit. An idler 591 connects the gear 589 to a gear 592 on the shaft 593 of the second feed roll 407 of the A read unit.

All of the upper feed roll shafts of the A read unit are connected to the shafts of the lower feed rolls 408 by gears 595 and 596. The gear 595 on the shaft 590 is connected by an idler 597 with a gear 598 on the shaft of the contact roll 412 of the A1 read station. The gear 595 on the shaft 593 is connected by an idler 599 with a gear 600 on the shaft of the contact roll 412 of the A2 read station. The gear 595 on the shaft 574 is connected by an idler 601 to a gear 602 on the shaft of the contact roll 412 of the A3 read station. The gear 595 on the shaft 577 is connected by an idler 603 with a gear 604 on the shaft of a stacker eject roll 605 (Fig. 2a).

Thus, whenever the magnet A1 is energized the first and second feed rolls of the A read unit operate and feed cards through the A1 and A2 read stations. Whenever the magnet A2 is energized the third and fourth feed rolls of the A read unit operate and feed cards through the A3 read station and to the stacker. The magnet A2 is always energized when the magnet A1 is energized, but is sometimes energized without the magnet A1 being energized, as will be seen later in the course of the wiring diagram description.

Secured to the shaft 606 of the gear 591 is a set of cams 607 which operate respective cam contacts, such as A1a, pertaining to the A1 read unit. Secured to the shaft 608 of the gear 515 is a set of cams 609 which operate respective cam contacts such as A2a pertaining to the A2 read unit, the gear 582 meshes with a gear 610 on a shaft 611 bearing a set of cams 612 which operate respective cam contacts such as CR1. These cam contacts are operated continuously while the motor M is running.

*High speed drive*

Figure 6:
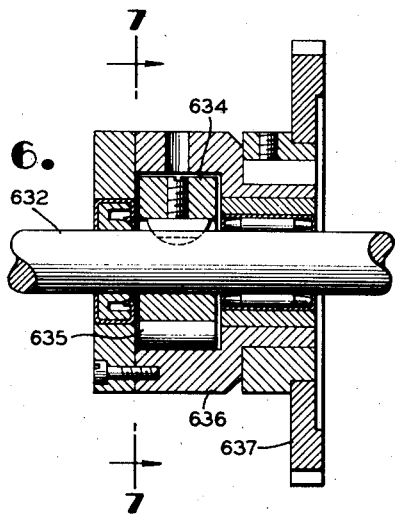
Fig. 6 is a longitudinal section of the overrunning clutch which forms part of the high speed gearing.
Figure 7:
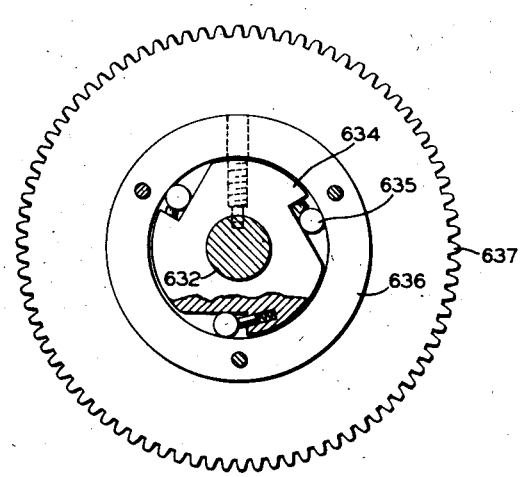
Fig. 7 is a transverse section on the line 7—7 of Fig. 6.

When the read units are operated without the punch unit they run at twice normal speed, namely, at 200 cards a minute. For this purpose an overrunning clutch mechanism is provided as follows:

A gear 620 (Figs. 1a and 5) freely mounted on a shaft 621 is driven from gear 515 through gears 622 and 623 pinned to a shaft 624. Fixed to the gear 620 is a ratchet wheel 625 with which coacts a clutch dog 626. This dog is pivoted to an arm 627 fixed to the shaft 621 and the dog and arm are normally restrained by an armature 628 operated by a high speed magnet HS. The gear ratios are such that when the magnet HS is energized and the clutch is engaged the shaft 621 turns at twice the speed of the gear 515. A gear 630 fixed to shaft 611 drives a gear 631 at four times the speed of the index wheel 515. The gear 631 is pinned to a shaft 632 which has mounted on it a conventional over-running clutch assembly 633. This comprises a notched disc 634 (Figs. 6 and 7) keyed to the shaft 632, in the notches of which disc are rollers 635 surrounded by a clutch race 636 fixed to a gear 637 in mesh with the gear 519. When the shaft 632 is driven counterclockwise at four times the speed of the index wheel 515 the rollers 635 wedge against the race 636 and drive the gear 637 at four times the speed of the index wheel 515. The 1 to 2 gear ratio of the gear 637 to the gear 519 causes the latter to be driven clockwise at twice the speed of the index wheel 515, so that the dog 517 ratchets over the single tooth ratchet 516. Through the drive mechanism previously described the A and B read units are therefore operated at twice normal speed.

*General diagram*

Reference will now be made to Fig. 8 for a review of the card feeds and a general description of the associated mechanisms.

As this figure shows, the illustrative machine comprises an A read unit for reading detail cards, a B read unit for reading master cards, and a punch unit for punching blank cards. The blank cards may, of course, be prepunched in certain fields.

The detail cards will ordinarily be punched in one field with code numbers designating a class and the cards will have been sorted so that cards having the same class code will be grouped together. The groups will usually be arranged in an ascending or descending code series.

The A1 and A2 reading stations operate in unison, under control of the A1 clutch. As two cards pass concurrently through the A2 and A1 reading stations their class codes are compared in a comparing unit, to be described later. When a difference is detected it shows that the following card belongs to a different class or group and generally causes some control function to take place before the first card of the new class is read at the A2 station.

The master cards will ordinarily be punched with class codes corresponding to the detail cards, with one master card for each group of detail cards and with the same sequential arrangement. As a master card passes the B1 reading station it is compared in a second comparing unit with the card passing the A2 reading station. A disagreement in this comparing unit indicates an error and stops the machine.

From the cards passing the A2 and B1 reading stations factors are read into electronic storage means of the calculating machine. Computed results are read out of the calculating machine to the punch and punched in blank cards passing through the die.

At the same time results are being punched under control of the calculator read out means, additional information (usually called indicative information) can be reproduced into the card passing through the die, under control of a card passing through the A3 read station, or a card passing the B2 read station, or under control of both of these cards. For this purpose the A2 clutch, or the B2 clutch is operated, or both are operated, concurrently with an operation of the punch clutch, while the A1 and B1 clutches remain idle. At this time punch selector 7 will be energized, if the indicative information is to be reproduced from the card at the A3 station; or punch selector 6 will be energized, if the indicative information is to be reproduced from the card at the B2 station; or both selectors may be energized, for concurrent reproduction.

If another punch cycle follows, without an intervening read cycle, punch selectors 6 and 7 will be deenergized and indicative information on the preceding card passing through the punch brush station, P Brush, will be "gang" punched into the following card. Punch selectors 6 and 7 are controlled by the card lever contacts B2 Br. CL and A3 B. CL, respectively, to set up the reproducing circuits, whenever there is a card at B2, or A3, and to restore the normal gang punching circuits when there are no cards at these stations; a condition which always exists when the B1 and A1 clutches remain idle while the B2 and A2 clutches run.

The High Speed Clutch is engaged on every reading unit cycle which is not also a punch unit cycle. This causes the reading unit, or reading units, to operate at double speed, to read factors into the electronic storage units. A punch cycle calls for normal speed of the read units, to provide the synchronization required for reproducing.

*Electronic calculator*

The electronic calculator is similar to one fully disclosed in the copending application of R. L. Palmer et al., Serial No. 38,078, filed July 9, 1948. It comprises an arrangement of triggers, switch tubes, power tubes, inverters, and a multivibrator.

A trigger is a circuit comprising two vacuum tubes interconnected so that either one may be conducting and the other will be off. The trigger can be switched from one condition to the other by applying a minus pulse to the grids of both tubes; by applying a plus voltage condition to the grid of the non-conducting tube, or by removing the bias from the grid of one tube for resetting the trigger to a normal condition. The words "minus" and "plus" are used in this specification in a relative sense, meaning not necessarily a change to a negative voltage, or to a positive voltage, but rather a shift in the minus or plus direction from a previous voltage.

A switch tube is a tube having two control grids and requiring a plus condition on both grids to make the tube conduct. A switch may also consist of two inverters, generally two halves of the same tube, with plates commoned, but separate controls on their grids.

The multi-vibrator supplies the basic operating pulses for the calculator. There is a series of "A" pulses occurring at the rate of 50,000 per second, and a series of B pulses occurring at the same rate, but 180° out of phase with the "A" pulses. The pulses operate a primary timer circuit, which is a series of triggers interconnected in a so-called "ring circuit" so that only one trigger will be on at any one time and the other will be off. The circuit is reset to a condition where the first trigger of the ring is on and when A pulses are applied the triggers are switched on in succession, each trigger being switched off as the next one is switched on. The ring is the same as one disclosed in Overbeck patent, No. 2,404,918.

The primary timer is a ring of 23 such triggers, as shown at 161 in Fig. 10g, and is advanced by —A pulses applied to its ring drive bus 162. It has tapped outputs from the various triggers to produce pulses or voltage conditions at certain times in the primary cycle. These are used for controlling gating circuits to transmit a definite number of A or B pulses to a circuit element, or to operate a circuit element directly.

The circuits disclosed in the present application do not include the said gating circuits, nor the means for generating A and B pulses. These are shown in said application, Serial No. 38,078. In the wiring diagram of the present application A and B pulse and gate pulse inputs will be identified by legend, indicating their timing by reference to the electronic primary cycle steps on which they begin and end, and whether on the A or the B phase. For example a legend —(3A–8B)G refers to a minus gate pulse which begins at 3A time and ends at 8B time of the primary cycle. Similarly, a legend (11B–19B)P refers to a source of eleven B pulses which begin at 11 time of the primary cycle.

The calculator circuit comprises electronic counters, each consisting of a group of four triggers interconnected so as to go through a sequence of combinational conditions in binary fashion, the sequence being however modified so that on the tenth step the counter gives an output pulse and returns to the zero condition.

Several counters are combined with carry means to form an electronic accumulator. There may be any desired number of counters in the accumulator, the circuit of this application showing 2, by way of illustration. The accumulator is the part of the circuit where the results of calculations are formed. In the commercial IBM electronic calculator the accumulator is generally referred to as the "counter" and this term, which is used on the control panel to identify some of the plug hubs, will be used in this sense at times in the present specification, for readier reference to the commercial machine.

There are also storage devices composed of electronic counters not interconnected by carry means, such as the factor storage (FS) and general storage (GS) devices referred to particularly herein.

A commercial electronic calculator, as disclosed in said application, Serial No. 38,078, comprises circuits for carrying out the four mathematical operations: addition, subtraction, multiplication, and division. In the present application only the circuits for addition are shown, by way of illustration.

The internal programming of the calculator is controlled by program means having pluggable hubs shown at the left side of Fig. 11, which is the control panel of the calculator. There are two vertical columns of program hubs shown, under the heading "Program." Each program step has three pluggable hubs in a horizontal row. The numbers 1, 2, 3, etc., indicate the groups of plug hubs pertaining to the different program steps. At the left end of each horizontal row of program hubs is a program suppress hub. These hubs are arranged in two vertical columns labeled Sup.

The program hubs can be connected by plug wires to function control hubs in the center of the panel. For example, one program 4 hub is connected to a hub entitled "Factor Store Readout —2." The connection is indicated by a number 4 beside one of the latter hubs and the fact that this hub and one of the program 4 hubs is darkened.

The purpose of the program suppress hubs is to control the suppression of the program steps selectively, so that different sequences of program steps can be made to occur in different calculate cycles. A program suppress hub is made effective by connecting it to one of the "Suppress Without Bal. Test" hubs. The connection is made through the hubs of a calculator selector. The calculator selector hubs are shown at the right side of the control panel diagram. There are 8 calculator selectors and each has 5 groups of hubs. When the relay magnet controlling a calculator selector is energized all of the hubs in the bottom row labeled C (common) are in contact with respective hubs in the top row labeled T (transferred). When the relay magnet is de-energized the C hubs are connected to the middle row of hubs labeled N (normal).

An example of wiring for program suppression is shown in Fig. 13. For example, the program suppress hubs for programs 4 and 5 are connected by a plug wire 241 to bus hubs 242, which are connected by a wire 243 to a T hub of calculator selector 2. The related C hub is connected by a plug wire 244 to a bus hub 245, which is connected by a plug wire 246 to one of the Suppress Without Bal. Test hubs. The effect of this wiring is to suppress programs 4 and 5 whenever calculator selector 2 is operated. At other times these programs are active.

A block diagram of the wiring of the program unit is shown in Fig. 12g. It comprises a vertical series 247 of triggers, which are connected in a network in such a way that there will always be one trigger in the on condition, while all the others will be off. The triggers are connected to a reset bus 35, which supplies a minus 100 volt bias, in such a way that when the bias voltage is removed from this bus all of the program triggers except the one at the top, labeled PGH, will be switched off, while the PGH trigger will be switched on. From this normal condition each trigger in succession is switched on by the application of minus 2AB pulses to a program ring drive bus 249. When a minus pulse occurs on this bus the left grids of all the triggers receive the pulse through condensers and the trigger which is on is switched off. In doing so it transmits from its right plate a minus pulse through a condenser to the right grid of the following trigger, switching this trigger on. The program unit is an open end ring, which means that the turning off of the last trigger does not turn on the first trigger. The first trigger PGH is turned on by removing the bias voltage from the resetting bus 35, as previously described. The turning off of the last trigger is used, however, for a program end signal, the effect of which will be referred to later.

When the program 1 trigger, for example, is switched on a minus condition on its left plate is extended to the left grid of a double inverter 2-IB. The plates of this double inverter are commoned and connected to the grids of 3 inverters 2-IAI, 2-IA2, 2-ICI, in parallel. Plus voltage applied to these grids when the step 1 trigger is switched on causes minus voltage to be extended from their plates to the program 1 hubs 250. It is the minus condition on these hubs which is utilized to control the functions during program 1.

The program 1 suppress hub is connected to the right grid of the double inverter 2-IB. When this hub is connected to a source of plus 50 volt potential it holds the right plate of the double inverter at a minus voltage and prevents it from rising in response to a minus applied to the left grid of the double inverter, from the program 1 trigger. Thus the turning on of the program 1 trigger has no influence on the voltage at the program 1 hubs 250.

The wiring of the calculator selectors is shown at the left end of Fig. 12g. A plus 50 volt source is connected by plug wires 251 and 252 to the common hubs C of calculator selector 2 and calculator selector I. The contacts of these selectors are controlled, respectively, by relay magnets R17 and R76, the circuits for which will be explained later. When R17 is de-energized plus 50 volts is extended through R17b and a plug wire 253 to the suppress hubs of programs 6 to 11 inclusive. Thus, in the normal condition of calculator selector 2 these programs will not be active. The transferred hub T of calculator selector 2 is connected by a plug wire 254 to the suppress hubs of programs 4 and 5. These programs are accordingly suppressed when calculator selector 2 is energized. The transferred hub T of calculator selector I is connected by a plug wire 255 to the program 1 suppress hub and thus this program hub is eliminated when calculator selector I is energized.

*Read-in from card to electronic storage*

When a number is to be read from a card into a storage unit of the electronic calculator a signal is first sent from the read unit to the particular storage unit of the calculator which is to receive the number. This signal resets the storage unit and prepares it for read-in of the number. For example, if a number is to be read from brush station A2 of the reading unit A into storage unit FS2 of the calculator, a signal is transmitted from LI through R225b (Fig. 12e), cam contact bus 163, cam contact Alg at 12.7, AI Card Cycles hub, plug wire 165, FS2 RI hub, R221a, closed from 14.9 to 11.7, wire 26, through a resistor, to the left grid of an entry control trigger 4-IF (Fig. 12i), switching this trigger on. A connection from the right plate of 4-IF through a condenser to the grid of an inverter 4-5M causes a minus output from the plate of this inverter to the grid of the reset power tube 4-7M of FS2. The plate of this tube is connected to the minus 100 volt reset line of the triggers of the storage counters of FS2. This reset line is normally maintained at a bias of minus 100 volts by means described in said application, Serial No. 38,078. When the plate of the tube 4-7M rises toward ground potential, as a result of the resetting impulse just mentioned, the triggers of FS2 are switched to the normal condition, representing the value zero. The normal minus 100 volt bias is immediately restored to the reset line of the triggers, to prepare them for operation in response to input pulses.

The plus pulse on wire 26 also passes through resistors to the left grids of entry triggers 4-IK and 4-IL of FS2, switching these triggers on. A plus potential on the right plate of each of the entry triggers is applied to the grids G2 of read-in switch tubes 4-2K and 4-2L, respectively.

The grids GI of the switch tubes 4-2K and 4-2L are connected through a condenser to a read-in pulse wire 166 leading from the plate terminal of a read-in pulse inverter 1-9L. The grid of this inverter is connected by wire 167 to the left plate of a read-in pulse trigger 1-8L.

At 0.3 Alq (Fig. 12e) closes to transmit the first of 10 mid-index pulses from Alp through wire 25 to the left grid of read-in pulse trigger 1-8L. The first pulse switches this trigger to the left at 0.5.

A minus pulse from the left plate of trigger 1-8L is transmitted to the grid of inverter 1-9L, which passes a plus pulse through a condenser to the grids GI of the switch tubes 4-2K and 4-2L.

Considering 4-2L, for example, the first read-in pulse is transmitted as a negative pulse from its plate to stage 1 of the units order counter of FS2. This counter, which was reset to zero in the manner described above, advances to 1 as a result of this pulse.

At 0.8 Aln (Fig. 12e) closes, to transmit the first of 10 index line pulses from Alm through line 3 to the right grid of read-in pulse trigger 1-8L, turning the trigger off.

The trigger 1-8L is switched to the left and then to the right 9 more times, in response to the alternating mid-index and index line pulses applied to its left and right grids. Each time it switches to the left a pulse is transmitted through the switch tube 4-2L to the units counter of FS2. The number of pulses transmitted depends upon when an impulse arrives from the card to turn off trigger 4-IL. For an example to be described later the right grid of trigger 4-IL is connected through wire 31, FS2 entry hub 168 (Fig. 12d), plug wire 169, A2 Brush hub 170, to the A2 brush pertaining to column 79. If a hole is read by this brush at 7 index time there will have been 7 pulses delivered to the units order counter of FS2 before 4-IL is switched off by the plus pulse from the brush. The other 2 pulses are blocked at the switch tube 4-2L. At the end of read-in time the units order counter of FS2 therefore stands at 7.

*Resetting of triggers*

Certain function control triggers, such as the read-in impulses trigger 1-8L and the read out impulse trigger 1-8F, which are operative during read-in and read-out time, are reset during the calculating portion of the cycle. The right grid of each of these triggers is connected through a resistor to a wire 33 leading through cam contacts Alr and P24, in series, to a minus 100 volt source. Through this wire a minus 100 volt bias is normally maintained on the right grids of the trigger 1-8L and 1-8F, but when either Alr or P24 opens at 14.2, the minus 100 volt bias is removed from said right grids, causing them to switch to the state of conducting on their right sides. The closure of the cam contact which opened immediately restores the normal minus 100 volt bias.

Certain other function control triggers, such as the primary timer triggers and the program triggers, which are operative during calculate time of the cycle, are reset during the read-in and read-out time. The right grids of all of the triggers of the primary timer, except the stage 1 trigger, are normally biased to minus 100 volts through wire 35 and cam contacts P25 and A1j. When either of these cam contacts opens at 9.2, depending upon whether the punch unit or the A read unit is running, the minus 100 volt bias is removed from the reset bus, allowing all of the triggers of the primary timer, except the stage 1 trigger, to switch to the right. The reset bus is connected to the left grid of the stage 1 trigger and this trigger accordingly switches to the left when the cam contact P25 or A1j opens. The resetting of the program triggers is also controlled by the bias potential on reset bus wire 35, as previously mentioned.

*Start of calculation*

The cycle of the machine group is subdivided into a read-in and read-out time extending from 12.7 to 13 and a calculate time extending from 13 to 12.7. The beginning of the read-in and read-out portion of the cycle is determined by the closure of cam P46 (Fig. 12e), or cam A1g, or both, depending upon whether the punch feed or the A read unit, or both, are operating. Calculate time begins when either of these cam contacts opens, or when both of them open.

The start of read-in time by the closure of cam contact A1g has been described under the heading "Read-in from Card to Electronic Storage." The opening of this cam starts calculate time by applying a minus voltage change through wire 9 to the right grid of a double inverter 1-9D (Fig. 12g). The right plate of this double inverter is connected to its left grid and its left plate is connected to the left grid of a double inverter 1-9J, whose left plate is connected to its right grid. This double inverter is of the type which has its left plate supplied with B plus potential (+150 v.) through a load resistor (not shown) but its right plate is supplied through the load resistor (not shown) of the left plate of trigger 1-10E, to which it is connected. The minus voltage change transmitted to the left plate of 1-10E through the double inverters 1-9D and 1-9J causes a minus pulse to be transmitted through internal condenser coupling in the trigger to its right grid, switching 1-10E on. A minus pulse from a tapped output of the left plate of 1-10E is transmitted through a condenser to the right grid of compute stop trigger 1-5M. This trigger is switched on and a plus on its right plate is extended to the grid G2 of start-stop switch 1-5L. Plus A pulses applied to the grid G1 of 1-5L are transmitted as minus pulses to the ring drive bus of the primary timer. The primary timer steps from one stage to the next as long as minus A pulses are supplied to its ring drive bus.

If the punch unit is operating instead of the A read unit, calculation will start when cam contact P46 opens and a minus condition is transmitted through wire 1 and two double inverters 1-6M and 1-9G (with connections identical to 1-9D and 1-9J) to the left plate of start trigger 1-10E, starting calculation in the same way as previously described.

*Program end circuits*

The control panel of the calculator shows 40 programs, but in the present example the machine is wired to terminate the program at the end of program step 20. When the stage 20 program trigger switches off a negative pulse is transmitted through a condenser to the right grid of a program end trigger 2-11J. This trigger is switched on and a plus condition on its right plate prepares a switch 2-11H to pass the next 1B pulse applied to its grid G1. This will occur at the end of the primary cycle following the switching off of the twentieth stage trigger of the program circuits. A minus pulse is transmitted from the plate of 2-11H through a condenser to the right grid of a trigger 2-8J. This trigger switches on and a plus from its right plate is inverted by 2-7J and applied to the left grid of compute stop trigger 1-5M, switching this trigger off. A minus on the right plate of 1-5M shuts off switch 1-5L stopping the transmission of A pulses to the primary timer. The pulse from the plate of switch 2-11H also passes through a condenser to the left grid of trigger 2-11J, switching this trigger off and restoring a minus potential to the grid G2 of 2-11H.

*Electronic transfer from one storage unit to another*

A number can be read from any storage unit to any other storage unit. Since numbers in storage units are stored in the form of true numbers, the read out from one to another is done by a so-called "true transfer."

Figure 12B:
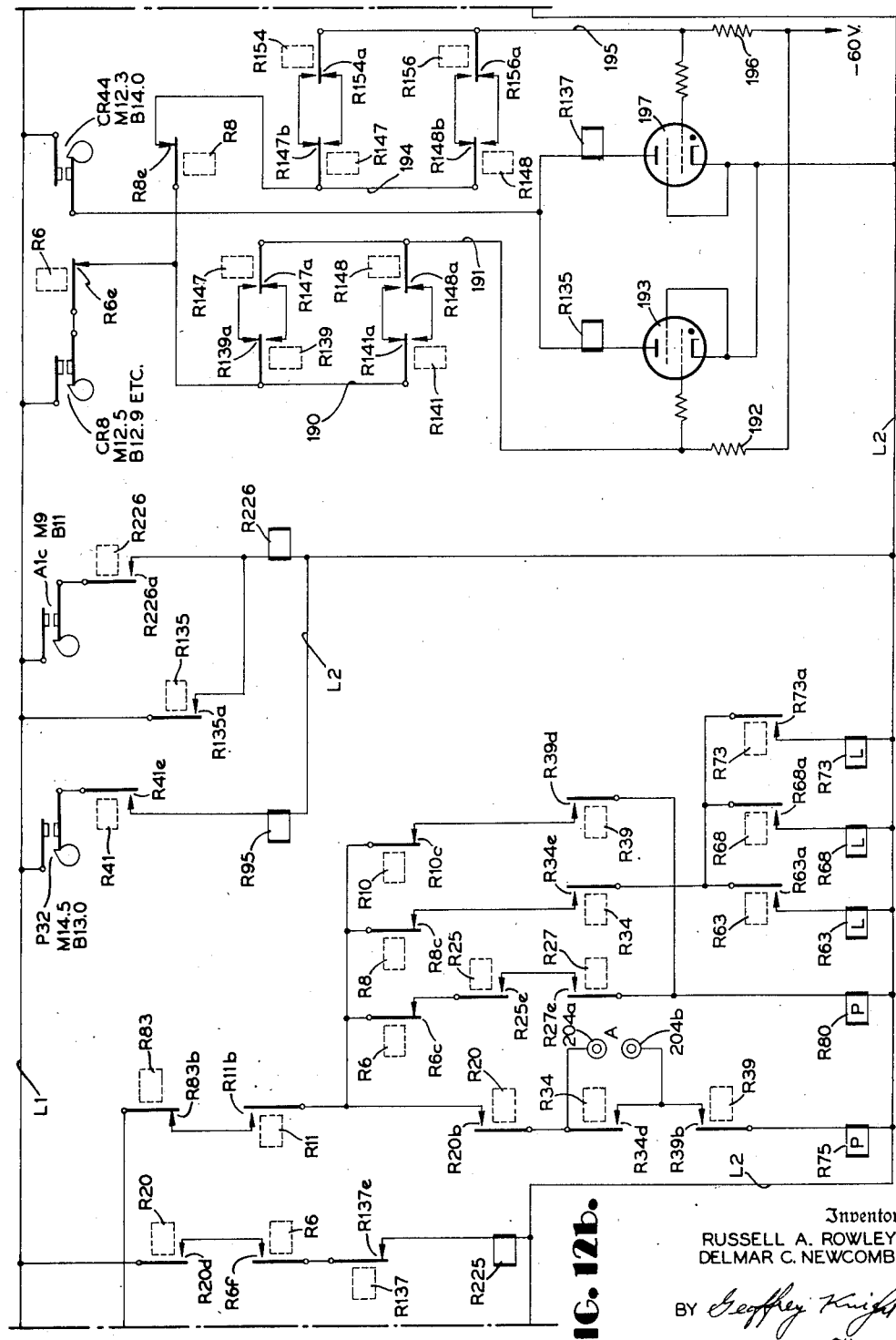
Figure 12C:
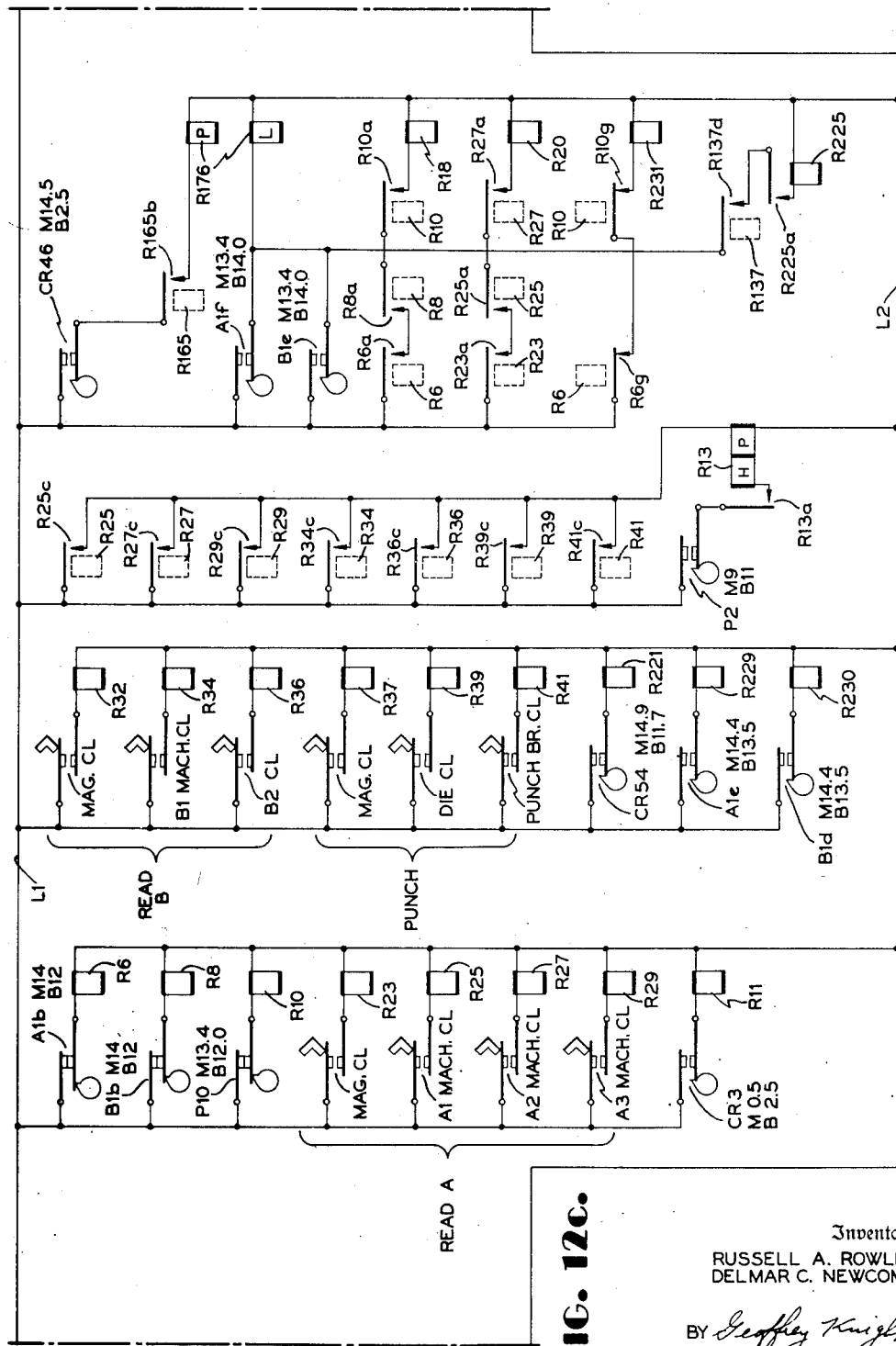
Figure 12D:
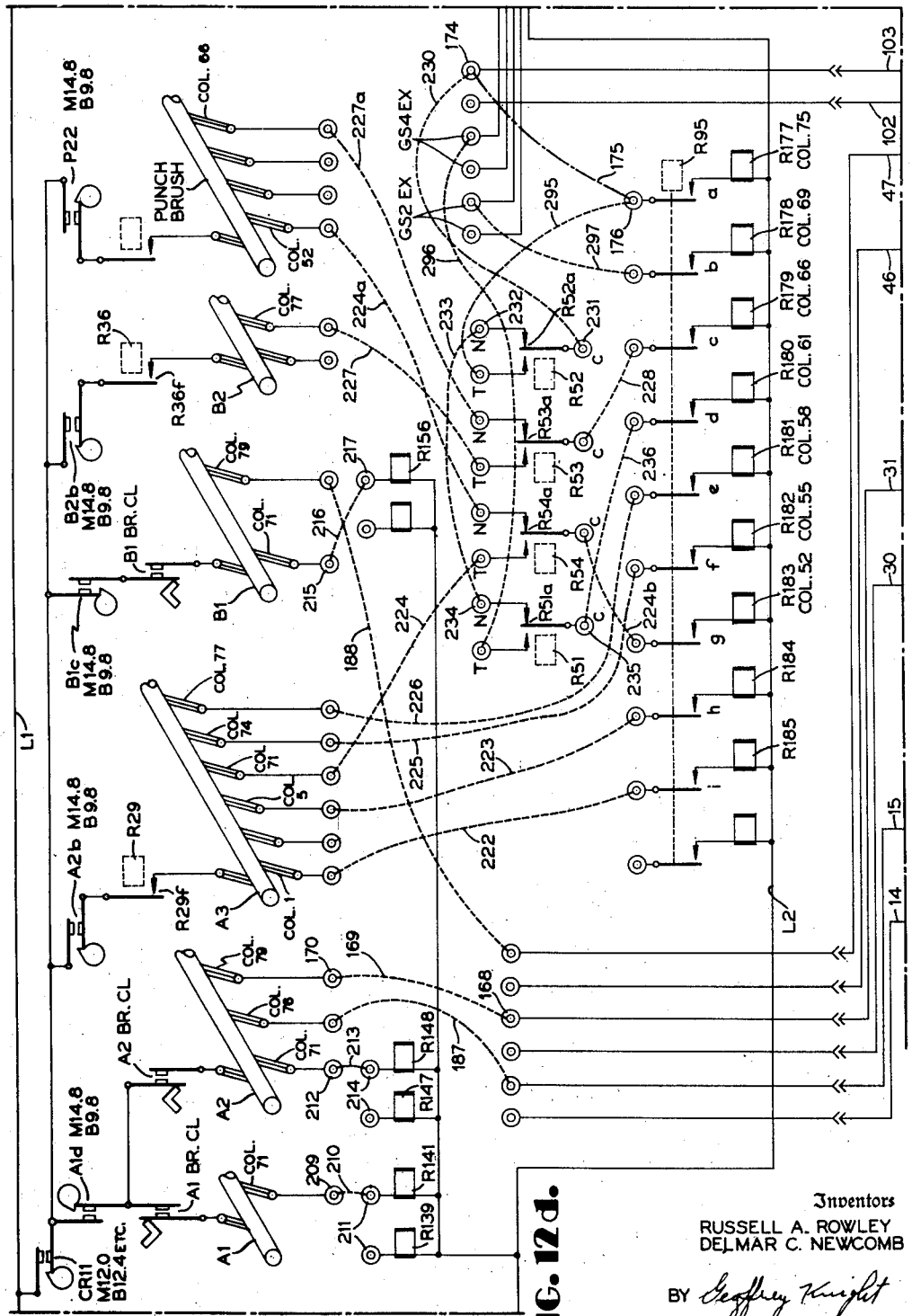

For example, the number 7 stored in the units counter of FS2 (Fig. 12i) can be transferred to the units counter of the MQ storage unit. If this is to be done on program 4, one plug hub of program 4 (Figs. 12g and 13) will be wired, by a plug wire 171, to a hub of "Factor Storage Read-out —2" (FS2-RO), while another hub of program 4 will be wired, by a wire 172, to "Mult. Quot. Control Read-in" (RI MQ) (Fig. 12j). In the control panel chart of the calculator, Fig. 13, each program hub that is used is darkened and each function control hub that is used is darkened and has near it the number of the program hub to which it is connected by plug wire. Thus, the number "4" beside one of the Mult. Quot. Control Read-in hubs means this hub is connected to a program 4 hub. Minus voltage applied through the latter connection to the grid of an inverter 1-8Z1 causes a plus condition on the girds G2 of MQ entry switches 5-3D and 5-3E. The plate of 1-8Z1 is also connected to the left grid of a double inverter 1-8Y, whose left plate is connected to its right grid. The right plate of 1-8Y is connected to the grid of an inverter 5-4F1, to which grid is also connected the plate of an inverter 1-8U1, which receives on its grid a minus (3A-3B) gate pulse. When the plate of 1-8U1 goes plus a minus is transmitted from the plate of 5-4F1 to the grid of the power tube 5-7F, which has its plate connected to the minus 100 volt reset line of the MQ counter triggers. These triggers are accordingly reset to the condition representing zeros in all orders prior to the read-in, which will follow between 11A and 20A of the electronic primary cycle.

The minus condition on the FS2 read-out control hub is applied to the right-hand grid of a double inverter 1-1Z (Fig. 12i), the right-hand plate of which is connected to the grids G2 of roll out switch tubes 4-3K and 4-3L. These switch tubes are accordingly conditioned to conduct in response to read-out pulses 11A to 20A applied to their girds G1. At each A pulse a minus pulse is transmitted to the stage 1 triggers 4-5K, 4-5L of the FS2 counters and these counters are accordingly rolled out. That is to say, they receive 10 pulses, which make them pass through zero and return to their starting condition. As each counter passes to zero, plus voltage from the left plate of the stage 8 trigger 4-8K, 4-8L is applied to the grid of a related inverter 4-9K, 4-9L, with the result that a minus pulse is transmitted from the plate of each inverter, to the appertaining Exit Channel wire 1, 2, which will conduct it to the column shift unit (Fig. 12h). These pulses are used to control the transmission of pulses to the Entry Channel wires 1, 2.

Column Shift and Add/Subtract Circuits —Exit Channel 1 and 2 lead into an assembly of switches (not shown) represented by a block entitled "Column Shift." The arrangement of these switches is disclosed in said application, Serial No. 38,078. The function of the column shift switches is to effect column shift in transmitting a number from one storage unit to another, or from a storage unit to the accumulator, etc. In the present case it will be assumed that the columns shift switches are conditioned so that pulses arriving on the Exit Channel 1 and Exit Channel 2 wires are transmitted respectively, through binary couplings, to the triggers 5-4M and 5-4N, respectively. These are called the Add/Subtract triggers or A/S triggers.

The condition of the A/S triggers at the beginning of electronic transfer determines whether the transfer is to be a true or a complement transfer. If it is to be a true transfer, as in the example now being described, the A/S triggers will be off at the start of the transfer and will be turned on by the pulse arriving on the related channel wire. The means to determine the start condition of the A/S triggers will be described later.

With the A/S triggers turned off, minus voltage from their right plates, connected to the grids G2 of A/S switches 5-2M to 5-2P, will render these switches non-responsive to B pulses applied to their grids G1. 9 of these pulses, namely, 11B to 19B, are fed to the grids G1 on each primary cycle. At the units order switch 5-2N the first two pulses will be blocked, but before the third pulse a negative pulse will be transmitted over the Exit Channel 1 wire from the units order counter of FS2, since the read out pulse, namely, the 13A pulse, will cause this counter to pass from 9 to 0 and transmit an output pulse through Exit Channel 1. This pulse will switch the A/S trigger 5-4N on. The next 7 B pulses, namely, 13B-19B, will be passed through the A/S switch 5-2N and will appear as plus pulses on Entry Channel 1. Consequently, 7 pulses will be passed through entry switch 5-3E to the units order counter 5-6E of the MQ storage unit, advancing this counter from 0 to 7.

If there is a zero in the tens order of the FS2 counter, it will not pass from 9 to 0 until the tenth A pulse has been transmitted to it, namely, the 20A pulse. By the time the output from the tens order counter occurs all nine B pulses will have been blocked at the switch 5-2M and no pulse will be transmitted over Exit Channel 2 to the tens order counter of the MQ storage unit. This counter will accordingly remain at zero and the storage unit will have a reading of 07.

*Electronic transfer from a storage unit to the accumulator*

A number can be read from any storage unit into the accumulator. For example, a number can be transferred from GS2 (Fig. 12j) to the accumulator (Fig. 12h). A program hub will in this case be wired to a hub of "General Storage Read-out —2" and another hub pertaining to the same program will be wired to a "Counter Control — Read-in +" hub (see program 2, Fig. 13). The minus condition on the GS2 read-out hub connected to the left grid of inverter 1-2Y causes a plus condition on the left plate of this inverter, which is connected to the grids G2 of roll out switches 6-3K and 6-3L. The grids G1 of these switches are pulsed by +(11A-20A) pulses from a source to be described later, in the section on "Read out from general storage to punch." These pulses are transmitted as negative pulses from the plates of the switches through binary, condenser couplings to the grids of the stage 1 triggers 6-5K, 6-5L of the tens and units counters of GS2. These counters are thereby rolled 10 steps and restored to their original condition. On passing from 9 to 0 each counter transmits a plus pulse from the left plate of its stage 8 trigger 6-8K, 6-8L to the grid of inverter 6-9K, 6-9L. Negative pulses are transmitted from the plates of these inverters to Exit Channel 1, 2 and lead thereby to the column shift switches.

All numbers are stored in the storage units, such as GS2, as true numbers, while positive numbers are stored in the accumulator as 9's complements, and negative numbers as true numbers. In this illustrative embodiment we shall be concerned only with positive numbers. The transfer from a storage unit to the accumulator of a positive number is therefore a complement transfer. Accordingly, the A/S triggers are turned on at the start of the electronic transfer and the A/S switches 5-2M to 5-2P are thereby conditioned for response to B pulses applied to their grids G1. If the number which is to be transferred from the units order of GS2 is 2 there will be 7 B pulses transmitted through the A/S switch 5-2N before the A/S trigger 5-4N is turned off. These 7 pulses are transmitted through inverter 5-1N and Entry Channel 1 to the grid G1 of read-in switch 3-11M of the units order counter of the accumulator. At this time grid G2 of 3-11M is plus, having been put in this condition by the minus on the counter read-in hub (CTR RI+), which passes through a triple inversion by inverters 1-9Z2, 1-9X2, and 1-9U, to be applied as a plus condition on grids G2 of 3-11M and 3-11N. The 7 plus pulses on Entry Channel 1 are thus transmitted through the binary condenser coupling to the grids of the stage 1 trigger 3-9M of the units order counter, advancing the counter from its original condition by 7 steps. The counter may or may not have been in zero condition when the 7 pulses were added to it, since it is not reset to zero automatically on each entry, as the storage units are, but only when reset is called for. This will be described later.

If either one of the accumulator counters passes from 9 to 0, a minus pulse will pass from the right plate of the stage 8 trigger 3-6M, 3-6N through a condenser to the right grid of the related carry trigger 3-4M, 3-4N, switching the latter to the left. This causes a plus condition on the right plate of the carry trigger to be extended to the grid G1 of the related carry switch 3-3M, 3-3N. A plus 20B-1A gate pulse is applied to the grids G2 of the switches 3-3M and 3-3N. If the units carry switch 3-3M, for example, was prepared by the carry, a minus pulse will issue from its plate to the grids of the stage 1 trigger 3-9N of the tens counter, adding one to this counter. Similarly a carry pulse would pass from the plate of carry switch 3-3N to the stage 1 trigger of the next higher order (not shown).

The 20B-1A gate pulse is controlled by a switch tube 1-10V, the grid G2 of which is connected to the plates of the double inverter 1-10Y, which go minus on any counter read-out program. The grid G1 of 1-10V receives a plus 20B-1A gate pulse and, if it is not a counter read-out program, the grid G2 will be at plus potential and this pulse will pass as a negative pulse from the plate of 1-10V, being inverted by 1-10U and transmitted to the grids G2 of 3-3M and 3-3N. The carry circuit is only effective on an entry into the counter and not on a read-out. A minus 9AB pulse is applied through condensers to the left grids of the carry triggers, to turn them off just before the next electronic entry time.

*Electronic transfer from the accumulator to a storage unit*

A number can be read out of the accumulator into any storage unit. For example, a number can be read from the accumulator into GS4. Since the number in the accumulator is a 9's complement, if it is a positive number, the transfer to the storage unit will be a complement transfer.

To perform this operation one program plug hub (see program 3, Fig. 13) will be wired to "General Storage Read-in —4" (GS4 RI in Fig. 12j) and another plug hub of the same program will be wired to "Counter Control. —Read out" (CTR RO in Fig. 12h), or to "Counter Control Read-out and Reset" (CTR RR in Fig. 12h). In the former case the minus extended from the counter read-out hub to the left grid of double inverter 1-10Z will cause a plus to be transmitted from its plate to the right-hand grid of the double inverter 1-10Y. A resulting minus on the right plate of this inverter is transmitted to the grid of a power tube 1-10X. The plus condition on the plate of this tube brings the grids G2 of roll-out switch tubes 3-10M and 3-10N, and also the grids G2 of the read-out switch tubes 3-2M and 3-2N, to a plus voltage. A-pulses on the grid G1 of switch 3-3D are passed from the plate of this switch when the grid G2 goes plus on a 10B-20B gate. The 10 minus A pulses issuing from the plate of 3-3D are inverted by 3-4D and transmitted to the grids G1 of switches 3-10M and 3-10N. 10 minus pulses from the plate of the latter switches roll the counters of the accumulator 10 steps. On passing from 9 to 0 the stage 8 triggers 3-6M, 3-6N transmit from their right plates minus pulses to respective carry triggers 3-4M and 3-4N, which switch these carry triggers on. Their right plates go plus and cause minus pulses to issue from the plates of read out switches 3-2M, 3-2N, onto the Exit Channel 1 and 2.

Since this is a complement transfer the A/S triggers 5-4M, 5-4N are on at the start of the transfer and B pulses are transmitted through switches 5-2M and 5-2N, until these switches are turned off by the pulses from the accumulator counters. The B pulses pass out onto the Entry Channel 1 and 2 as plus pulses and arrive at the grids G1 of read-in switches 6-4X and 6-4Y (Fig. 12j) of GS4. These switches were conditioned to respond to the pulses just mentioned at the beginning of the transfer, by the minus condition on the GS4 read-in hub, which causes a plus condition to be extended to the grids G2 of the switches 6-4X and 6-4Y. The number of B pulses which are transmitted through these switches before the A/S switches 5-2M, 5-2N are turned off pass as minus pulses through binary couplings to the stage 1 triggers of the GS4 counters. If the number originally stored in the units order of the accumulator was 6, the units counter would stand at 3 and would transmit a pulse to the Exit Channel 1 on the 7th A pulse, namely, on the 17A pulse. Before this, 6 B pulses would be fed to entry channel 1. Thus, the units order counter of GS4 will be advanced 6 steps.

During any counter read-out operation the 20B-1A carry pulse is blocked by the minus on G2 of 1-10V (Fig. 12h). Thus, although the carry triggers are operated on counter read-out and the grids G1 of the carry switches 3-3M and 3-3N are plus, there will be no carry to the next higher order.

Before the entry into GS4 it is reset to zero by an arrangement similar to those already described, including a switch consisting of the right half of double inverter 1-3U and the inverter 1-3V2. 1-3V2 receives a minus 3A-8B gate on its grid and allows a plus pulse to pass from its plate through a condenser to the grid of an inverter 6-5Z. A minus from the plate of 6-5Z cuts off the power tube 6-7Z, the plate of which is connected to the minus 100 volt reset line for GS4.

If the accumulator is to be reset following its read out the minus condition on the CTR RR hub is inverted by the left half of a double inverter 1-11Z and applied as a plus to the left grid of the double inverter 1-10Y, producing the same effect on 1-10X and the counter read out and roll out switches as previously described. In addition, the plus on the left plate of 1-11Z applied to the grid G2 of switch 1-11Y allows a 1AB pulse applied to the grid G1 of this switch to pass as a minus pulse through a condenser to the right grid of trigger 1-11X. This 1AB pulse coming at the end of the cycle in which the counter is read out, prepares for resetting of the counter on a minus 3A-8B gate pulse applied to the left grid of a double inverter 1-11W. The right plate of this double inverter was made minus when 1-11X switched on and accordingly from the commoned plates of 1-11W a plus passes to the grid of an inverter 3-5L. The minus on the plate of this inverter goes to the grid of a power tube 3-7L, the plate of which is connected to the minus 100 volt reset plate of the accumulator. Thus the accumulator triggers are reset on the minus 3A to 8B gate pulse. A minus 11AB pulse applied to the left grid of trigger 1-11X switches it off again.

It was mentioned previously that for a complement transfer the A/S triggers are turned on at the beginning of the transfer, while for a true transfer they are turned off. Since the A/S triggers may be standing in either condition at the end of a previous transfer they are always turned off before the next transfer and may then be turned on or not, depending upon the type of transfer which is to follow.

The means for turning the A/S trigger off, as just mentioned, is a set of double inverters 5-3M to 5-3P (Fig. 12h). The right grids of these inverters receive a plus (3A-9A) gate pulse, which causes each right plate to transmit a corresponding minus pulse to the right plate of the related A/S trigger 5-4M to 5-4P. Through the internal condenser coupling to the left grids of the A/S triggers any one which is turned on will be turned off.

The left halves of the double inverters 5-3M to 5-3P are used to turn the A/S triggers on by a 10A pulse, if there is to be a complement transfer. The transmission of the 10A pulse is controlled by a True/Complement or T/C trigger 5-6J. This trigger is normally turned off at the beginning of each primary cycle by a minus 1AB pulse transmitted from the plate of a switch tube 5-7J to the right plate of the T/C trigger. A plus 1AB pulse is applied to the grid G1 of this switch tube and will be effective unless the grid G2 is made negative by controls operative on a multiplying or dividing program.

If the transfer is to be a complement transfer the T/C trigger remains off. Its left plate then places a plus condition on the left grid of a double inverter 5-8J, the right plate of which transmits a plus condition to the grid G1 of a switch 5-4K. The grid G2 of this switch receives a plus 9B-10B gate and at this time issues from its plate a negative pulse, which is inverted by 5-4L1 and applied to the grid G2 of the switch 5-3K. The switch is thereby conditioned to pass a 10A pulse which enters at its grid G1. The resulting minus 10A pulse is inverted by 5-3L and applied as a plus 10A pulse to the left grids of each of the double inverters 5-3M to 5-3P. The left plates of these inverters pass negative pulses to the left plates of the A/S triggers from which they are fed back through internal condenser couplings to the right grids of these triggers, turning them on.

If the transfer is to be a true transfer the T/C trigger must be switched on. This is done by a 7AB minus pulse transmitted from the plate of a switch 5-5H, which has a plus 7AB pulse applied to its grid G1. In the case of a true transfer the grid G2 will be plus, due to a combination of controls including a switch 5-4H and a switch 5-3H. The switch 5-3H is a double inverter with plates commoned and connected to the grid G2 of the switch 5-4H. One grid of 5-3H is connected to the plate of 1-10X, which goes plus on any counter read-out operation. The other grid of 5-3H is connected to 1-9U, which goes plus on any counter read-in operation. The grid G1 of 5-4H is minus on any multiplying or dividing program. Thus, the plate of 5-4H will be plus on any operation involving counter read-in, counter read-out, multiplication, or division. The plus condition will be applied as a minus, through inverter 5-4J1, to the grid G2 of 5-5H. If none of the above mentioned operations is programmed the grid G2 of 5-5H will be plus and the 7AB pulse will get through to turn on the T/C trigger 5-6J. The principal operations requiring true transfers are those in which a number is being transferred from one storage device to another and these do not involve any operation of the counter. The controls so far described, therefore, largely take care of the correct condition of the T/C trigger. Certain other controls which are available in the commercial electronic calculator need not be referred to herein.

*Read-out from calculator to punch*

A number can be read from any general storage unit, or the accumulator, to the punch, but not from a factor storage unit. The circuits whereby the results in the accumulator are punched will now be described.

As in the case of electronic transfer from the accumulator, power tube 1-10X (Fig. 12h) is turned off to apply plus voltage to the grids G2 of the roll-out switch tubes 3-10M and 3-10N and the read-out switch tubes 3-2M and 3-2N. However, the signal to turn off 1-10X is derived from a different source. On closure of P46 (Fig. 12e) at 12.8 a circuit is completed from L1 through this cam contact, "P Card Cycles" plug hub, plug wire 173, "Counter Read-out" plug hub of the punch control panel, wire 81, to the right grid of double inverter 1-10Z (Fig. 12h). Plus 40 volts are therefore applied to this grid throughout the time P46 is closed, that is, throughout the read-out portion of the punch cycle. The right plate of the double inverter 1-10Z is connected through a resistor to its left grid, consequently minus voltage is maintained on this grid, just as in the case of a program read-out. Through the circuit arrangement previously traced 1-10X is cut off throughout the read-out time of the punch cycle.

The switches 3-10M and 3-10N are now conditioned to transmit roll out pulses which they receive from the read out pulse trigger 1-8F (Fig. 12i). This trigger is reset to conduct on its right side by the opening of the calculate reset cam contact P24 (Fig. 12e) between 13.4 and 14 index time. It is switched left by index line pulses from P1 through line 2, the first of which is permitted to pass at 0, after P3 closes at 11.8. When 1-8F switches left a negative pulse is transmitted to an inverter 1-9F1. This inverter has a normal positive bias and so recognizes only the minus pulses from 1-8F. The plus output from the plate of this inverter, applied to the grid of an inverter 3-3C1 causes a minus at the grid of a power tube 3-4D. A resulting plus at the plate of the power tube is transmitted through switch tubes 3-10M and 3-10N as a minus pulse to stage 1 of each order of the accumulator.

The trigger 1-8F is switched right by mid-index pulses from P9, the first of which occurs after P13 (Fig. 12e) closes at 0.3. Thus the trigger 1-8F is switched alternately left and right ten times, at each left switch transmitting an index line pulse to the stage 1 triggers of the accumulator counters.

Considering the units order of the accumulator, for example, as this counter passes from 9 to 0 a negative pulse is transmitted from the right plate of its stage 8 trigger 3-6M (Fig. 12h) through a condenser to the right grid of the related carry trigger 3-4M, switching this trigger to the left. The resulting negative pulse from the left plate of the trigger is inverted by an inverter 3-1K1 and transmitted as a positive pulse from the plate of this inverter through a condenser to the grid of a thyratron 3-1M. The tens order thyratron is shown at 3-1N.

The plates of the thyratrons 3-1M and 3-1N receive plus 50 volts just before each index time from a 50 volt source, through P50 (Fig. 12e) and wire 130. Returning now to the units order thyratron, the plus pulse to the grid of 3-1M causes this thyratron to ignite, completing a circuit from the cathode of the thyratron through wire 103, to the counter position 1 read out hub 174, thence by plug wire 175 to punch magnet hub 176 and through R95a and a punch magnet 177, to L2, energizing the punch magnet.

The index point position of the card which is at the die when the punch magnet is energized is punched.

While the grids of the thyratrons go positive during accumulator read-in, if there are carries, the thyratrons are not ignited because accumulator read-in occurs only during calculate time and P50 does not close during calculate time.

If the counter is to be reset following its read out a P46 (Fig. 12e) pulse from the P card cycles hub will be transmitted to the CTR RR hub and pass through wire 32 to the right grid of double inverter 1-11Z (Fig. 12h). Since the right plate of this inverter is connected through a resistor to its left grid the plus on the right grid will have the same effect as a minus on the left grid, the effect of which condition was previously described under the heading "Electronic transfer from the accumulator to a storage unit." In this case the plus condition applied to the grid G2 of 1-11Y finds the grid G1 of this switch already plus, because the primary timer stopped on step 1 at the end of the preceding calculate cycle. Trigger 1-11X is therefore switched on immediately and the resetting of the accumulator takes place in the first part of the next calculate cycle.

Read out from general storage to punch

It is possible to read numbers out of the general storage unit to the punch. For example, a number can be read out of general storage 2 to the punch, by passing a P card cycles pulse to a GS2 RO hub (through wiring to be described later, for example) whence the pulse passes through wire 140 to the right grid of double inverter 1-2Y. A negative pulse passes from the right plate of this double inverter through a resistor to its left grid, causing a plus condition to be extended from its left plate to the grids G2 of switches 6-3K and 6-3L, conditioning these switches to pass roll out pulses, which will be applied to their grids G1.

Numbers are read out of a storage unit by stepping the counters of the storage unit forward by pulses timed to coincide with the stopping of successive index point positions of the card in the punch unit at the die and by utilizing signals which issue from each counter when it passes from 9 to 0 to energize the related punch magnet. However, numbers are stored in the GS storage units as true numbers. To step a counter of a GS storage unit to zero requires a number of pulses equal to the 10's complement of the number standing in the counter. For example, if a counter stands at 3, it will require 7 pulses to make it pass to 0. If a single pulse per index point position of the card were used, the 10's complement of the number stored in the counter would be punched, since the cards are fed in the direction which causes the index point positions to pass the die in the order, 0, 1, ... 9.

The true number might be punched by rolling the counter backward to zero, which would require a number of steps equal to the digit stored in the counter, but it is more convenient to roll the counter forward 9 steps, which has the equivalent effect, if carried out with certain precautions now to be described.

By the method of rolling the counter forward 9 steps, it may be caused to pass through zero repeatedly, before arriving at zero on the 9th step. The pulses used to step the counter forward are therefore divided into two groups, one being a group of 8 rapid pulses occurring at mid-index time and the other a single pulse occurring at index time. Only the single pulses occurring at index time are made effective to cause the energization of a punch magnet and thereby the repeated signals occuring during the rapid pulsing are discarded.

A special condition exists where a counter stands at zero. In order to punch the zero a group of 9 rapid pulses are transmitted to the counter at mid-index time before zero and a 10th CB pulse is passed to the counter at zero time. The 10th pulse will cause the counter, which originally stood at zero, to return to zero at the instant the zero index point position of the card is at the die and a signal passed from the counter at this moment causes the related punch magnet to be energized and a zero to be punched.

The 9 rapid pulses at mid-index time before zero, and the single CB pulse at zero time, are followed by 8 rapid pulses at mid-index time before 1 and a single CB pulse, making 9 in all, at 1 index time. If a counter had originally stood at 1 it would have been advanced to 1 by the first 10 pulses and to 9 by the 8 rapid pulses before 1 index time. The single CB pulse at 1 index time would advance the counter to zero as the 1 index point position of the card reached the die and a signal to energize the punch magnet at this time would result in the punching of a 1.

This procedure continues through 9 time. If a counter had originally stood at 3 it would have been left standing at 4 after the CB pulse at 9 time. At 9.5 9 rapid pulses are applied to the counter, restoring it to 3. In a similar way each counter will be restored to the digital value originally contained in it at the end of the inversion read out operation.

The 8 rapid pulses at mid-index time are A pulses gated into the counters of the general storage unit which is to be read out, under control of a three stage counter shown in Fig. 12k, comprising 3 triggers, 3-2B, 3-2C, and 3-2D. These triggers are likewise pulsed by A pulses and are coupled together in straight binary fashion, so as to give an output signal from stage 3 on the 8th pulse. The extra rapid pulse required before zero and after 9 is provided by delaying the pulsing of the three stage counter while a single A pulse is delivered to the GS unit counters. In this case, the signal from the binary 8 counter follows the 9th pulse to the storage unit counters.

The signal to start the rapid pulses at each mid-index time is derived from a trigger 3-2F. This trigger is reset to the normal position by the calculate reset cam contact P24, which controls the bias to the grid of the right-hand tube of 3-2F through wire 33. A mid-index pulse transmitted from P9 through P12 at 11.5 passes through wire 8 to the left grid of 3-2F, switching it on. The trigger will be switched off at zero index time by a pulse from P1 through P5 and wire 4 to its right-hand grid. Meanwhile, a minus pulse issuing from the left plate of 3-2F is transmitted through a condenser to the right grid of a trigger 3-2E, which is also reset to the normal position by the calculate reset cam contact P24, acting through wire 33. This pulse to the right grid of 3-2E switches the trigger to the left. The resulting plus condition on the right plate of 3-2E is transferred to the grid G1 of a switch 3-1D, the grid G2 of which receives pluse B pulses. The first plus B pulse causes a minus pulse to be transmitted from the plate of 3-1D through a condenser to the right grid of a trigger 3-1B, which has been reset by the calculate reset cam contact P24. This trigger is thereby switched to the left.

The minus condition on the left plate of 3-2E is extended to the grid G1 of a switch 3-1H. Thereby, plus B pulses applied to the grid G2 of this switch are made ineffective, so long as 3-2E remains turned on. With the switch 3-1H in this condition minus B pulses cannot issue from its plate to the left grid of 3-1B and this trigger therefore remains on after the first B pulse transmitted through 3-1D.

The minus on the left plate of 3-1B is inverted by 3-3B1 and the plus from the plate of this inverter is applied to the grid of the left half 3-3F1 of a double inverter switch. A normal minus condition on the grid of the right half 3-3F2 of this double inverter switch, which tends to maintain the plate positive, is ineffective when the plate of 3-3F1 goes minus, causing a plus condition at the plate of an inverter 3-3G2. The plus on the plate of 3-3G2 renders a switch 3-2H responsive to plus A pulses applied to its grid G1, causing minus A pulses to pass from the plate of 3-2H to the grid of a power tube 3-3H. The plate of 3-3H is connected to the grids G1 of the switches 6-3K, etc., in Fig. 12j.

During electronic transfer from the general storage units, as previously described, the group of ten roll out pulses to the grids G1 of 6-3K, etc., are gated by a —(10B-20B) gate on the grid of 3-3F2.

It will be recalled that the grids G2 of the switches 6-3K and 6-3L were made positive by the read out signal to GS2. Accordingly, the A pulses from 3-3H pass through these switches and appear as minus A pulses at the binary couplings of the stage 1 triggers 6-5K and 6-5L of the GS2 counters.

Returning now to trigger 3-1B, the minus on the left plate of this trigger is also transmitted to the grid of the right half 3-1A2 of a double inverter switch, tending to make the plate of this right half go positive. However, the plate is held down by the minus potential on the plate of the left half 3-1A1 of the switch, the grid of which is connected to the left plate of a trigger 3-1C, which was restored to the normal condition by the calculate reset cam contact P24. Consequently, the first A pulse, which resulted in the advance of the counters of GS2 by one step cannot pass through the switch 3-2A, to cause a minus pulse at the stage 1 trigger 3-2B of the binary 8 counter. After this A pulse the counters of GS2 have therefore been advanced one step ahead of the binary 8 counter.

The plus condition on the plate of the inverter 3-3B1 is also transmitted to the grid G2 of a switch 3-1G, conditioning this switch for response to the A pulse applied to its grid G1, which A pulse caused the first step of advance of the GS2 counters. A minus pulse transmitted from the plate of 3-1G through a condenser to the right grid of a trigger 3-1F, which was reset by the calculate reset cam contact P24, switches this trigger to the left. A plus on the right plate of 3-1F is extended to the grid G1 of a switch 3-1E, which has plus B pulses applied to its grid G2. The next B pulse is transmitted as a minus pulse through a condenser to the right grid of trigger 3-1C, which is switched on by this pulse. The resulting minus condition on the left plate of 3-1C causes a plus on the plate of the inverter 3-1A1, allowing the connection to the grid G2 of switch 3-2A to go plus. Now, each A pulse which advances the counters of GS2 will also advance the binary 8 counter.

The 8th A pulse to the binary 8 counter, which is the 9th A pulse to advance the GS2 counters, causes a minus pulse to pass from the right plate of the stage 8 trigger 3-2D of the binary 8 counter to the left grid of trigger 3-2E, switching this trigger to the right. B pulses are shut off at the switch 3-1D, but the first B pulse applied to the grid G2 of switch 3-1H causes a minus pulse to switch off the trigger 3-1B. Through the chain of electronic devices previously described A pulses to the GS2 counters are shut off at 3-2H and A pulses to the binary 8 counter are shut off at 3-2A, when the plate of 3-1A2 goes minus.

Subsequently a pulse from the cam contact P1 through P3 and wire 2 at zero time switches the read out pulse trigger 1-8F (Fig. 12i) to the left and a minus passes from the left plate of this trigger to inverter 1-9F1 (Fig. 12h). From the plate of this inverter a plus pulse passes to the grid of inverter 3-3G1 (Fig. 12k) and a minus pulse from the plate of this inverter causes the power tube 3-3H to transmit one pulse to the counters of GS2.

The counters of GS2 have received 10 pulses altogether and have been rolled 10 steps thereby. If either counter originally stood at zero, it returns to zero at zero time, issuing a minus pulse from the right-hand plate of its stage 8 trigger. This pulse is inverted by 6-10K2 or 6-10G1 and transmitted to the grid of a related thyratron 6-11K, or 6-11L. Just before zero time, namely, at 11.9, plus 50 volts was extended through the cam contact P50 and wire 131 to the plates of the thyratrons of all the GS storage units. The plus pulse on the grid of one of the thyratrons will accordingly ignite the same and complete a circuit through the wire 150 or 151 to a GS2 exit hub (Fig. 12d). If this hub is connected by a plug wire, such as 297, to the hub of a punch magnet, such as R178, R95 being energized at the time, the punch magnet will be energized and a zero hole will be punched.

At zero time a pulse was passed from P1 through P5 and wire 4 to the right-hand grid of trigger 3-2F, switching this trigger off.

The next mid-index pulse, at 0.5 time, through cam contact P12 and wire 8, switches 3-2F on again and this causes trigger 3-2E to be switched on also. Through the circuits previously traced A pulses are fed to the counters of GS2 and the binary 8 counter. The binary 8 counter is this time in step with the pulsing of the GS2 counters, because 3-1C remained on and when the plate of 3-1A2 goes plus as 3-1B is turned on, A pulses immediately pass through the switch 3-2A to the stage 1 trigger of the binary 8 counter. The stop pulse therefore issues from the stage 8 trigger of the binary 8 counter when the 8th A pulse has been received by the GS2 counters. Thereafter the index line pulse at one time to the read out pulse trigger 1-8F causes a single pulse to be transmitted to the GS2 counters, making a total of 9 pulses transmitted to them. The 9th pulse comes at 1 index time, at which time the plates of the thyratrons 6-11K and 6-11L are furnished with B plus voltage. If either counter originally stood at one, it will issue a pulse to the related thyratron at one time and cause a 1 to be punched.

The read out continues in the same way through 9 index time. At this time, however, a trigger 3-2G is switched left by a pulse transmitted through P1, P6, and wire 5. A minus on its left plate undergoes a double inversion at 3-3B2 and 3-3A2 and is transmitted as a minus pulse to the left grids of triggers 3-1C and 3-1F, switching both of these triggers off. This restores the normal condition of the circuits.

A final pulse transmitted at 9.5 through P9, P12, and wire 8 switches trigger 3-2F to the left once more and the same sequence is repeated as occurred at the start of the inversion read out, that is to say, 9 pulses are added to the GS2 counters, restoring them to their original conditions.

*Operation of the machine as a whole*

The illustrative machine can be operated as either a single read unit or double read unit machine. A typical double read unit application would call for deriving factors to be computed, from two decks of cards, generally referred to as "detail" and "master" cards, respectively, which decks are to be kept separate. A typical single read unit application would involve the reading of factors to be computed from a single deck of cards, usually with a summary punching cycle called in by a change in group number, or "control break." Both types of operation will be described and first, a double read unit operation.

A machine in accordance with the invention may be used, for example, to prepare a set of punched cards to control the printing of bills on a record controlled electric accounting machine. The bills might be issued by a jobber to a Government department, for example, for Quartermaster billing. It will be assumed in the example which will be used to explain the operation of the machine that each item supplied by the jobber has a code number, as well as an identifying name. The charge for each item will include a cost element, which will be the product of a unit cost times the quantity, or number of units, of such item, to which cost element will be added a handling charge arrived at by multiplying the cost by a handling per cent factor. The same handling per cent factor will apply to all items of a class, but different classes of items will have different handling per cent factors. The class of an item will be designated by one digit of its code number.

A portion of a specimen bill is shown in Fig. 11. The first line of this bill, following the column designations, shows a batch of solder terminals delivered on the 9th of January, 1951. These solder terminals have the code number 113, the digit 1 in the hundreds column being the class number used for control. The quantity of boxes in the first batch was 64. Their unit cost (box of 1,000) was $6.20 and their total cost was $396.80.

Line two of the bill shows an item of 50 units of sockets, with a unit cost of $7.75 per hundred and a total cost of $387.50. The code of this item, 115, has the same class digit, 1, as the first item. The fourth line, pertaining to an item of 50 thousand-foot units of vinyl covered wire, has a code number, 210, with a different class digit, 2; consequently, a summary line, line 3, intervenes. The summary line gives the total cost of all of the class 1 items, the handling per cent which applies to them, the handling charge for all the class 1 items, and the total charge for all of the class 1 items.

The bill is prepared on an electric accounting machine controlled by punched cards. A portion of a deck of such cards is shown in Fig. 11, under the bill. These are the cards used to prepare the portion of the bill previously referred to. The first card, P1 is for the batch of solder terminals, code 113, delivered on January 9th. This card has the date punched in columns 1 to 4, the name of the item in columns 5 to 22, the code number of the items in columns 52 to 54, the unit cost in columns 55 to 57, the quantity in columns 58 to 60, and the handling per cent in columns 66 to 68.

P2 is a punched card for the sockets, code 115, delivered on January 17th.

P3 is a summary card, which has punched in it the total cost of the class 1 items, $784.30, the handling per cent for this class, 1.5, the handling charge, $11.76, for all class 1 items, and the total charge, $796.06, for all class 1 items. P4 is a punched card for the item of 50 thousand-foot units of vinyl covered wire delivered on the 10th of January and shows a code number, 210, with a different class digit, 2. It is this latter difference, detected by the sequence comparing means, which causes the summary card P3 to be punched.

Figure 10:
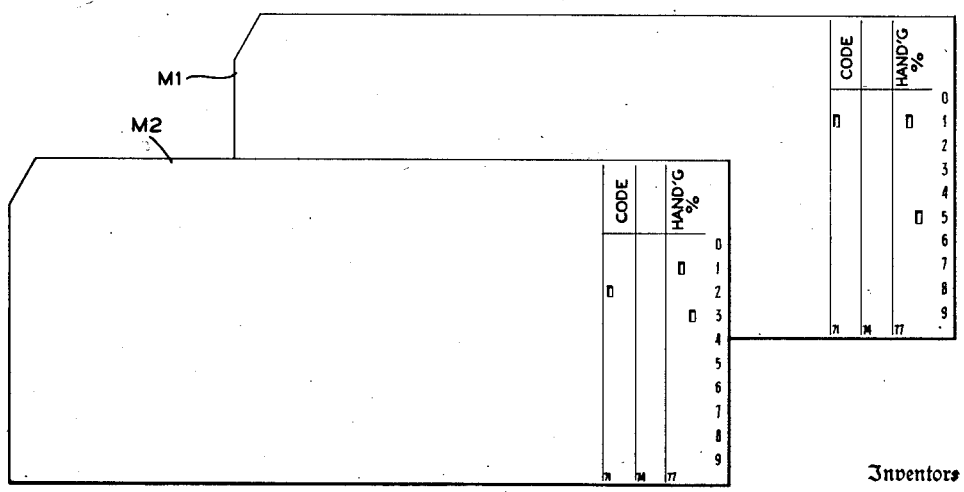

The set of punched cards just described is produced on a machine made in accordance with the invention. The operation is controlled by a set of detail cards such as shown in Fig. 9 and a set of master cards such as shown in Fig. 10. Each detail card, such as D3, is punched with the date of delivery of an item, columns 1-4, the name of the item, columns 5-22, the code of the item, columns 71-73, its unit cost, columns 74-76, and the number of units in the item, columns 77-79.

Each master card, such as M2, is punched with the class code, column 71, and also with the handling per cent for that class, columns 77-79.

There is one master card for every class of items supplied by the jobber and these cards are kept in a master file between billing periods.

The detail cards are punched as individual items are delivered. At the end of a billing period the accumulated detail cards are sorted in order of ascending code numbers and then fed with the file of master cards through a collator, which can be set up to pull out of the master deck a master card for each class of detail cards. This is standard procedure in the punched card art and is done on the basis of comparison of class digits punched in column 71 of the detail and master cards. The unselected master cards are sorted into one pocket, the selected master cards into another pocket, and the detail cards into a third pocket. The master cards and detail cards thus remain in code number order, but in separate decks and there may be several detail cards for any given master card, but there should be at least one detail card for every master card in the selected deck of master cards.

In starting the operation the detail cards are placed in the hopper of the A read feed unit, face down, 12-edge forward; the master cards are placed in the hopper of the B read feed unit, in the same position; and a set of blank cards are placed in the hopper of the punch feed unit, in the same position.

*Wiring diagram*

This being an operation requiring both the A read unit and the B read unit, the "A+B" hubs of the reader-punch control panel are plugged. That is to say, bottle plugs 200, 201, 202, and 203 (see upper left portion of Fig. 14a) are plugged into the right-hand positions, so that hubs 200a, 201a, 202a, and 203a are connected to hubs 200b, 201b, 202b, and 203b, respectively.

With the sets of cards in the hoppers as stated, when the main switch SW1 (Fig. 12a) is turned on a plus 40 volt potential is established between L1 and L2 and the following relays are immediately energized:

The cards in the hopper of the A read unit close the A magazine card lever contact Read A, Mag. CL (Fig. 12c), causing the relay R23 to be energized through a circuit from L1 through the A magazine card lever contact and the coil of R23 to L2. In a similar way the B magazine relay R32 is energized through a circuit including the Read B, Mag. CL contact and the punch magazine relay R37 is energized through a circuit including the Punch Mag. CL contact.

With the three feed units latched the A1b cam contact, the B1b cam contact, and the P10 cam contact are closed and circuits are completed through them to energize the relays R6, R8, and R10, respectively. A circuit is then established through R6a, R8a, R10a, and relay R18, energizing this relay. There is also a circuit from the line L1 through R80c, normal (Fig. 12a), and relay R58 to line L2, which causes this relay to be energized.

From L1, branch circuits extend through R58a (Fig. 12a), R58b and R58c to the pick up coils of relays R63, R68 and R73 and the line L2, the circuit to R68 passing through hub 200a, plug wire 200, and hub 200b. These relays are energized, preparing circuits to be completed, in a manner described presently, to the various clutch magnets of the read and punch units for the run-in cycles. They are latch type relays and will remain up until their latch trip coils are energized.

When the start key (Fig. 12a) is operated a circuit extends from L1 through R32c, R23d, R37e, the start key contact, R87d, R80b, normal, and the pick up coil P2 of R61, to L2, causing this relay to become energized. A hold circuit is established for R61 through R61a and R18a to L1. R61b closes, establishing a circuit from L1 through the motor relay to L2, energizing this relay. The points of the motor relay (Fig. 12a) close to connect the motor M to the A. C. power supply. The CR cams are thereby set in operation.

At 13.4 CR5 (Fig. 12a) closes, establishing a second hold circuit for R61. At 9.7 CR1 closes, extending a circuit from L1 through R61d, R174c, normal, R165c, normal, R63c, transferred, and the A2 clutch magnet, to line L2; also through R174d, normal, and the A1 clutch magnet to L2. With these two magnets energized the entire A read unit begins to operate at 14.1, which is the cycle time at which each of the read units latches. On the first cycle which begins at this time the first detail card is fed out of the hopper of the A read unit. At 7.8 the card closes the A1 (Fig. 12c) machine card lever, A1 Mach. CL, causing relay R25 to be energized through an obvious circuit. R13 is energized by a circuit extending from L1 through R25c, the pick up coil of R13, to L2. It holds up through R13a and P2 to L1. At 13.2 the A1 brush card lever contact, A1 Br. CL (Fig. 12d), is closed, preparing a circuit to the A1 contact roll.

If the start key were released during the first cycle R61 would become de-energized with the breaking of its hold circuit through CR5 at 9.5 and the CR1 impulse to start the second cycle would be blocked at R61d. The A read unit would accordingly latch up at the end of the first cycle. Assume, however, that the start key is held down and the next CR1 impulse is effective. This time the A1 and A2 clutch magnets are energized as before, but a circuit is also extended through R13e, now closed, R68b, transferred, the B2 clutch magnet, to L2; also through R174e, normal, and the B1 clutch magnet to L2. Likewise, a circuit extends from R13e through R73b, transferred, and the Punch clutch magnet, to L2. All three of these magnets are accordingly energized together with the A1 and A2 clutch magnets and all three feeds operate on the second cycle. During this cycle the class code 1 is read from column 71 of the first detail card, D1 (Fig. 9), at station A1 into the comparing relay R141 (Fig. 12d). The circuit extends from L1 (Fig. 12d) through CR11, which closes from each index line to mid-index time, A1d, closed from 14.8 to 9.8, A1 Brush CL contact, contact roll A1, hole in the card, column 71 brush, A1 Brush hub 209 (see also Fig. 14a), plug wire 210, plug hub 211 of A1 comparing relay R141, coil of R141, to L2. Since nothing is read into the A2 comparing relay R148, the test in the comparing unit, to be described presently, shows an unequal condition, but no account is taken of this condition in the second cycle, for reasons which will become evident later.

In the B read unit the first master card feeds up to the B1 brush station, closing the B1 machine card lever, B1 Mach. CL (Fig. 12c), at 7 index time and causing R34 to become energized, and closing the B1 brush card lever, B1 Br. CL (Fig. 12d), at 13.3 preparing a circuit to the B1 contact roll. Likewise, in the punch feed unit a blank card is fed to the die, causing the die card lever contact, Die CL (Fig. 12c), to be closed at 7 index time and R39 to become energized. In passing to the A2 read station the first detail card closes the A2 machine card lever contact, A2 Mach. CL (Fig. 12c), at 6.1, causing R27 to become energized, and the A2 brush card lever contact, A2 Br. CL (Fig. 12d), at 9.6, preparing a circuit to the A2 contact roll. With R27, R25 and R23 all energized a circuit is established through R23a (Fig. 12c), R25a and R27a and the coil of relay R20, to L2, energizing said relay.

With the start key held down the CR1 impulse again passes through the previously traced circuits to energize the clutch magnets of all three feed units. In each cycle, when CR3 (Fig. 12c) closes at 0.5, relay R11 is energized and its contact R11b closes. When this occurs in the third cycle a circuit is completed from L1 through the magazine card lever relay contacts R32c (Fig. 12a), R23d, and R37e, normally closed R83b (Fig. 12b), R11b, R20b, R34b, and R39b, and the pick up coil of relay R75, to L2, energizing said relay. Another circuit extends from R11b through R6c, R25e, R27e, and the pick up coil of relay R80, to L2, energizing this relay. R80b (Fig. 12a) transfers, establishing a holding circuit to the pick up coil P2 of R61. R80c (Fig. 12a) opens, dropping out R58 and removing the run-in control of the feed unit clutch magnets, which are now subject to signals controlled by programming from the computing unit.

During the third cycle the class code 1 of card D1 is read into the A2 comparing relay R148 and the class code 1 of D2 into the A1 comparing relay R141. The circuit to R148 is from contact roll A2, through the hole in the card, column 71 brush of A2 read station, A2 Brush hub 212, plug wire 213 (see also Figs. 14a and 14b), plug hub 214 of A2 comparing relay R148, coil of R148, to L2. The points of the comparing relays control a comparing circuit shown in Fig. 12b. This circuit extends from L1 through CR8 and R6e, normally closed, to wire 190. Between this wire and a wire 191 is a ladder arrangement of contacts, such as R139a, R147a and R141a, R148a, providing normally open circuits in parallel. There may be any number of these pairs of contacts, depending upon the number of digits of the control codes used. In the diagram only two pairs are shown and only one of these pairs is used in the illustrative example, since class control is dependent only on the single digit in column 71. If R141a and R148a, for example, transfer during the same cycle point, due to the energization of the relays R141 and R148 by holes passing the brushes at the same cycle point time, there will be no circuit completed through R141a and R148a when CR8 closes during that cycle point time. If the contact R148a transfers during a certain cycle point time and R141a does not, then when CR8 closes a circuit will be completed from wire 190 to wire 191 and through resistor 192 to the minus 60 volt source. A resulting voltage rise at the control grid of thyratron 193 will cause the thyratron to become ignited, its plate circuit being established from L1 through CR44, R135, plate to cathode of the thyratron, to L2. R135 becomes energized indicating a control break, the effect of which will be described later. Both D1 and D2 are punched 1 in the class code column 71, consequently, the R141a and R148a contacts will both be transferred when CR8 makes at 1.5 index time and at all other mid-index times these relay contacts will be normal. Accordingly there will be no circuit completed to the grid of thyratron 193 and no change of its minus 60 volt bias. Relay R135 will remain de-energized.

There is a similar comparing circuit for cross feed comparison of the detail card at station A2 (Fig. 12d) with the master card at station B1. The circuit through column 71 of the master card extends from CR11 through B1c, closed from 14.8 to 9.8, B1 Brush CL contact, B1 contact roll, hole in the card, column 71 brush, B1 Brush hub 215, plug wire 216, plug hub 217 of B1 comparing relay R156, coil of R156, to L2. The comparing circuit (Fig. 12b) extends through CR8, R6e, R8e, to wire 194. A ladder of contacts of relays R147, R154 and R148, R156 may connect wire 194 to wire 195 when CR8 closes at any mid-index time, depending upon whether the holes in corresponding fields of the detail card at station A2 and the master card at station B1 disagree. If there is a disagreement a circuit will be completed through resistor 196 to the minus 60 volt source, the potential on the control grid of a thyraytron 197 will be raised, and the thyratron will be ignited, completing a circuit from L1 through CR44, R137, plate to cathode of thyratron 197, to L2. Energization of R137 indicates an error, due to the master cards being in a different order from the detail cards, or due to a missing card in either feed. The stop circuits controlled by this relay will be described later. At this time it will be assumed that the master card M1 and the detail card D1 both of which are punched 1 in the control field, are read in their proper order, in the third cycle, consequently R137 remains de-energized.

On the third cycle while the control code numbers are being read into the comparing relays, as described, the quantity 64 punched in columns 77-79, and the unit cost, $6.20, punched in columns 74-76 of D1 are read from the A2 reading station into FS2 and FS1, respectively, while the handling per cent, 1.5, is read from columns 77-79 of the master card M1 at the B1 read station, into FS3.

At the beginning of cycle three R6f (Fig. 12b) closes, completing a circuit from L1 through R20d, now closed, R6f, R137e, normally closed, and the coil of R225, to L2, energizing this relay. R225b (Fig. 12e) closes, extending +40 volt potential from L1 to the cam contact bus 163.

From 14.9 to 11.7 the X relay R221 is energized through an obvious circuit (Fig. 12c) through CR54, and its point R221a (Fig. 12e) is closed. At 12.8 A1g closes, completing a circuit previously traced, from L1, to the left grid of the reset control trigger 4-1F (Fig. 12i) of FS2. The trigger 4-1F is switched to the left by this signal and resets FS2. The same cam contact pulse switches the FS2 read-in triggers 4-1K, 4-1L on, so that the FS2 read-in switches 4-2K, 4-2L are conditioned for response to read-in pulses from trigger 1-8L.

At the same time FS1 and FS3 are being reset and their read-in switches 4-2B, 4-2C and 4-2P, 4-2Q are being prepared for read-in pulses from trigger 1-8L. The circuit for preparing FS1 extends from the hub FS2 RI, through plug wire 220, plug hub FS1 RI, R221b, and wire 12, to the left grids of the FS1 triggers 4-1E, 4-1B, 4-1C (Fig. 12i). The circuit for preparing FS3 extends from the cam bus 163 through cam contact B1f, B1 card cycles hub, through plug wire 221, FS3 RI plug hub, R221c, wire 44, to the left grids of FS3 triggers 4-1S, 4-1P, and 4-1Q.

Each counter of FS1, 2 and 3 receives read-in pulses from 1-8L until its individual read-in trigger is turned off by an impulse from the related brush of the read-in unit through circuits similar to the one previously traced from column 79 of read station A2. The circuit to one position of FS1 extends from the column 76 brush of the A2 read station (Fig. 12d), plug wire 187, wire 15, to the right grid of trigger 4-1C (Fig. 12i). The circuit to one position of FS3 extends from the column 79 brush of the B1 read station, through wires 138 and 47 to the right grid of 4-1Q. FS2 stores 64, FS1 stores 6.20 and FS3 stores 1.5.

With all the A1 and P clutches engaged R6 and R10 are de-energized at 12 time of cycle three and R231 (Fig. 12c) becomes energized through their normally closed g points. At 12.8 of cycle three P46 (Fig. 12b) completes a circuit through P Card Cycles hub, plug wire 238, hub C to hub T of the special card cycles class selector SPCC controlled by R231, plug wire 239, to the CTR RR hub. A plus impulse to this hub causes the accumulator of the electronic calculator to be read out during the cycle now started and prepared for reset at the beginning of the calculate cycle immediately following, as previously described.

At the beginning of the third cycle the accumulator should be standing at zero, due to a resetting circuit described in the said application, Serial No. 38,078, which causes the accumulator to be reset when power is turned on. The first card in the punch feed, which will pass through the die on the third cycle, should therefore be punched all zeros, in the field which receives results from the accumulator when the punch selectors are normal, namely, in columns 61–65, as the machine is wired for the illustrative example. The manner in which the punch magnets are controlled by the punch thyratrons to punch results out of the accumulator has been described earlier. The circuit, as the machine is wired for the illustrative example is a little different and, for the units order of the accumulator, for example, extends from the previously mentioned counter exit hub 174 (Fig. 12d) through plug wire 230, the common hub 231 of a punch selector comprising a relay magnet R52, the a point of this selector in normal position, normal hub 232, plug wire 233, normal hub 234 of a punch selector comprising relay magnet R51, the a point of this selector, common hub 235, plug wire 236, d point of R95, and the punch magnet 180, to L2.

At 8.5 of cycle three CR13 completes a circuit through R224a (Fig. 12e), normal, R75b, now closed, normally closed R137f, and the pick up coil of R174, to L2, energizing R174. R174a extends a holding circuit through CR14. At 9.7 CR1 (Fig. 12a) closes, completing a circuit from L1 through R61d, R174c transferred, R73b normal, and the punch clutch magnet, to L2. Circuits also extend from R174c through R229a, R174d, transferred, and the A2 clutch magnet; and through R230a, R174e transferred and the B2 clutch magnet, to L2. These three clutch magnets are energized and on the fourth cycle the punch unit, the A2 feed, and the B2 feed will operate, while the A1 feed and the B1 feed will remain stationary. The relay R229 (Fig. 12c) is energized by way of a circuit through A1e each time the A1 feed operates. Thus, on any punch cycle following a cycle of the A1 read unit the A2 read unit will operate. The relay R230 is energized by way of a circuit through B1d each time the B1 feed operates. Thus, on any punch cycle following a cycle of the B1 read unit the B2 read unit will operate.

Figure 12E:
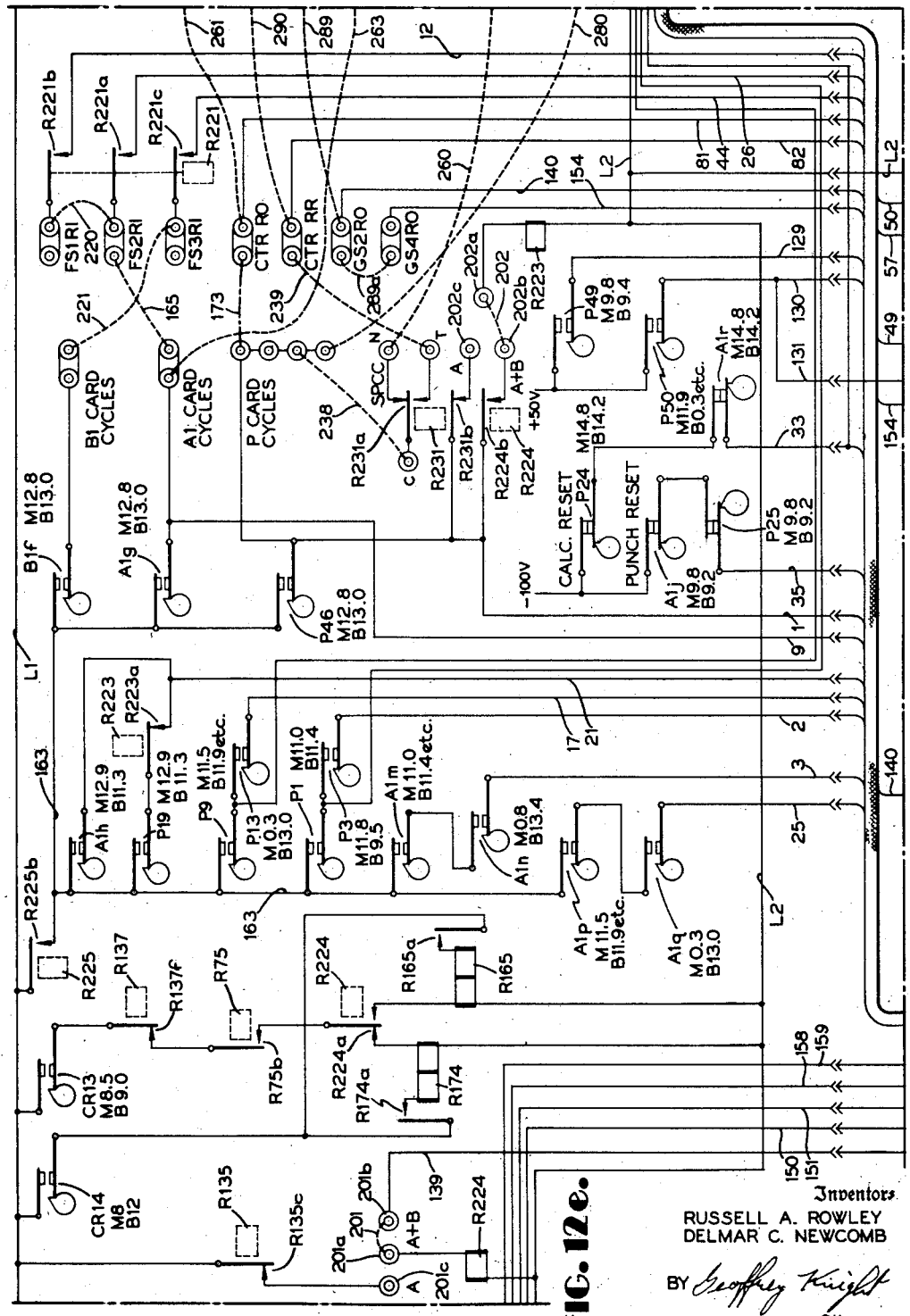
Figure 12J:
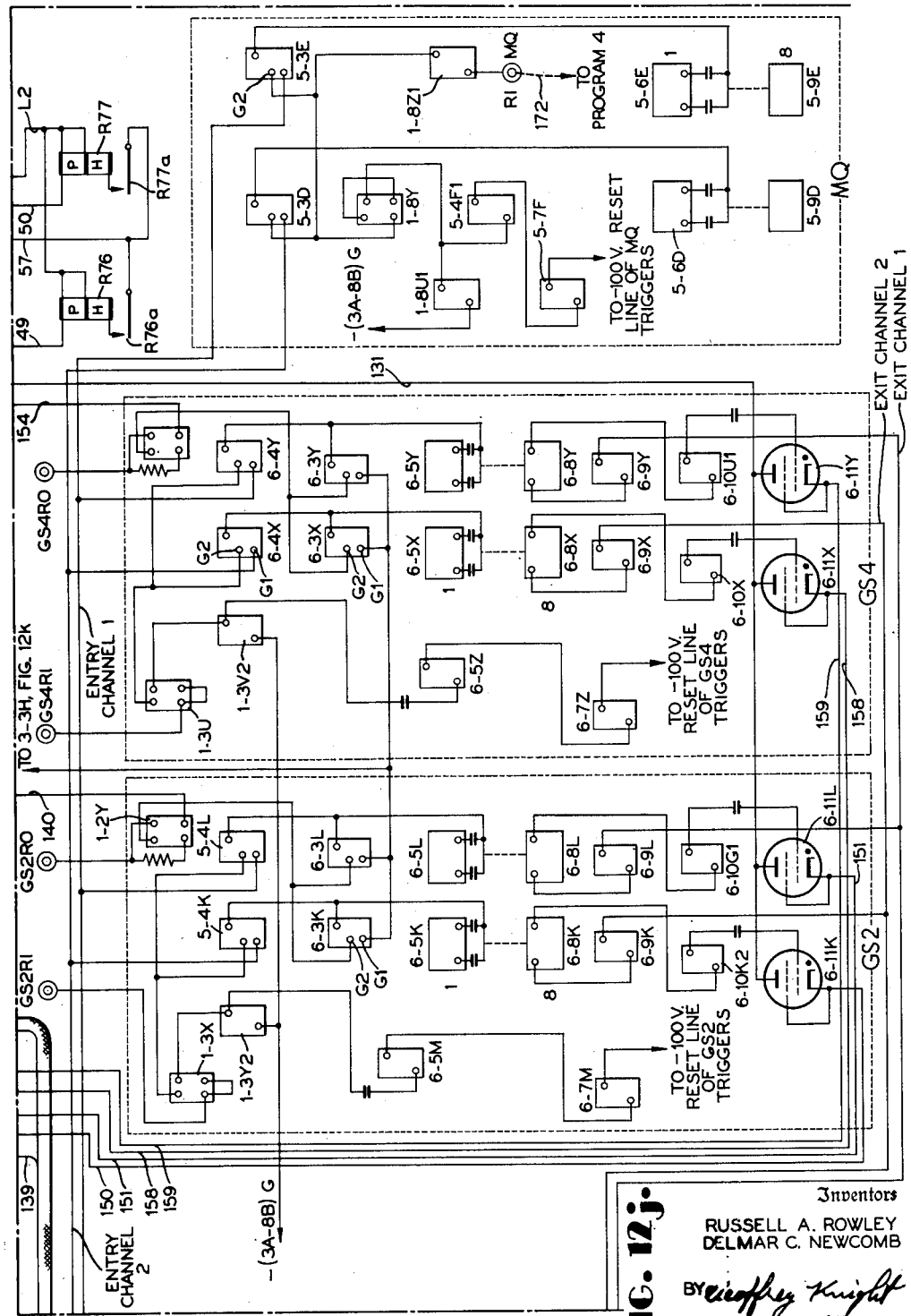

At 9.2 in the third cycle the primary timer and the program ring are reset by the opening of the punch reset cam P25 (Fig. 12e).

At 9.6 in the third cycle the leading card in the A read unit operates the A3 brush card lever, A3 CL (Fig. 12c), with the result that a circuit is completed through the contact of this card lever and R29 (Fig. 12c), energizing R29. At 13 time the B2 brush card lever, B2 CL (Fig. 12c), and the punch brush card lever, Punch Br. CL, are both operated and R36 and R41 are energized.

Also at 13 time calculation is started by the opening of P46 (Fig. 12e) and A1g. At this time the calculator selectors are all normal and accordingly the normal calculate sequence will take place. This sequence begins with a read signal on program step 1. A hub of this program step is wired to one of the read signal hubs, as shown in Fig. 13. A minus on this program hub 259 is transmitted through a plug wire 256 (Fig. 12g) to the read signal hub 257, which is connected to the grid of an inverter 6–10C. A plus from a plate of this inverter is transmitted through a condenser to the grid of a thyratron 6–10D. The plate of the thyratron is at this time connected to the 50 volt source through wire 129 and cam contact P49 (Fig. 12e). When the thyratron is ignited a circuit is completed, extending from the cathode of the thyratron (Fig. 12g) through wire 139, hub 201b, plug wire 201, hub 201a, and the coil of relay R224 (Fig. 12e) to L2, energizing this relay. R224 is held energized through the thyratron until the plate supply of the latter is terminated by the opening of P49 at 9.4 in the fourth cycle. The energization of relay R224 will cause a read cycle to follow cycle 4, which is a punch cycle.

Program 2, as shown by the chart, Fig. 16, and the wiring in Fig. 13, adds the total cost stored in GS4 to the counter. On this cycle GS4 stands at zero, because of a delay arrangement in the power supply which causes the reset wire to receive its minus 100 volt bias last, there having been no amount entered in GS4 since power was turned on. Program 2 in this cycle is therefore an idle step, but its purpose will become apparent in a later cycle.

Program 3 is also an idle step in cycle 4. It reads the total cost from the accumulator into GS4 and resets the accumulator.

Program 4 causes the quantity of the first item to be read from FS2 into the Mult. —Quot. Storage Device. This is a useful step since at this time FS2 contains the quantity 64, which was read into it on cycle 3.

Program 5 multiplies the unit cost of the first item, stored in FS1, by the quantity, now stored in the Mult. —Quot. Storage Device. The circuits whereby the multiplication is performed and the product stored in the counter are not shown in the present application, since the present invention is not specifically concerned with them. They are fully disclosed in the aforesaid application, Serial No. 38,078. The circuits for the three preceding program steps have already been described in the section on the calculator.

Program step 5 is the last effective step in this cycle. On the switching off of the program 20 trigger the program end circuits previously described are operative to terminate the pulsing of the primary timer. The calculator now awaits the closure of cam contact P46 to initiate the read out portion of the fourth cycle.

In cycle 4, the product standing in the accumulator, which is the item cost, is to be punched. In this same cycle the date, the name of the item, the code, the unit cost, and the quantity are to be reproduced from card D1 as it is read at the A3 brush station, while the handling per cent is to be reproduced from card M1 as the latter is read at the B2 brush station. The circuit whereby the item cost is punched is the same as the one traced just above, from the counter exit hub 174 to the punch magnet 180. The full wiring for the reproduction of the date, etc., is shown in Fig. 14b and is represented by the wiring for a single column in each field in Fig. 12d. One of the date pulses to a punch magnet passes from the A3 brush for column 1 through wire 222 and contact i of R95 to the punch magnet 185. One of the item name circuits extends from the column 5 brush through wire 223 and contact h of R95 to punch magnet 184. One of the code number circuits extends from the brush for column 71 through wire 224 hub T of punch selector 7 controlled by R54 (Fig. 12f), C hub, wire 224b and contact g of R95 to punch magnet 183. Punch selector 7 is transferred at this time because there is a card at the A3 read station and R29 is energized, causing a circuit to be established from L1 through A2a (Fig. 12f), R29e, plug wire 258, and the pick up coil of R54, to L2. One of the unit cost circuits extends from the brush for column 74 through wire 225 and contact f of R95 to punch magnet 182. One of the quantity circuits extends from the brush for column 77 through wire 226 and contact e of R95 to punch magnet 181.

One of the circuits for the handling percent extends from the column 77 brush of read station B2 through wire 227, the transferred a contact of punch selector 6 controlled by R53 wire 228 and the c contact of R95, to punch magnet 179.

Punch selector 6 is transferred at this time because there is a card at read station B2 and R36 is energized, causing a circuit to be established from L1 through the cam contact B2a (Fig. 12f), R36e, plug wire 240, and the coil of R53, to L2.

It will be seen presently that punch selector 6 will drop out after the first of a series of punch cycles, transferring control of the punch magnet 179 to the normal side of the a contact of R53 and through wire 227a to the column 66 brush of the punch brush station. Likewise, punch selector 7 will drop out, transferring control of punch magnet 183 to the normal side of the a contact of R54 and through wire 224a to the columns 52 brush of the punch brush station. In this way information reproduced into the first of a series of punched cards will be gang punched from the punch brush station into each succeeding card of the series.

On cycle four only the punch feed is running, hence R6g (Fig. 12c) and R8g are open and R231 is deenergized. When P46 (Fig. 12e) closes a plus pulse issues from a P card cycles hub through wire 238, hub C, R231a, normal, hub N, wire 260, C hub of class selector 2, the normal points of this class selector, and from the N hub through wire 261 to the counter read out hub CTR RO. (The plug wire 173 is not used in the example now being described.) It has been explained in the section on the calculator how a plus impulse to the latter hub initiates a read out of the counter. Since this will be read out during the read out time of the cycle the read out pulses to roll the accumulator will be supplied by the read out pulse trigger 1-8F. Also, plate voltage will be supplied to the punching thyratrons of the accumulator and the carry impulses from the accumulator counters will result in impulses at certain index times to the punch magnets. In the particular example, the amount which stands in the accumulator is $396.80, the cost of the first item. This amount is accordingly punched in the field including columns 61 to 65 of the card P1 (Fig. 11). The circuit from counter exit hub 174 through class selectors 4 and 1 in normal position, to column 52 punch magnet 183 has been previously traced. (The plug wire 175 is not used in the example now being described.)

When P46 closes in cycle four a circuit is also extended through R224b (Fig. 12e), now closed, hub 202b, plug wire 202, hub 202a, and R223 to L2, energizing this relay. The a point of R223 opens up just before P19 closes at 12.9, preventing the normal restoring pulse which passes through wire 21 to the right grid of trigger 1-10E (Fig. 12g) from restoring this trigger to the right. With 1-10E remaining in the on condition, the pulse which will be transmitted to it over wire 1 when P46 opens will have no effect on it. Consequently there will be no pulse to the compute stop trigger 1-5M and the start switch 1-5L will not be made responsive to A pulses on its grid G1. The primary timer will remain idle and there will be no calculation at the end of read out time.

With R224a (Fig. 12e) transferred, the CR13 pulse at 8.5 in the fourth cycle will extend a circuit through R137f, R75b, R224a transferred and the pick up coil of R165 to L2 energizing this relay. R165 holds up through its a point and CR14 until 12 time in cycle 5.

With 165c (Fig. 12a) transferred the pulse from CR1 passes through this contact, R63b normal, and the clutch magnet A2 to L2, also through R174d normal and the clutch magnet A1 to L2, energizing these magnets. R165d is also closed, but since R226b is open there is no circuit to the B unit clutch magnets. The A1 unit alone runs during this cycle.

R165b (Fig. 12c) closes and the pulse from CR46 at 14.5 in cycle 5 picks up R176, which holds up through this cycle. R176a (Fig. 12a) closes, extending a circuit from L1 through the high speed magnet HS to L2. The high speed magnet is energized and cycle 5 proceeds at twice normal speed.

At 12.8 a pulse from A1g (Fig. 12e) passes thruogh an A1 card cycles hub to the FS2 RI and FS1 RI hubs. These two factor storage units are reset and the unit cost $7.75 and quantity 50 are then read from the card D2 into FS1 and FS2, respectively.

The code digit 1 is read through the column 71 brush of station A2 from the card D2 into R148 and the code digit 2 is read through the column 71 brush of station A1 from the card D3 into R141. The contact R148a (Fig. 12b) transfers one cycle point ahead of the contact R141a, with the result that the test impulse from CR8 at mid-index time of cycle point 1 finds a circuit through R141a normal and R148a transferred and the thyratron 193 is ignited. R135 is energized. Its a point (Fig. 12b) completes a circuit through R226, and this relay is energized and held energized through R135a until 14 time in cycle 6. Meantime, a holding circuit is completed through R226a and A1c at 9 time of cycle 5, which will be maintained while the A1 read unit is latched through cycles 6 and 7.

Some of the points of R135 (Fig. 12f) are wired to the control panel as a class selector, labeled "Control." In accordance with the present example one A1 Card Cycles hub is connected by a plug wire 263 to the C hub of the Control class selector and when R135 is energized in cycle five a circuit is completed from A1g through the A1 Card Cycles hub, wire 263, C hub, T hub, a plug wire 264 to one of a chain of bus hubs 265. Here the circuit splits two ways as follows:

1. Through wire 266 to the hub 267 of the relay coil R43 of pilot selector 1.
2. Through wire 270 to a hub 271 of the pick up coil of relay R55 of calculator selector 1.

The a points of each of the relays R43 and R55 complete holding circuits through CR55, which hold them until 13 time of cycle 5.

The function of pilot selector 1 is to transfer the control break indication, originating with the pick up of R135, into the following cycle. For this purpose there is associated with the relay R43 a transfer relay R44, the pick up coil of which is energized through R43b and CR56, which closes at 7 and remains closed until 9.7. R44a completes a circuit through the hold coil of R44 to CR57, which will remain until zero time in the sixth cycle. R44b prepares a circuit to the pick up coil of the class selector relay R45, which is completed through CR58 when this cam contact closes at 14 time in cycle 6. R45a point closes, preparing a holding circuit which is completed through CR55, to hold the class selector relay until 13 time in cycle 6.

The b point of relay R55 of calculator selector 1 prepares a circuit from CR56 through wire 49 to the pick up coil of calculator selector 1 relay R76 (Fig. 12j) to L2. The a point of R76 extends a holding circuit for the relay through wire 57 to CR57 (Fig. 12f), which holds the relay up until zero time in cycle 6; that is to say, through the calculate cycle at the end of the fifth cycle.

Meanwhile, R224 (Fig. 12c) having dropped out after the CR13 pulse in the fourth cycle, the next CR13 pulse near the end of the fifth cycle passes through R224a in normal position and causes R174 to be energized. This means that the sixth cycle will be a punch cycle but since the A1 unit was operating in cycle five R229 (Fig. 12c) is energized and the CR1 pulse passes through R229a (Fig. 12a) and R174d, transferred, to the A2 clutch magnet. In cycle 6 the code 115, the unit cost $7.75, and the quantity 50 will be reproduced from the card D2, punch selector 7 (R54, Fig. 12f) being energized. On the other hand, relay R230 is not energized and the B2 read unit does not operate. Likewise, punch selector 6 (R53, Fig. 12f) is not energized and as seen in Fig. 12d, in the circuit for column 68, the handling per cent, 1.5, is gang punched into the card P2 from the card P1, as the latter passes the punch brush station.

The operation of calculator selector 1 causes program step 1 to be suppressed in the calculate cycle at the end of cycle 5 (see Figs. 13 and 12g). Program steps 2 through 5 of this calculate sequence are effective.

The item cost of item 1 remains in the accumulator from the first calculate sequence. On program step 2 the quantity in GS4 is added in the accumulator, but as this quantity is zero there is no change in the amount stored in the accumulator. On program step 3 the total cost, which in this case is simply the cost of item 1, is read out of the accumulator into GS4. The read out of the accumulator is initiated by a signal from the program 3 hub to the counter read out and reset hub and the counter is accordingly prepared for reset at the beginning of the next program step.

On program step 4 the quantity 50 is read from FS2 into the MQ storage device and on program step 5 this quantity is multiplied by the unit cost, $7.75, in FS1. Program steps 6 through 11 are suppressed and at the end of the calculate sequence the accumulator contains the item cost $387.50.

At the end of the calculate cycle following the fifth cycle a signal passes from the P card cycles hub to the counter read out hub, through the circuit previously traced, and the total cost of item 2 is punched in the card P2, while the code number, 115, the unit cost, 7.75, and the quantity, 50 are being reproduced and the handling per cent, 1.5, gang punched, as previously described.

Since the read signal was suppressed in the calculate cycle preceding punch cycle six, the pulse from CR13 at the end of cycle six picks up R174 and prepares for a punch cycle to follow. The card P3, punched on cycle 7, is a summary card and will be punched with the total cost of items 2 and 3, the handling charge, and the total charge, which is the sum of the total cost and the handling charge. Also, neither punch selector 6 nor punch selector 7 is transferred, because neither the A2 feed nor the B2 feed is running; consequently the code digit 1 in column 52 and the handling per cent will be gang punched. In the code field only the code digit in column 52 is gang punched, because only the punch magnet of this column is wired to its punch brush (see single wire from the column 52 punch brush in Fig. 14b to the N hub of punch selector 7).

While item 2 is being punched out during cycle six, a card cycles pulse passes from a P card cycles hub through wire 280, the C hub of class selector 1, the T hub of this class selector (class selector 1 having been energized on cycle 6 as previously described), plug wire 281 to one hub of a chain of bus hubs 282. Here the circuit splits into two branches as follows:

1. Through wire 283 to hub 269 of pilot selector 2, relay R46, to L2.

2. Through wire 285 to hub 286 of calculator selector 2 control relay R56. This calculator selector will consequently be transferred during the calculate cycle following punch cycle 6. The circuit is similar to the one traced for calculator selector 1 and includes the a point of R56, which holds up R56 through CR55, the b point of R56, which picks up R77, and the a point of R77, which holds up this calculator selector relay through wire 57 and CR57.

The P19 pulse resets trigger 1-10E during the 6th cycle, R223a being closed. When P46 opens nears the end of cycle 6 it starts a calculate cycle in which calculator selector 1 is normal and calculator selector 2 is operated. Program 1 causes a read signal, which results in the energization of R224 in the manner previously described.

In program 2 the total cost stored in GS4 is added in the accumulator to the cost of item 2, which is carried over in the accumulator from the previous cycle. The new total cost is transferred in program 3 to GS4 and the accumulator is reset.

The next program step operative in this calculate cycle is step 6. On this program step the handling per cent is read from FS3 into the Mult.—Quot. Storage Device and on program step 7 the total cost in GS4 is multiplied by the handling per cent. This operation is called in by the wiring of one program 7 hub to a multiply plus hub and another to a GS4 read out hub.

Program step 8 carries out a ½ adjust operation in the third order of the product of the total cost by the handling per cent, 1176400. This is a standard procedure on the commercial IBM electronic calculator and is described in said application, Serial No. 38,078. There is no carry into the fourth order of the product in the present example. On program step 9 the result in the accumulator is read into GS2, with a column shift which causes the fourth position of the amount in the accumulator to read into the first position of GS2. This is indicated by the 9 placed next to a hub of "Read Units out of Fourth" in Fig. 13, the shift being accomplished by the column shift circuits, as disclosed in said application, Serial No. 38,078. The signal for the counter control is a read out and reset signal.

In program 10 the handling charge 11.76 is read back into the accumulator and in program 11 the total cost is added to it. This completes the calculating sequence and the total charge, $796.06 is held in the accumulator ready to be punched out.

At 12.8 in the seventh cycle a P card cycles pulse passes through wire 238, C hub to N hub of the special card cycles selector SPCC, wire 260, C hub to T hub of class selector 2, wire 287, to one hub of a bus hub chain 288. Here the pulse splits three ways as follows:

1. Through wire 289 to GS2 read out hub; also by jumper 289a to a GS4 read out hub;

2. Through wire 290 to a counter read out and reset hub;

3. Through wire 291 and the hub 292 of R51 pick up coil, punch selector 1; also through jumper 293 to the hub 294 of the pick up coil of R52, punch selector 4.

The operation of punch selectors 1 and 4 causes the following changes in the connections to the punch magnets (Figs. 12d, 14b):

1. The read out from the accumulator, which passes through wires 230 to the C hubs 231 of punch selector 4 (R52), now extends through the T hubs of this punch selector and wires 295 to punch magnet hubs 176 of columns 75 to 79.

2. The punch magnet hubs for columns 61 to 65, which are connected by wires 236 to the C hubs of punch selector 1 (R51), are now connected through the T hubs of this punch selector and wire 295 to the exit hubs of GS4.

Through the connections above mentioned the total charge, $796.06, which is held in the accumulator at the end of the calculating cycle, is punched in columns 75 to 79, while the total cost, which is stored in GS4, is punched in columns 61 to 65, under the item costs. The handling charge, which is stored in GS2, is punched in columns 69 to 73 by a direct connection through wires 297.

Near the end of the seventh cycle CR13 (Fig. 12e) transmits a pulse to energize R165, R224a being transferred, due to the read signal emitted during the calculate cycle preceding the seventh punch cycle. The CR1 pulse passes through R174c, normal, R165c, transferred, R63b, normal, to the A2 clutch, and through R174d, normal, to the A1 clutch. This pulse also passes through R165d, hub 203a, plug wire 203, hub 203b, R226b, which is still closed because R226 is being held up through the stationary cam contact A1c, R68b, normal, and the B2 clutch magnet; also through R174e, normal and the B1 clutch magnet.

During this read cycle the high speed clutch is again engaged, R176 having been energized in the same way as previously described. All the read units operate during this cycle, with the result that the code digit in column 71 of D3 is read into the comparing relay R148 from the A2 brush station, and the same code digit is read from column 71 of the card M2 at the B1 station into the comparing relay R156. A fourth detail card (not shown) presents a code hole to the column 71 brush of the A1 read station and this is read into the comparing relay R141.

The eighth cycle is the same as cycle 3, except that the punch is not running. Although the A2 and B2 clutches are engaged, read stations A3 and B2 are ineffective, because there are no cards in them and the card lever relays R29, R36, are not energized; likewise because the punch unit is not operating. From this point on the operation of the machine is the same as previously described.

If at any time the order of the cards in either read feed should become disarranged the error relay R137 (Fig. 12b) will be energized. R137c closes, completing a circuit through the P2 coil of the stop relay R87 (Fig. 12a). R137a prepares a circuit to the latch trip coil of R137, which will be completed by the operation of the Error Reset key, after the arrangement of the cards has been repaired. R137d (Fig. 12c) prepares a circuit to the trip coil of R225, which is completed by cam contact A1f, or B1e, at 13.4 time. The dropping out of R225 opens R225b (Fig. 12e), interrupting the cam pulsing circuits to the calculating unit. Meanwhile, a calculation has been initiated by the opening of A1g, which causes the calculator to run through programs 1 to 5 and store an erroneous result in the accumulator.

When R87 is energized its point R87e (Fig. 12a) completes a circuit from L1 through R80a and the latch trip coil of R80 to L2, dropping out this relay. R80b transfers, opening one holding circuit of R61 and leaving this relay to drop out when CR5 opens. The A and B read units latch up at the end of the cycle, because CR5 drops out R61 before CR1 makes.

It is now necessary to clear the three card feed units and to rearrange the cards in proper order. The cards in the hopper of the three feed units are removed, releasing the magazine card levers and allowing R23, R32 and R37 (Fig. 12c) to become de-energized. R23e, R32b and R37d close and R13d (Fig. 12a) remains closed, because of the cards under the other card levers of the feed units. The runout key is held down and R83 is energized. R83e (Fig. 12a) completes a circuit from L1 through the pick up coil P1 of R61, with the result that the motor relay is energized through R61b. Meanwhile, the dropping out of R80 has allowed R80c to close, causing R58 to become energized. Through the R58a, b, and c contacts relays R63, R68 and R73 are energized and their points R63b, R68b, and R73b transfer. Now when CR1 closes, and with R61d and R13e closed, the circuits are completed to energize all of the clutch magnets of the three card feed units. The card feeds operate and the cards are fed out into the stackers, the runout key being held down until the card feeds cease to operate, due to the opening of R13d (Fig. 12a) when the last card lever relay of the series R25c to R41c is opened. The cam contact P2 holds the relay R13 energized for one additional clutch engagement time after the last card lever contact opens, insuring a full cycle of operation to deposit the last card in the stacker.

The cards are now removed from the stackers and the erroneous order which caused the error condition is corrected. The master and detail decks are again placed in their respective hoppers, with the cards which should have been read at stations A2 and B1 when the error was detected on the bottom of the two decks. Blank cards are also restored to the punch feed hopper.

The error reset key is operated, completing a circuit through R137a and the latch trip coil of R137, tripping this relay.

The start key is operated and relay R61 is energized, picking up the motor relay and setting the CR cams in operation. The run-in cycles now follow in the same way as described in the beginning. On the first cycle the A1 clutch operates alone and feeds a card up to the A1 read station. On the second cycle all feeds operate, the leading detail card advances to the A2 read station, the leading master card to the B1 read station, and the blank card in the punch feed to the die station.

During the second cycle R20 is energized and when R6 is energized at the end of the cycle the circuit is completed through R20c, R6f, R137e, R225, energizing this relay. R225b closes, setting up the cam pulsing circuits.

At 12.7 time in the third cycle P46 completes the circuit previously traced from the P Card Cycles hub and the C and T hubs of the SPCC class selector to the Ctr. RR hub, causing the erroneous result stored in the accumulator to be read out and punched and the circuits set up for reset of the accumulator on the first electronic cycle following. The pulse to the Ctr. RR hub also feeds out to punch selectors 1 and 4 and to the GS2 RO and GS4 RO hubs, so the amounts stored in these storage devices will be read out and punched. The card with the erroneous punchings is discarded. The factor storage counters are also reset at this time, eliminating the erroneously stored factors, and the correct, new factors are read into them during the read cycle.

Single read unit operation

Operation of the machine with a single read unit will be illustrated by a second problem described with reference to Figs. 19 to 23. In this problem there will be a group of job cards for each employee key punched with employee number, hours worked, base rate, and bonus rate. A bonus is given for hazardous occupation, for example, and its amount is arrived at by multiplying the base pay for the period of the hazardous occupation by a percentage factor. There will be a job card for each day during which the employee worked, or for each period during which he worked continuously on a certain job.

Fig. 21 shows a set of detail cards for employee number 45 for one payroll period. Card D1 shows that employee number 45 worked for 5.3 hours on a job which carried a bonus rate of 28 percent of the employee's base pay, which is $1.78 an hour. Card D2 for the same employee shows work for 2.7 hours on a job which carried no bonus rate. There are 6 cards in all for this payroll period for this employee. In the example they add up to a total of 39 hours, a base pay total of $69.42, a bonus total of $4.35, and a gross pay of $73.77.

Card D7 pertains to employee 46 whose rate of pay is $2.05 an hour and who worked 6.4 hours on a job involving no bonus. Each employee's group of detail cards is to be converted into a single summary card, which will have punched into it the total of the employee's base pay, the total of his bonus pay, and his gross pay for the payroll period covered by the group of cards. Such a summary card for the group of detail cards D1 to D6 is shown in Fig. 22.

In the section of the reader punch control panel diagram shown in Fig. 20a, the bottle plugs 200, 201, 202, and 203 are shifted from the A+B connections to the A connections. Thus the hub 200a is connected to the hub 200c, the hub 201a is connected to the hub 201c, the hub 202a is connected to the hub 202c, and the hub 204a is connected by bottle plug 203 to hub 204b.

In Fig. 12a it will be seen that the shifting of the bottle plug 200 has the effect of removing the connection through which the relay R68 is energized. It also bypasses the relay point R32c. In Fig. 12e, the shifting of the bottle plug 201 connects the relay R224 through hub 201c and R135c directly to the line L1. Relay R224, it will be remembered, determines whether the reader clutches or the punch clutch will be energized. With the connections shown in this second example, the reader clutch is normally energized and the punch clutch is only energized on a control break, when R135 is picked up.

The removal of the bottle plug 203 (Fig. 12a) from the hubs 203a and 203b disconnects the circuits to the B read unit clutches on a read cycle. With the bottle plug 203 connecting the hubs 204a and 204b (Fig. 12b) the points R34d in the circuit to the relay R75 are shunted.

As in the previous example, the detail cards are first sorted into groups according to control numbers, in this case, according to employee numbers. A set of detail cards are then placed in the hopper of the A read unit and the hopper of the punch unit is filled with blank cards. The first three run-in cycles are the same as in the first example, except that B read unit is not operating. At the end of the second cycle the relay R225 (Fig. 12b) is energized through the circuit previously traced. R225b closes, connecting the line L1 to the bus 163. In the third cycle an A1 card cycles pulse passes through plug wire 304 to factor storage 1 read-in hub and through jumpers 305 and 306 to factor storage 2 and 3 read-in hubs. These factor storage units are conditioned for read-in and during the third cycle the base rate, 1.78, is read through wiring 307 into FS3, the bonus rate, .28, is read through wiring 308 into FS1, and the hours, 5.3, are read through wiring 309 into FS2. The opening of cam contact A1g starts calculation in accordance with the normal program shown on the chart Fig. 23. The wiring by which this program is carried out is shown in Fig. 19. Programs 1 and 2 cause the number of hours stored in FS2 to be multiplied by the base pay rate stored in FS3. A half adjustment on program 3 is followed by storage of the base pay item in FS4, with a column shift to read the units out of the second order of the counter. On program 5 the base pay item is returned to counter and on program 6 the total base pay is read out of GS2 and added to the amount in the counter. On this calculation cycle following the first card cycle the total base pay is, of course, zero.

On program 7 the total base pay is read out of the counter into GS2 and the counter is reset. Programs 8 and 9 multiply the base pay item stored in FS4 by the bonus rate read out of FS1. After a half adjustment in the second order of the counter on program 10, the bonus item is stored in FS4, units being read out of the third order of the counter and the counter being reset. On program 12 the bonus item is returned to the counter and the total bonus (at this time zero) is added in the counter from GS4. On program 14 the new bonus total is stored in GS4, the counter is reset, and this terminates the calculate cycle.

Referring to Figs. 20a and 20b, the plug hubs of the A2 brushes for columns 41 and 42 are connected by a plug wire 311 to the hubs 214 of comparing relays R147 and R148. The hubs of the A1 brushes for columns 41 and 42 are connected by a plug wire 312 to the hubs 211 of comparing relays R139 and R141. As the card D1 passes the station A2, it is compared with the card D2 passing the station A1, by means of the comparing circuits previously described. Since both of these cards have the same control number, 45, the control relay R135 remains de-energized.

There are 6 detail cards having the control number 45, accordingly there will be no control break until the 6th card is being read at station A2 and the 7th card at station A1. This occurs in the 8th cycle. During the 3rd to the 8th cycle, then, the data from the detail cards D1 to D6 is read into the calculator and the calculations performed in accordance with the program previously described. Throughout this time the relay R224 remains energized and the CR13 impulse near the end of each cycle passes through R224a and R165, energizing R165. The CR1 impulse which follows passes through R165c, R63b, and A2, to the line L2, also through R174d, normal, and A1, to the line L2, energizing these two clutch magnets. The bottle plug 203 being removed from the hubs 203a and 203b, there is no circuit to the B1 and B2 clutches and the B read unit therefore, remains idle.

When the detail cards D6 and D7 are compared during the 8th cycle, a difference is detected and the relay R135 (Fig. 12b) is energized. Its point R135c (Fig. 12e) opens and the relay R224 drops out. R224a drops back to normal position and the next CR13 impulse passes through R174. The following cycle will be a punch cycle. The CR1 pulse occurs at a time when the A1 clutch is engaged and R229 is energized. A circuit is therefore completed from R174c through R229a and R174d, transferred, to the A2 clutch magnet. The B1 clutch is not engaged at the present time and the relay R230 (Fig. 12c) is de-energized. Consequently, the CR1 pulse will not reach the B2 clutch magnet. R226 (Fig. 12b) is energized through the a point of R135, but R226b has no effect, because the circuit is open from 203a to 203b.

Relay R54 (Fig. 12f) of punch selector 7 is energized during the following punch cycle, because the A2 feed is running and there is a card under the A3 card lever, which causes R29 (Fig. 12c) to be energized. The employee number, 45, will therefore be reproduced from the card passing the A3 brushes during this cycle. The circuit extends from the column 41 and 42 hubs of the A3 brush station through plug wire 313 (Fig. 20b), T hubs of punch selector 7, C hubs of this selector, plug wire 314, the hubs of the punch magnets for columns 41 and 42, and the coils of these magnets, to line wire L2.

The punch cycle is preceded by a calculate cycle in which the program is modified by the energization of calculator selector 1. The circuit is from an A1 card cycles hub through plug wire 315, C and T hubs of the control selector controlled by R135, plug wire 316, to the hub 271 of calculator selector 1, and the coil of relay R55. This relay is energized as soon as the relay R135 is energized and the calculator selector 1 is therefore picked up before the calculate cycle begins.

This calculate cycle is the same as those previously described as far as program 13. However, program 14 is suppressed and programs 15 and 16 are unsuppressed. On the preceding calculate cycles the suppress voltage had been extended from the normal hub of calculator selector 1 through plug wires 317 and 318, to the suppress hubs of programs 15 and 16. On this cycle the suppress voltage extends from the T hub of calculator selector 1 through plug wire 319 to the suppress hub of program 14. After the previous bonus total has been added to the last bonus item on program 13, the new bonus total is stored in GS4 without resetting the counter on program 15. On program 16 the base pay total $69.42 is added to the bonus total $4.35 in the counter, making a gross pay of $73.77.

With the punch unit operating, at the end of the calculation a P card cycles pulse passes through plug wire 321 (Fig. 20a) to a CTR R & R hub. Another P card cycles pulse passes through plug wire 322 to the general storage 2 read-out hub and through a jumper 323 to general storage 4 read-out hub. The base pay total of $69.42 is punched in columns 12 to 16 by a circuit extending from the GS2 exit hubs through plug wires 324 to the corresponding punch magnet hubs. The bonus total is punched in columns 17 to 20 by a circuit extending from the GS4 exit hubs through plug wires 325 to the corresponding punch magnet hubs. The gross pay is punched in columns 35 to 39 by a circuit extending from the counter exit hubs through plug wires 325 to the corresponding punch magnet hubs.

When cam contact P46 closes at the beginning of the punch cycle, it completes a circuit through R231b, hub 202c, plug wire 202, hub 202a and the coil of R223 to L2, energizing said relay. This interrupts the resetting pulse from P19 through wire 21 to the trigger I-10E eliminating the calculate start signal at the end of the punch cycle. During the third cycle, when P46 closed R223 was not energized, because R231 (Fig. 12c) was energized, on account of the concurrent operation of the A1 and P clutches.

R135c closes at the beginning of the punch cycle causing R224 to be energized again. The CR13 pulse near the end of the punch cycle finds R224a transferred and picks up R165. The following cycle is therefore, a read unit cycle, during which the card D7 will be read at station A2. The set of detail cards pertaining to employee 46 are then processed in the same may as those pertaining to employee 45.

The control panel wiring in Fig. 20b shows the control number punching circuits extending through punch selector 7. This wiring is not required in the second illustrative example, but a somewhat different problem might call for two or more punch cycles in succession, as in the first example; in this case the circuit from punch brush hubs 329 through wires 330 the N hubs and the C hubs of punch selector 7, and wires 314, would serve to gang punch the control number on the second and following successive punch cycles.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a record controlled calculator, a calculating unit, means including a first record reading device for entering factors into said calculating unit, means including a recording unit for recording results of computations with said factors by said calculating unit, means including a second record reading device for causing said recording device to reproduce information as it is read from a record by said second record reading device, concurrently with the recording of results thereby under control of said calculating unit, and means for driving said record reading devices and said recording means in synchronism.

2. A device as described in claim 1, characterized by means for feeding records from said first record reading device to said second record reading device.

3. A device as described in claim 2, characterized by means for selectively clutching either said first reading device or said recording unit to said driving means, and means for clutching said additional reading device to said driving means concurrently with either said first reading device or said recording unit.

4. A device as described in claim 3, characterized by the fact that the means for selectively clutching either said first reading device or said recording unit to said driving means comprises signaling means in said calculating unit.

5. In a record controlled calculating machine, a calculating unit including pluggable program means to control a sequence of calculating operations, means including a record reading unit for entering factors in said calculating unit, means including a recording unit for recording results of calculations by said calculating unit, means including signaling means controlled by said program means for selectively operating said record reading unit and said recording unit in a predetermined sequence, and means controlled by the records read by said record reading unit for varying the operation of said program means to change said sequence.

6. A record controlled calculating machine as described in claim 5, characterized by the fact that said record reading unit includes means for feeding two different sets of records, and means for individually and selectively controlling the operation of said feeding means.

7. A record controlled calculating machine as described in claim 6, characterized by the fact that said means for selectively controlling the operation of said feeding means is controlled by the records fed by one of said feeding means.

8. A record controlled calculating machine as described in claim 7, characterized by the fact that at least one of said record feeding means includes sensing means located at two stations through which the records pass in sequence, for sensing the same record twice, the first sensing means comprising the means to enter factors in said calculating unit and the second sensing means having associated therewith means to control said recording unit for reproducing information from records passing said second sensing means.

9. In a device of the class described, a calculating unit, a recording unit, including means to record in a plurality of columns concurrently, a record reading unit having a plurality of record reading stations, each comprising means to read records; and means to feed a record through said reading stations in sequence; means including the record reading means at one of said reading stations for transmitting factors from records read therein to said calculating unit; and means whereby said recording unit is controlled by said calculating means and the record reading means at another one of said reading stations, to record in different groups of columns concurrently, data read from a record and the results of computations of said factors.

10. In a device of the class described, a calculating unit; a reading unit including two record feeding means, record reading means associated with each of said record feeding means, one of said record feeding means being adapted to deliver records to the other; a recording unit adapted to record in a plurality of columns concurrently; means for transmitting to said calculating unit factors read by the record reading means associated with said first record feeding means, means for controlling the recording means pertaining to one group of columns by said calculating unit, and means for controlling the recording means pertaining to another group of columns by the reading means associated with said second feeding means; common driving means for said reading and recording units, means for individually clutching said recording means and each of said record feeding means thereto, means to engage either the clutching means for said recording unit or the clutching means for said first record feeding unit to said driving means, and means to engage the clutching means for said second record feeding means concurrently with either of said other clutching means.

11. In a record controlled calculator, a first record reading unit comprising two record reading devices and means to feed a first set of records to said devices in succession, a second record reading unit comprising a record reading device and means to feed a second set of records to said latter reading device, a calculating unit, means to enter factors into said calculating unit from the second record reading device of said first record reading unit and from the reading device of said second reading unit, means to compare a record read by the second reading device of said first reading unit with a record read by the first reading device of said first reading unit, and means to control the operation of said second reading unit in dependence upon the agreement or disagreement of the compared records.

12. A record controlled calculator as described in claim 11, characterized by additional record reading devices in each of said record reading units, by which the records are read after being read by the other record reading device, or devices, of the respective units; a recording unit, and means for controlling said recording unit by said calculating unit and by said adidtional record reading devices concurrently, to record results of computations and to reproduce information from records at the same time.

13. A record controlled calculator as described in claim 11, characterized by means to program sequences of steps of said calculating unit, and means controlled by said comparing means for selecting the program sequence which is to be operative.

14. In a record controlled calculator, a calculating unit, means including a record reading unit for entering factors into said calculating unit, means including a recording unit for recording results of computations with said factors by said calculating unit, a common driving means for said reading unit and said recording unit, including speed changing means, individual clutching means for clutching said reading unit and said recording unit, respectively, to said driving means, control means for alternatively operating said clutching means, said control means including means to operate said speed changing means when said reading unit clutch is operated, to cause said reading unit to be operated at a higher speed than said recording unit.

RUSSELL A. ROWLEY.
DELMAR C. NEWCOMB.

No references cited.